(12) United States Patent
Otomo et al.

(10) Patent No.: US 7,263,271 B2
(45) Date of Patent: *Aug. 28, 2007

(54) SYSTEM OF SHARING OBJECTS HAVING A PLURALITY OF CONTENTS

(75) Inventors: Hitoshi Otomo, Yokohama (JP); Shigeru Todokoro, Fijisawa (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1129 days.

This patent is subject to a terminal disclaimer.

(21) Appl. No.: 09/789,769

(22) Filed: Feb. 22, 2001

(65) Prior Publication Data

US 2001/0008576 A1 Jul. 19, 2001

Related U.S. Application Data

(62) Division of application No. 09/380,067, filed as application No. PCT/JP98/05908 on Dec. 25, 1998, now Pat. No. 6,748,160.

(30) Foreign Application Priority Data

Dec. 25, 1997 (JP) ................................. 9-358546

(51) Int. Cl.
H04N 7/00 (2006.01)
H04N 9/00 (2006.01)
H04N 5/93 (2006.01)
H04N 5/91 (2006.01)

(52) U.S. Cl. ........................... 386/46; 386/39; 386/54; 386/75; 386/96; 386/95

(58) Field of Classification Search .................. 386/94, 386/95, 96, 92, 125, 126, 46, 58, 39, 54, 386/75; 369/59, 59.21; 348/7, 13, 734
See application file for complete search history.

(56) References Cited

U.S. PATENT DOCUMENTS 5,684,786 A 11/1997 Schylander et al.

(Continued)

FOREIGN PATENT DOCUMENTS

CN 1135633 A 11/1996

(Continued)

OTHER PUBLICATIONS

Japanese Office Action (Notification of Reasons for Rejection) re: Patent Application JP 2002-157590, Mailing Date: Aug. 6, 2002, Mailing No: 255318 (with English Translation).

(Continued)

*Primary Examiner*—John Miller
*Assistant Examiner*—Jamie J Vent
(74) *Attorney, Agent, or Firm*—Oblon, Spivak, McClelland, Maier & Neustadt, P.C.

(57) ABSTRACT

In order to use video contents created according to DVD video in DVD audio, audio and video sub-directories are located under a root directory. The video sub-directory includes video contents and their management information. The audio sub-directory includes audio contents and their management information. The video management information can only access the video contents. However, the audio management information can access not only the audio contents but also the video contents.

9 Claims, 33 Drawing Sheets

AUDIO MANAGER INFORMATION MANAGEMENT TABLE AMGI_MAT

| RBP | SYMBOL/FILE NAME | CONTENTS | BYTES |
|---|---|---|---|
| 0 – 11 | AMG_ID | AMG IDENTIFIER | 12 |
| 12 – 15 | AMG_EA | END ADR. OF AMG | 4 |
| 16 – 27 | RESERVED | RESERVED | 12 |
| 28 – 31 | AMGI_EA | END ADR OF AMGI | 4 |
| 32 – 33 | VERN | VERSION NUMBER OF AUDIO SPEC. | 2 |
| 34 – 37 | RESERVED | RESERVED | 4 |
| 38 – 45 | VLMS_ID | VOLUME SET ID | 8 |
| 46 – 47 | AP_INF | AUTO PLAY INFO. | 2 |
| 48 – 51 | ASVS_SA | START ADR. OF ASVS | 4 |
| 52 – 61 | RESERVED | RESERVED | 10 |
| 62 – 63 | TS_Ns | NUMBER OF TITLE SETS | 2 |
| 64 – 95 | PVR_ID | PROVIDER UNIQUE ID | 32 |
| 96 – 127 | RESERVED | RESERVED | 32 |
| 128 – 131 | AMGI_MAT_EA | END ADR. OF AMGI_MAT | 4 |
| 132 – 191 | RESERVED | RESERVED | 60 |
| 192 – 195 | AMGM_VOBS_SA | START ADR. OF AMGM_VOBS | 4 |
| 196 – 199 | ATT_SRPT_SA | START ADR. OF ATT_SRPT | 4 |
| 200 – 203 | AOTT_SRPT_SA | START ADR. OF AOTT_SRPT | 4 |
| 204 – 207 | AMGM_PGCI_UT_SA | START ADR. OF AMGM_PGCI_UT | 4 |
| 208 – 211 | RESERVED | RESERVED | 4 |
| 212 – 215 | ATXTDT_MG_SA | START ADR. OF ATXTDT_MG | 4 |
| 216 – 255 | RESERVED | RESERVED | 40 |
| 256 – 257 | AMGM_V_ATR | VIDEO ATTRIB. OF AMGM_VOBS | 2 |
| 258 – 339 | RESERVED | RESERVED | 82 |
| 340 – 341 | AMGM_SPST_Ns | NUMBER OF SUB-PICT. STREAMS FOR AMGM | 2 |
| 342 – 347 | AMGM_SPST_ATR | SP ATTRIB. OF AMGM_VOBS | 6 |
| 348 – 349 | AMGM_AST_Ns | AUDIO STREAM NO. | 2 |
| 350 – 357 | AMGM_AST_ATR | AUDIO STREAM ATTRIB. | 8 |
| 358 – 2047 | RESERVED | RESERVED | 1690 |
| RBP=RELATIVE BYTE POSITIONS | | TOTAL BYTES | 2048 |

U.S. PATENT DOCUMENTS

| | | | | |
|---|---|---|---|---|
| 5,999,698 | A * | 12/1999 | Nakai et al. | 386/125 |
| 6,222,983 | B1 * | 4/2001 | Heo | 386/96 |
| 6,553,179 | B1 * | 4/2003 | Miwa et al. | 386/94 |
| 6,618,551 | B1 * | 9/2003 | Tanaka et al. | 386/96 |
| 6,748,160 | B1 * | 6/2004 | Otomo et al. | 386/95 |
| 2002/0041557 | A1 * | 4/2002 | Heo | 369/59.21 |

FOREIGN PATENT DOCUMENTS

| | | |
|---|---|---|
| DE | 3607562 | 9/1986 |
| DE | 3816832 | 11/1989 |
| EP | 0301809 | 2/1989 |
| EP | 0339932 | 11/1989 |
| EP | 0635835 | 1/1995 |
| EP | 0676761 | 10/1995 |
| EP | 0714098 | 5/1996 |
| EP | 0718845 | 6/1996 |
| EP | 0777227 | 6/1997 |
| EP | 0817195 | 1/1998 |
| EP | 0856849 | 8/1998 |
| JP | 8-263969 | 10/1996 |
| JP | 9-46799 | 2/1997 |
| JP | 9-259539 | 10/1997 |
| JP | 9-259572 | 10/1997 |
| JP | 2003-36656 | 2/2003 |

OTHER PUBLICATIONS

Japanese Office Action (Notification of Reasons for Rejection) re: Patent Application JP 9-358546, Mailing Date: Jul. 30, 2002, Mailing No: 250729 (with English Translation).

Chinese Office Action (Notification of the First Office Action) re: Patent Application 98803778.5, Mailing Date: Jun. 14, 2002 (with English Translation).

Explanation of Circumstances concerning Accelerated Examination for Japanese Patent Application No. 9-358546 (with English Translation).

Explanation of Circumstances concerning Accelerated Examination for Japanese Patent Application No. 2002-157588 (with English Translation).

Explanation of Circumstances concerning Accelerated Examination for Japanese Patent Application No. 2002-157589 (with English Translation).

Explanation of Circumstances concerning Accelerated Examination for Japanese Patent Application No. 2002-157590 (with English Translation).

* cited by examiner

ALBUM (ONE SIDE OF DVD-AUDIO DISC) <E.G., VOL. 1 OF WORKS. OF BEETHOVEN>

GROUP #1 (GR#1) <SYMPHONY NO. 1>
GR#2 <SYMPHONY NO. 2>
GR#2 <SYMPHONY NO. 9>

TRACK #1 <1ST MOVEMENT>
TRACK #2 <2ND MOVEMENT>
TRACK #3 <3RD MOVEMENT>
TRACK #4 <4TH MOVEMENT>

INDEX #1 <1ST PART OF 1ST MOV.>
INDEX #2 <2ND PART OF 1ST MOV.>
INDEX #i <iTH PART OF 1ST MOV.>

FIG. 9

AUDIO MANAGER INFORMATION MANAGEMENT TABLE AMGI_MAT

| RBP | SYMBOL/FILE NAME | CONTENTS | BYTES |
|---|---|---|---|
| 0 - 11 | AMG_ID | AMG IDENTIFIER | 12 |
| 12 - 15 | AMG_EA | END ADR. OF AMG | 4 |
| 16 - 27 | RESERVED | RESERVED | 12 |
| 28 - 31 | AMGI_EA | END ADR OF AMGI | 4 |
| 32 - 33 | VERN | VERSION NUMBER OF AUDIO SPEC. | 2 |
| 34 - 37 | RESERVED | RESERVED | 4 |
| 38 - 45 | VLMS_ID | VOLUME SET ID | 8 |
| 46 - 47 | AP_INF | AUTO PLAY INFO. | 2 |
| 48 - 51 | ASVS_SA | START ADR. OF ASVS | 4 |
| 52 - 61 | RESERVED | RESERVED | 10 |
| 62 - 63 | TS_Ns | NUMBER OF TITLE SETS | 2 |
| 64 - 95 | PVR_ID | PROVIDER UNIQUE ID | 32 |
| 96 - 127 | RESERVED | RESERVED | 32 |
| 128 - 131 | AMGI_MAT_EA | END ADR. OF AMGI_MAT | 4 |
| 132 - 191 | RESERVED | RESERVED | 60 |
| 192 - 195 | AMGM_VOBS_SA | START ADR. OF AMGM_VOBS | 4 |
| 196 - 199 | ATT_SRPT_SA | START ADR. OF ATT_SRPT | 4 |
| 200 - 203 | AOTT_SRPT_SA | START ADR. OF AOTT_SRPT | 4 |
| 204 - 207 | AMGM_PGCI_UT_SA | START ADR. OF AMGM_PGCI_UT | 4 |
| 208 - 211 | RESERVED | RESERVED | 4 |
| 212 - 215 | ATXTDT_MG_SA | START ADR. OF ATXTDT_MG | 4 |
| 216 - 255 | RESERVED | RESERVED | 40 |
| 256 - 257 | AMGM_V_ATR | VIDEO ATTRIB. OF AMGM_VOBS | 2 |
| 258 - 339 | RESERVED | RESERVED | 82 |
| 340 - 341 | AMGM_SPST_Ns | NUMBER OF SUB-PICT. STREAMS FOR AMGM | 2 |
| 342 - 347 | AMGM_SPST_ATR | SP ATTRIB. OF AMGM_VOBS | 6 |
| 348 - 349 | AMGM_AST_Ns | AUDIO STREAM NO. | 2 |
| 350 - 357 | AMGM_AST_ATR | AUDIO STREAM ATTRIB. | 8 |
| 358 - 2047 | RESERVED | RESERVED | 1690 |
| RBP=RELATIVE BYTE POSITIONS | | TOTAL BYTES | 2048 |

| NUMBER OF ATT | CONTENTS OF ATT | GROUP OF AOTT (AOTT_GR) | | GROUP OF ATT (ATT_GR) | |
|---|---|---|---|---|---|
| | | AOTT_SRPT | AOTT_GR NO. | ATT_SRPT | ATT_GR NO. |
| #1 | AVTT | NONE | — | FOR AVTT | GR#1 |
| #2 | AVTT&AOTT | FOR AOTT | GR#1 | FOR AVTT | |
| #3 | AVTT&AOTT | FOR AOTT | | FOR AVTT | GR#2 |
| #4 | AOTT | FOR AOTT | | FOR AOTT | |
| #5 | AOTT | FOR AOTT | GR#2 | FOR AOTT | GR#3 |
| #6 | AVTT&AOTT | FOR AOTT | | FOR AVTT | |
| #7 | AOTT | FOR AOTT | | FOR AOTT | |
| #8 | AOTT | FOR AOTT | | FOR AOTT | |
| #9 | AVTT | NONE | — | FOR AVTT | GR#4 |

AUDIO TITLE SET INFORMATION MANAGEMENT TABLE ATSI_MAT

| RBP | SYMBOL/FILE NAME | CONTENTS | BYTES |
|---|---|---|---|
| 0 - 11 | ATS_ID | ATS IDENTIFIER | 12 |
| 12 - 15 | ATS_EA | END ADR. OF ATS | 4 |
| 16 - 27 | RESERVED | RESERVED | 12 |
| 28 - 31 | ATSI_EA | END ADR OF ATSI | 4 |
| 32 - 33 | VERN | VERSION NUMBER OF AUDIO SPEC. | 2 |
| 34 - 127 | RESERVED | RESERVED | 94 |
| 128 - 131 | ATSI_MAT_EA | END ADDRESS OF ATSI_MAT | 4 |
| 132 - 191 | RESERVED | RESERVED | 60 |
| 192 - 195 | VTS_SA | START ADDRESS OF VTS FOR AOTT | 4 |
| 196 - 199 | AOTT_AOBS_SA/ AOTT_VOBS_SA | START ADDRESS OF AOBS FOR AOTT, OR START ADDRESS OF VOBS FOR AOTT | 4 |
| 200 - 203 | RESERVED | RESERVED | 4 |
| 204 - 207 | ATS_PGCIT_SA | START ADDRESS OF ATS_PGCIT | 4 |
| 208 - 255 | RESERVED | RESERVED | 48 |
| 256 - 383 | AOTT_AOB_ATR/ AOTT_VOB_ART (#0~#7) | ATTRIB. OF AOBs FOR AOTT, OR ATTRIB. OF AUDIO STREAM OF VOBs FOR AOTT | 128 |
| 384 - 671 | ATS_DM_COEFT (#0~#15) | COEFFICIENTS TO MIX DOWN AUDIO DATA WITH MULTI-CHANNEL OUTPUT TO 2-CHANNEL OUTPUT | 288 |
| 672 - 2047 | RESERVED | RESERVED | 1376 |
| RBP=RELATIVE BYTE POSITION | | TOTAL BYTES | 2048 |

FIG. 25

AUDIO TITLE SET PROGRAM INFORMATION ATS_PGI

| RBP | SYMBOL/FILE NAME | CONTENTS | BYTES |
|---|---|---|---|
| 0-3 | ATS_PG_CNT | ATS_PG CONTENTS | 4 |
| 4 | ATS_PG_EN_CN | ENTRY CELL NUMBER OF ATS_PG | 1 |
| 5 | RESERVED | RESERVED | 1 |
| 6-9 | FAC_ST_PTM | START PRESENTATION TIME OF FIRST AUDIO CELL IN ATS_PG | 4 |
| 10-13 | ATS_PG_PB_TM | ATS_PG PLAYBACK TIME | 4 |
| 14-17 | ATS_PG_PA_TM | ATS_PG PAUSE TIME | 4 |
| 18 | RESERVED | RESERVED | 1 |
| 19 | RESERVED | RESERVED | 1 |

RBP=RELATIVE BYTE POSITIONS

FIG. 27

AUDIO TITLE SET CELL PLAYBACK INFORMATION ATS_C_PBI

| RBP | SYMBOL/FILE NAME | CONTENTS | BYTES |
|---|---|---|---|
| 0 | ATS_C_IXN | INDEX NO. OF ATS_C | 1 |
| 1 | ATS_C_TY | ATS_C TYPE | 1 |
| 2-3 | RESERVED | RESERVED | 2 |
| 4-7 | ATS_C_SA | START ADDRESS OF ATS_C | 4 |
| 8-11 | ATS_C_EA | END ADDRESS OF ATS_C | 4 |

RBP=RELATIVE BYTE POSITIONS

FIG. 28

SUBSTRATE THICKNESS AS A FUNCTION OF REFRACTIVE INDEX FOR SINGLE LAYERED SIDE

THICKNESS OF SUBSTRATE/SPACE LAYER AS A FUNCTION OF REFRACTIVE INDEX FOR DUAL LAYERED SIDE

SYSTEM OF SHARING OBJECTS HAVING A PLURALITY OF CONTENTS

This application is a division of application Ser. No. 09/380,067 filed Aug. 25, 1999 now U.S. Pat. No. 6,748,160, which was filed as PCT application No. PCT/JP98/05908 filed on Dec. 25, 1988.

TECHNICAL FIELD

The present invention relates to a system for sharing objects of a plurality of contents (various video contents, various audio contents, and the like).

BACKGROUND ART

Also, the present invention relates to an information medium having management data for sharing objects of a plurality of contents, an apparatus for playing back information recorded on the medium, a method of recording information containing the management data on the medium, and a method of playing back information from the medium on the basis of the management data.

As optical discs that can record video (moving picture) data with high quality and at high density, and can record various kinds of information such as multiangle video data, sub-picture data, multilingual audio data, multichannel audio data, and the like, DVD video discs have been developed, and are beginning to be put into the market (DVD is an abbreviation for a digital versatile disc).

The DVD video disc standards can support compressed multichannel audio (AC-3, MPEG, and the like) and non-compressed linear PCM (from a sampling rate of 48 kHz/16 quantization bits to a sampling rate of 96 kHz/24 quantization bits). Linear PCM of DVD video has high-sound quality specifications with high sampling rate and high quantization bits superior to conventional music CDs (a sampling rate of 44.1 kHz/16 quantization bits). Especially, linear PCM having a sampling rate of 96 kHz/20 to 24 quantization bits qualifies for the next generation digital audio discs (so-called super CDs or super audio discs).

However, DVD video specifications give priority to video over audio, and audio priority specifications superior to audio specifications of DVD video in terms of not only the sampling frequency and the number of quantization bits but also the number of recordable channels, recordable time, and the like, are yet to come.

To meet such demand, DVD audio specifications are being explored (however, the DVD audio specifications are not yet a prior art). The DVD audio specifications can support up to linear PCM having a sampling rate of 192 kHz and 24 quantization bits as well as linear PCM having a sampling rate of 48 kHz to 96 kHz and 16 to 24 quantization bits. In the future version up of DVD audio specifications, higher-sound quality specifications may be introduced.

DVD audio can cope with such future scale-up since it can commonly use some specifications of DVD video capable of large-amount recording that includes even digital Hi-Vision video as a target.

Also, DVD audio can take future technical, market, and economic advantages that will become available along with the improvement of DVD video.

For example, when a large-amount DVD disc which will be available in the future in DVD video is used in DVD audio, the sampling frequency, the number of quantization bits, the number of recording channels, and the like used in recording can be increased considerably if the recording time remains the same. The technique of a DVD video recorder which will be put into the market in the near future and uses a DVD-RAM (or rewritable DVD-RW or write-once DVD-R) can be used in a DVD audio recorder that will become available soon.

Furthermore, if the market scale expands as DVD video prevails, media (DVD-ROM discs, DVD-RAM/DVD-RW discs, DVD-R discs, and the like), components (disc drive, optical pickup, various ICs, and the like), various control programs, and the like are standardized, and a cost reduction of DVD audio products having many features and high sound quality is promoted. With the spread of DVD audio, DVD video can also take future technical, market, and economical advantages that will become available along with the improvement of DVD audio.

As a management method for controlling playback of video (moving picture) or audio (music or the like) contents, it is a common practice to manage playback of contents produced according to their purposes. By contrast, with recent diversification of users' requirements, video and music have vague boundary, and requirements for partly using the contents that can be independently played back as video in music or for commonly using contents by allowing video created for music to be played back as video alone are increasing among producers of these contents (contents providers).

The DVD audio specifications according to the present invention can meet such requirements of the contents providers. More specifically, the DVD audio specifications normally give priority to audio over video, but it is possible to build a system compatible with both DVD video and DVD audio. That is, the DVD audio specifications can provide an audio only disc (A disc) including DVD audio contents alone, and an audio+video disc (AV disc) including both audio and video contents. In such case, upon playing back the audio contents of an AV disc, its video contents can also be accessed.

In the DVD audio specifications according to the present invention, not only video picture data as subsets of the DVD video specifications, but also high-resolution still picture data, text information, and menu data (visual menu data that can be freely designed by the contents provider) can be added to audio data with high-sound quality specifications.

DISCLOSURE OF INVENTION

It is the first object of the present invention to provide a digital information medium which can access not only DVD audio information but also part (e.g., some video data) of DVD video information in the aforementioned DVD audio specifications.

It is the second object of the present invention to provide an apparatus for playing back information from the digital information medium.

It is the third object of the present invention to provide a method of recording information on the digital information medium.

It is the fourth object of the present invention to provide a method of playing back information from the digital information medium.

In order to achieve the first object, in a digital information medium according to the present invention, first and second contents (ATS, VTS) for different purposes are recorded on a plurality of independent areas (DVD audio zone, DVD video zone). The first and second contents (ATS, VTS) respectively have first and second management blocks (AMG, VMG) to manage playback of their contents. The first management block (AMG) has first information (AMGI) for managing accesses to both the first contents (ATS) and second contents (VTS).

In the medium of the first object, the second management block (VMG) may have second information (VMGI) for managing accesses to the second contents (VTS).

In the medium of the first object, the first management block (AMG) has physically or logically smaller address numbers than the second management block (VMG) or the second contents (VTS).

In the medium of the first object, the first contents (ATS#1) may include information (link information) for accessing the second contents (VTS).

In the medium of the first object, files of recorded information may be managed by a hierarchical file structure including the following sub-directories and root directory. That is, recorded information files can be managed by: a first sub-directory (ATS directory) including a data file (ATS_01_0.AOB) for storing the first contents (ATS) and a data file (AUDIO_TS.IFO) for storing the first information (AMGI); a second sub-directory (VTS directory) including a data file (VTS_01_1.VOB) for storing the second contents (VTS) and a data file (VIDEO_TS.IFO) for storing the second information (VMGI); and a root directory containing the first sub-directory (ATS directory) and the second sub-directory (VTS directory).

In the medium of the first object, the data file (ATS_01_0.AOB) in the first directory (ATS directory) may be formed by objects (AOTT) which contain at least audio data but do not contain video data); and the data file (VTS_01_1.VOB) in the second sub-directory (VTS directory) may be formed by objects (VTS) which contain video data.

In the medium of the first object, the first information (AMGI) may contain first search information (ATT_SRP for AOTT) for accessing the objects (AOTT) which contain audio data but do not contain any video data, and second search information (ATT_SRP for AVTT) for accessing the objects (VTS) containing video data.

In the medium of the first object, the second information (VMGI) may contain search information (ATT_SRP for AVTT) for accessing only the objects (VTS) containing video data.

In order to achieve the first object, an optical disc according to the present invention has a lead-in area (27) at the center, and a volume space (28) and lead-out area (26) in turn around the lead-in area; the volume space (28) contains an audio zone (71) and then a video zone (72); the audio zone (71) contains audio management information (AMG) and audio contents (ATS); and the video zone (72) contains video management information (VMG) and video contents (VTS). In this optical disc, the audio contents (ATS) and video contents (VTS) can contain data cells (VTS_C#2 and the like) which are commonly managed by the audio management information (AMG).

In the optical disc of the first object, the video contents (VTS) can contain data cells (VTS_C#2 and the like) managed by the video management information (VMG), and each of the data cells (VTS_C#2 and the like) managed by the audio management information (AMG) or video management information (VMG) can be formed by a set of data packs each having a predetermined size (2,048 bytes).

Furthermore, in order to achieve the first object, another optical disc according to the present invention has a lead-in area (27) at the center, and a volume space (28) and lead-out area (26) in turn around the lead-in area; the volume space (28) contains an audio zone (71) and then a video zone (72); the audio zone (71) contains audio management information (AMG) and audio contents (ATS); and the video zone (72) contains video management information (VMG) and video contents (VTS). In this optical disc, the audio contents (ATS) contain one or more data cells (audio cell, picture cell, silent cell) managed by the audio management information (AMG), and each data cell (audio cell, picture cell, silent cell) is formed by a set of one or more data packs (A_PCK, SPCT_PCK, and the like) each having a predetermined size (2,048 bytes).

In the other optical disc of the first object, at least one data cell (audio cell) can be formed by packs (A_PCK) of audio information.

In the other optical disc of the first object, at least one data cell (silent cell) can be formed by packs (A_PCK) of audio information consisting-of silent information.

In the other optical disc of the first object, the audio contents (ATS) may contain audio title set information (ATSI) for managing its contents, the audio title set information (ATSI) may contain program chain information (ATS_PGCI in ATS_PGCIT) for managing one or more programs (PG#) that form the audio contents (ATS), and the program chain information (ATS_PGCI) may contain information (ATS_C_SA, ATS_C_EA in FIG. 28) indicating the recorded positions of the data cells (audio cell, picture cell, silent cell).

In the other optical disc of the first object, the audio contents (ATS) can contain an audio title set (ATT or AVTT) which includes information pertaining to both audio and video, and an audio only title set (AOTT) which includes information pertaining to only audio.

In the other optical disc of the first object, the audio management information (AMG) can contain information (ATT_SRPT in FIG. 20, the location of which is specified by ATT_SRPT_SA in AMGI_MAT in FIG. 18) of a search pointer (ATT_SRP) for accessing the audio title set (ATT).

In the other optical disc of the first object, the audio management information (AMG) can contain information (AOTT_SRPT in FIG. 20, the location of which is specified by AOTT_SRPT_SA in AMGI_MAT in FIG. 18) of a search pointer (AOTT_SRP) for accessing the audio only title set (AOTT).

In the other optical disc of the first object, the audio contents (ATS) can contain audio data (AOTT_AOB) digitally converted by a predetermined sampling frequency (e.g., 192 kHz) selected from a plurality of different sampling frequencies (48 kHz, 96 kHz, 192 kHz, and the like) and a predetermined number of quantization bits (e.g., 20 bits) selected from a plurality of different numbers of quantization bits (16 bits, 20 bits, 24 bits, and the like), and attribute information (AOTT_AOB_ATR in FIG. 25 included in ATSI in FIG. 24) indicating the predetermined sampling frequency (e.g., 192 kHz) and the predetermined number of quantization bits (e.g., 20 bits) used for this audio data (AOTT_AOB).

In order to achieve the second object, a playback apparatus according to the present invention has an audio management block (AMG) for managing audio contents (ATS) and their playback, and a video management block (VMG) for managing video contents (VTS) and their playback, the audio management block (AMG) plays back the audio contents (ATS) or video contents (VTS) from a digital information medium (AV disc 10) containing audio management information (AMGI) for managing accesses to the audio contents (ATS) and video contents (VTS). This playback apparatus comprises: management information extraction means (30, 50 to 54) for extracting contents (ATT_SRP in FIG. 20) of the audio management information (AMGI)

from the digital information medium (10); audio contents extraction means (30, 50 to 54, 60) for extracting contents (audio cells and the like in FIG. 7) of the audio contents (ATS) on the basis of the contents (ATT_SRP for AOTT in FIG. 20) of the audio management information (AMGI); and video contents extraction means (30, 50 to 54, 58) for extracting contents (video cells in FIG. 8) of the video contents (VTS) on the basis of other contents (ATT_SRP for AVTT in FIG. 20) of the audio management information (AMGI).

The playback apparatus of the second object can play back a digital information medium (AV disc 10) which contains audio data (AOTT_AOB) digitally converted by a predetermined sampling frequency (e.g., 192 kHz) selected from a plurality of different sampling frequencies (48 kHz, 96 kHz, 192 kHz, and the like) and a predetermined number of quantization bits (e.g., 20 bits) selected from a plurality of different numbers of quantization bits (16 bits, 20 bits, 24 bits, and the like), and attribute information (AOTT_AOB_ATR in FIG. 25 included in ATSI in FIG. 24) indicating the predetermined sampling frequency (e.g., 192 kHz) and the predetermined number of quantization bits (e.g., 20 bits) used for this audio data (AOTT_AOB). In this playback apparatus, the management information extraction means (50) detects the predetermined sampling frequency (e.g.r 192 kHz) and the predetermined number of quantization bits (e.g., 20 bits) from the attribute information (AOTT_AOB_ATR), and the apparatus further comprises display means (4B) for displaying (the right end on FL display unit 4B in FIG. 30) the detected predetermined sampling frequency (e.g., 192 kHz) and predetermined number of quantization bits (e.g., 20 bits).

In order to achieve the third object, in a recording method according to the present invention, upon recording information on an information recording medium (10) having a volume space (28) including an audio zone (71) and video zone (72) located after the audio zone (71), audio management information (AMG) and audio contents (ATS) are recorded on the audio zone (71), and video management information (VMG) and video contents are recorded on the video zone (72).

In order to achieve the fourth object, in a playback method according to the present invention, upon playing back information from an information recording medium (10) on which an audio zone (71) which records audio management information (AMG) and audio contents (ATS), and a video zone (72) which records video management information (VMG) and video contents (VTS) are recorded, the audio contents (ATS) or video contents (VTS) are accessed on the basis of the audio management information (AMG) to play back their contents, and the video contents are accessed on the basis of the video management information (VMG) to play back their contents.

BRIEF DESCRIPTION OF DRAWINGS

FIG. 9 is a view for explaining an example of the data structure of the user accessible DVD audio recording contents recorded on one face of the optical disc shown in FIG. 1;

FIG. 18 is a view for explaining the recording contents of an audio manager information management table (AMGI_MAT) included in the audio manager information (AMGI) shown in FIG. 17;

FIG. 23 is a view for explaining the relationship between an audio only title group (AOTT_GR) accessed by the audio only search pointer (AOTT_SRP) in the audio manager information (AMGI) shown in FIG. 17, and an audio title group (ATT_GR) accessed by the audio title search pointer (ATT_SRP) in that audio manager information (AMGI);

FIG. 25 is a view for explaining the recording contents of audio title set information management table (ATSI_MAT) included in audio title set information (ATSI) shown in FIG. 24;

FIG. 27 is a view for explaining the contents of audio title set program information (ATS_PGI) shown in FIG. 26;

FIG. 28 is a view for explaining the contents of audio title set cell playback information (ATS_C_PBI) shown in FIG. 26;

BEST MODE OF CARRYING OUT THE INVENTION

A digital information recording/playback system according to an embodiment of the present invention will be described hereinafter with reference to the accompanying drawings.

Figure 1:
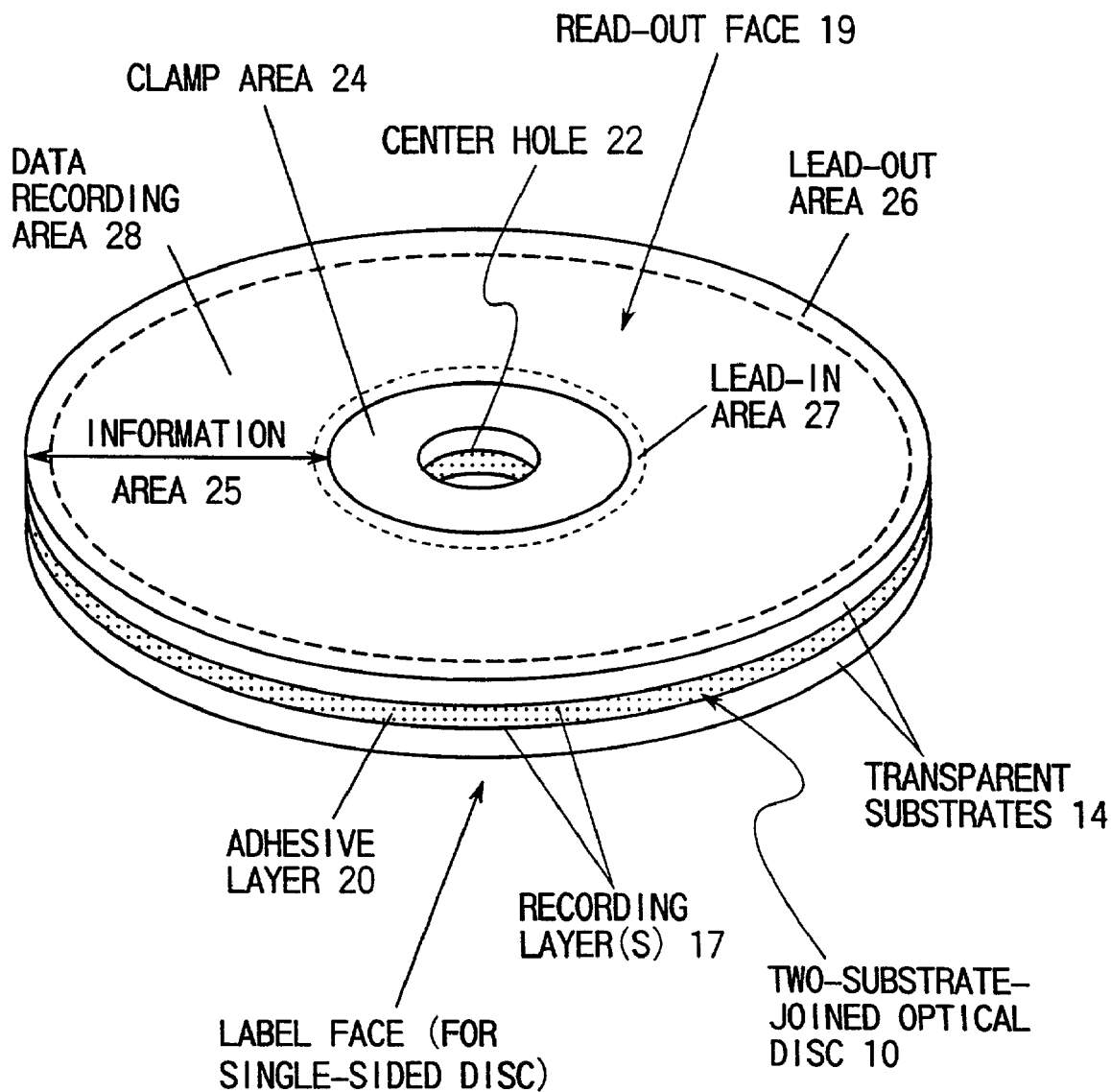
FIG. 1 is a perspective view for explaining the structure of an optical disc which can be used as a recording medium of DVD audio.

FIG. 1 is a perspective view for explaining the structure of an optical disc that can be used as a recording medium of DVD audio.

As shown in FIG. 1, this optical disc 10 has a structure obtained by adhering a pair of transparent substrates 14 each having recording layer 17 using adhesive layer 20. Each substrate 14 can be formed of a 0.6-mm thick polycarbonate film, and adhesive layer 20 can consist of a very thin (e.g., 40 to 70 μm thick) ultraviolet setting resin. When the pair of 0.6-mm thick substrates 14 are adhered to each other so that their recording layers 17 contact each other on the faces of adhesive layer 20, a 1.2-mm thick large-amount optical disc 10 is obtained.

Optical disc 10 has center hole 22, and clamp areas 24 used for clamping optical disc 10 upon its rotation are formed around center hole 22 on the two faces of the disc. Center hole 22 receives the spindle of a disc motor when disc 10 is loaded into a disc drive (not shown). Optical disc 10 is clamped at its clamp areas 24 by a disc clamper (not shown).

Optical disc 10 has information areas 25 that can record video data, audio data, and other information around clamp areas 24.

Each information area 25 has lead-out area 26 on its outer periphery side, and lead-in area 27 on its inner periphery side that contacts clamp area 24. The area between lead-out and lead-in areas 26 and 27 is defined as data recording area 28.

On recording layer (optical reflection layer) 17 of information area 25, a recording track is continuously formed in, e.g., a spiral pattern. The continuous track is divided into a plurality of physical sectors, which have serial numbers. Various data are recorded on optical disc 10 using these sectors as recording units.

Data recording area 28 serves as an actual data recording area, and includes an audio data recording area, and DVD video data recording area. (In case of a pure audio disc, the DVD video data recording area may not be used.)

The DVD audio data recording area mainly records audio data as pit trains (physical shapes or phase states that bring about change in optical conditions) as recording/playback information. In some cases, the DVD audio data recording area may record still picture data. The audio data recorded on this DVD audio data recording area can contain silent data (not a silent part of music but data which does not produce any sound intentionally) in addition to normal music data.

On the other hand, the DVD video data recording area records, as recording/playback information, video data (main picture data) such as a movie or the like, sub-picture data such as superimposed dialogs, menus, and the like, and audio data such as words, effect sounds, and the like as similar pit trains.

When optical disc 10 is a double-sided recording RAM disc (or a rewritable disc; DVD-RW disc) in which each face has one recording layer, each recording layer 17 can be formed by three layers, i.e., by sandwiching a phase-change recording material layer (e.g., $Ge_2Sb_2Te_5$) between two zinc sulfide-silicon oxide ($ZnS.SiO_2$) mixture layers.

When optical disc 10 is a single-sided recording RAM disc in which each face has one recording layer, recording layer 17 on the side of read-out face 19 can be formed by three layers including the phase-change recording material layer. In this case, layer 17 on the side opposite to read-out face 19 need not be an information recording layer but may merely be a dummy layer.

When optical disc 10 is a one-side read type double-layered RAM/ROM disc, two recording layers 17 can comprise a single phase-change recording layer (on the side further from read-out face 19; read/write), and a single semi-transparent metal reflection layer (on the side closer to read-out face 19; read-only).

When optical disc 10 is a write-once DVD-R, a polycarbonate substrate is used, gold can be used as a reflection layer (not shown), and an ultraviolet setting resin can be used as a protection layer (not shown). In this case, an organic dye is used in recording layer 17. As the organic dyes, cyanine, squarilium, chroconic, and triphenylmenthane dyes, xanthene and quinone dyes (naphthoquinone, anthraquinone, and the like), metal complex dyes (phthalocyanine, porphyrin, dithiol complex, and the like), and so forth can be used.

Data can be written on such DVD-R disc using a semiconductor laser having a wavelength of 650 nm and an output of about 6 to 12 mW.

When optical disc 10 is a one-side read type double-layered ROM disc, two recording layers 17 can be comprised of a single metal reflection layer (on the side further from read-out face 19) and a single semi-transparent reflection layer (on the side closer to read-out face 19).

In case of read-only DVD-ROM disc 10, pit trains are pre-formed by a stamper on substrate 14, and a reflection layer of, e.g., a metal, is formed on that face of substrate 14, which is formed with pit trains. The reflection layer is used as recording layer 17. In such DVD-ROM disc 10, no grooves serving as recording tracks are especially formed, and the pit trains formed on the face of substrate 14 serve as tracks.

In various types of optical discs 10 described above, read-only ROM information is recorded on recording layer 17 as an embossed pattern signal. By contrast, no such embossed pattern signal is formed on substrate 14 having read/write (or write-once) recording layer 17, and a continuous groove is formed instead. A phase-change recording layer is formed on such groove. In case of a read/write DVD-RAM disc, the phase-change recording layer in land portions is also used for information recording in addition to the groove.

When optical disc 10 is of one-side read type (independently of one or two recording layers), substrate 14 on the rear side viewed from read-out face 19 need not always be transparent to the read/write laser beam used. In this case, a label may be printed on the entire face of substrate 14 on the rear side.

Figure 2:
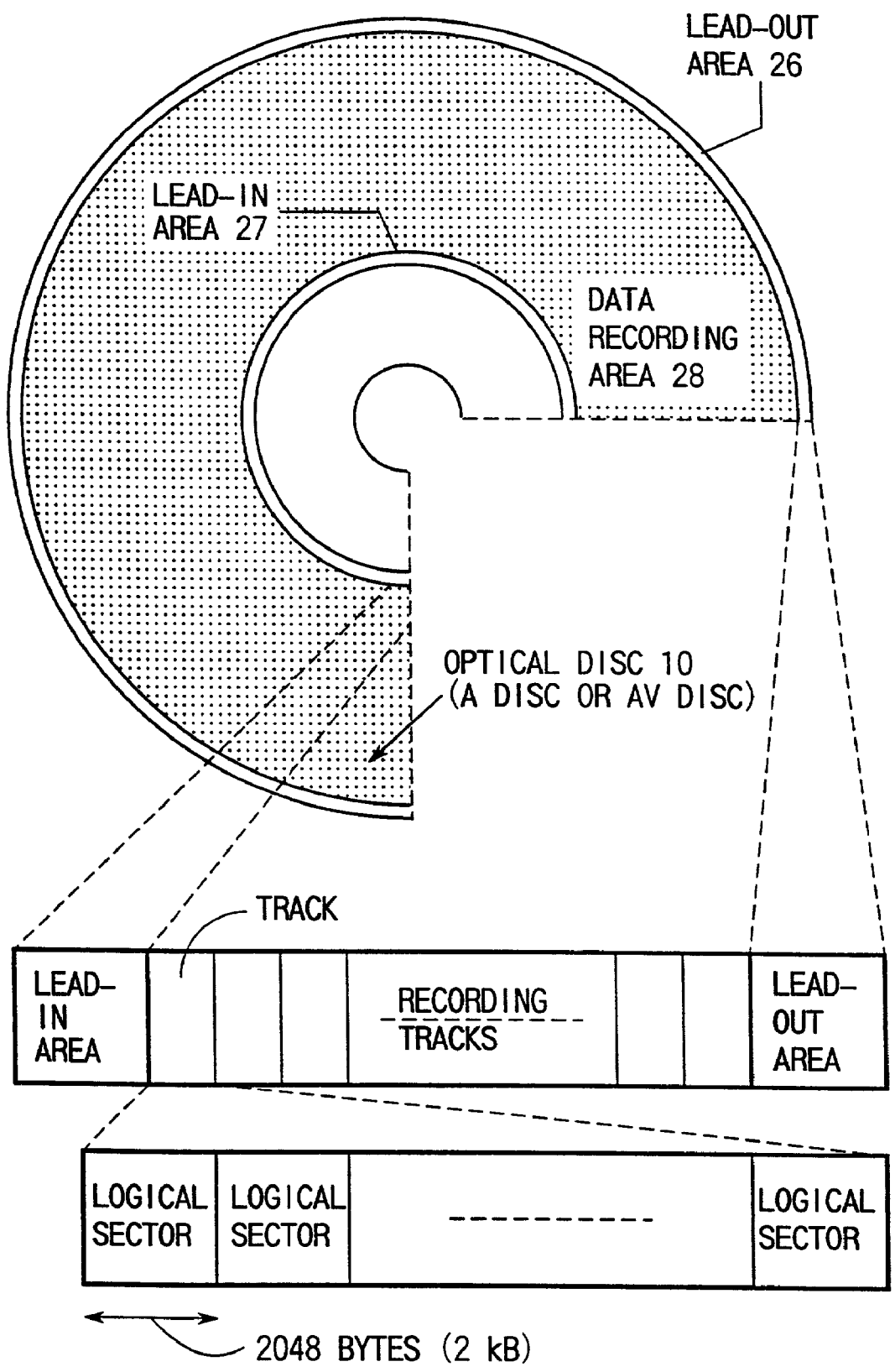
FIG. 2 is a view for explaining the correspondence between a data recording area and recording tracks of data recorded there in the optical disc shown in FIG. 1.

FIG. 2 is a view for explaining the correspondence between data recording area 28 and recording tracks of data recorded there on optical disc 10 shown in FIG. 1.

When disc 10 is a DVD-RAM (or DVD-RW), disc 10 itself is stored in a cartridge (not shown) to protect its delicate disc surface. When DVD-RAM disc 10 in the cartridge is inserted into the disc drive of a DVD player (FIGS. 29 and 30), disc 10 is pulled out from the cartridge, is clamped by the turntable of a spindle motor (not shown), and is rotated to face an optical head (not shown).

On the other hand, when disc 10 is a DVD-R or DVD-ROM, disc 10 itself is not stored in the cartridge, and bare disc 10 is directly set on the disc tray of a disc drive.

Recording layer 17 of information area 25 shown in FIG. 1 is formed with a continuous data recording track in a spiral pattern. The continuous track is divided into a plurality of logical sectors (minimum recording units) each having a given storage amount, as shown in FIG. 2, and data are recorded with reference to these logical sectors. The recording amount per logical sector is determined to be 2,048 bytes (or 2 kbytes) which are equal to the data length of one pack.

Data recording area 28 is an actual data recording area, which records management data and audio data for DVD audio, and similarly records management data, main picture (video) data, sub-picture data, and audio data for DVD video.

When disc 10 shown in FIG. 2 is a DVD-RAM disc, its data recording area 28 can be divided into a plurality of ring-shaped (annular) recording areas (a plurality of recording zones), although not shown. The angular velocity upon rotation of the disc varies in units of recording zones. However, within each zone, a constant linear or angular velocity can be set. When disc 10 shown in FIG. 2 is a DVD-ROM disc, various data are recorded on the entire data recording area 28 at a constant linear velocity.

Figure 3:
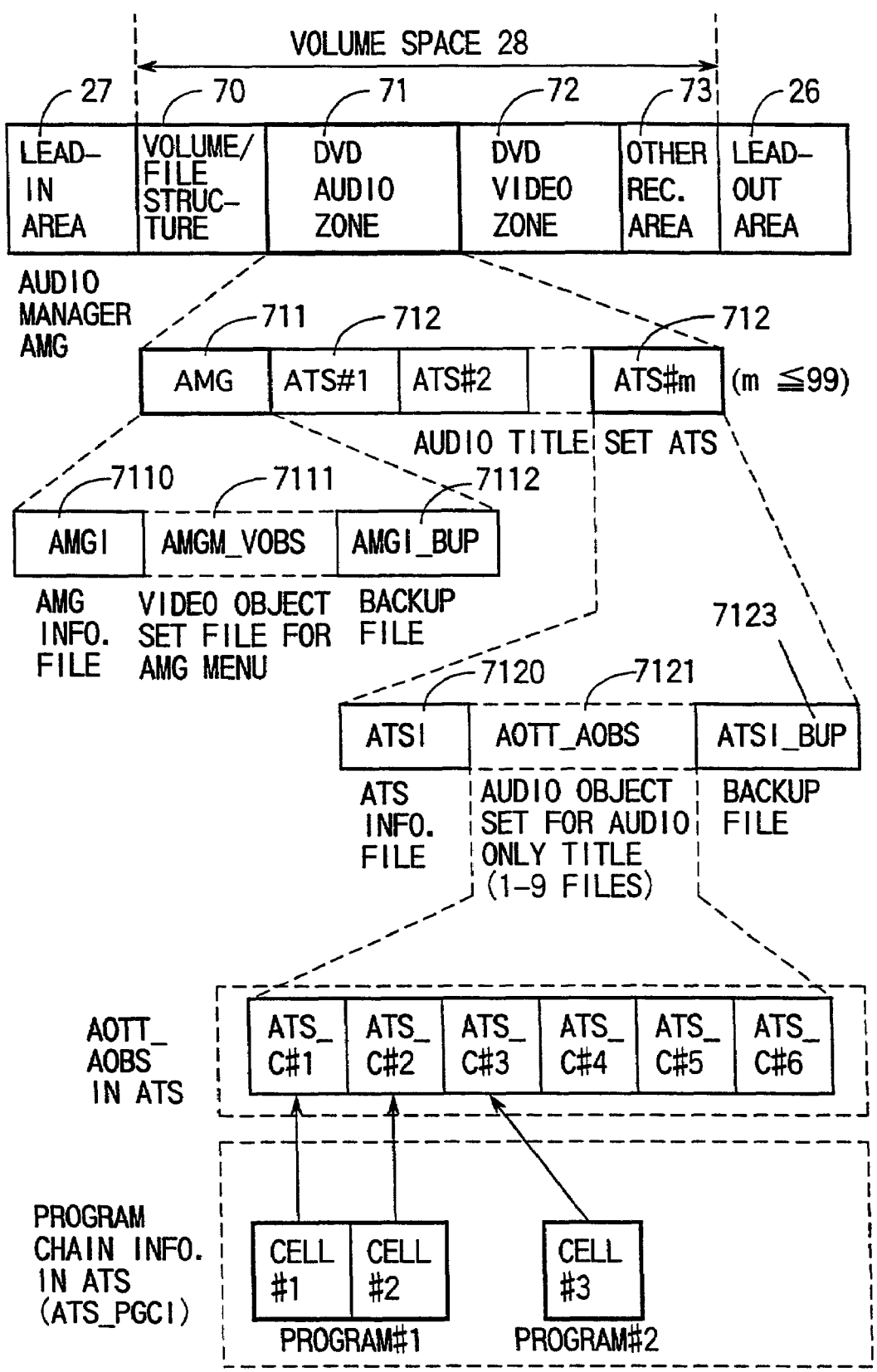
FIG. 3 is a view for explaining the hierarchical structure of information recorded in a DVD audio zone of various kinds of information recorded on the optical disc shown in FIG. 2.

FIG. 3 is a view for explaining the hierarchical structure of information recorded in the DVD audio zone of various kinds of information recorded on optical disc 10 shown in FIG. 2.

Data recording area 28 formed on optical disc 10 shown in FIG. 2 has a structure, as shown in FIG. 3. The logical format of this structure is defined to comply with, e.g., the Universal Disc Format (UDF) Bridge (a hybrid of UDF and ISO9660) as one of standard formats.

Data recording area 28 between lead-in area 27 and lead-out area 26 is assigned as a volume space. Volume space 28 can include a space for information of the volume and file structures (volume/file structure 70), a space for the application of the DVD format (DVD audio zone 71 and DVD video zone 72), and a space for an application other than that of this format (other recording area 73).

Volume space 28 is physically divided into a large number of sectors, and these physical sectors have serial numbers. The logical addresses of data recorded on this volume space (data recording area in FIG. 2) 28 mean logical sector numbers, as defined by the UDF Bridge. The logical sector size in this space is 2,048 bytes (or 2 kbytes) as in the physical sector size. The logical sector numbers are assigned serial numbers in ascending order of physical sector numbers.

Unlike the logical sectors, each physical sector is added with redundant information such as error correction information and the like. For this reason, the physical sector size does not strictly match the logical sector size.

As shown in FIG. 3, volume space 28 includes volume/file structure area 70, DVD audio zone 71, DVD video zone 72, and other recording area 73. These areas (70 to 73) are split up on the boundaries of logical sectors in FIG. 2. Note that one logical sector is defined to be 2,048 bytes, and one logical block is also defined to be 2,048 bytes. Hence, one logical sector is defined equivalently with one logical block.

Figure 29:
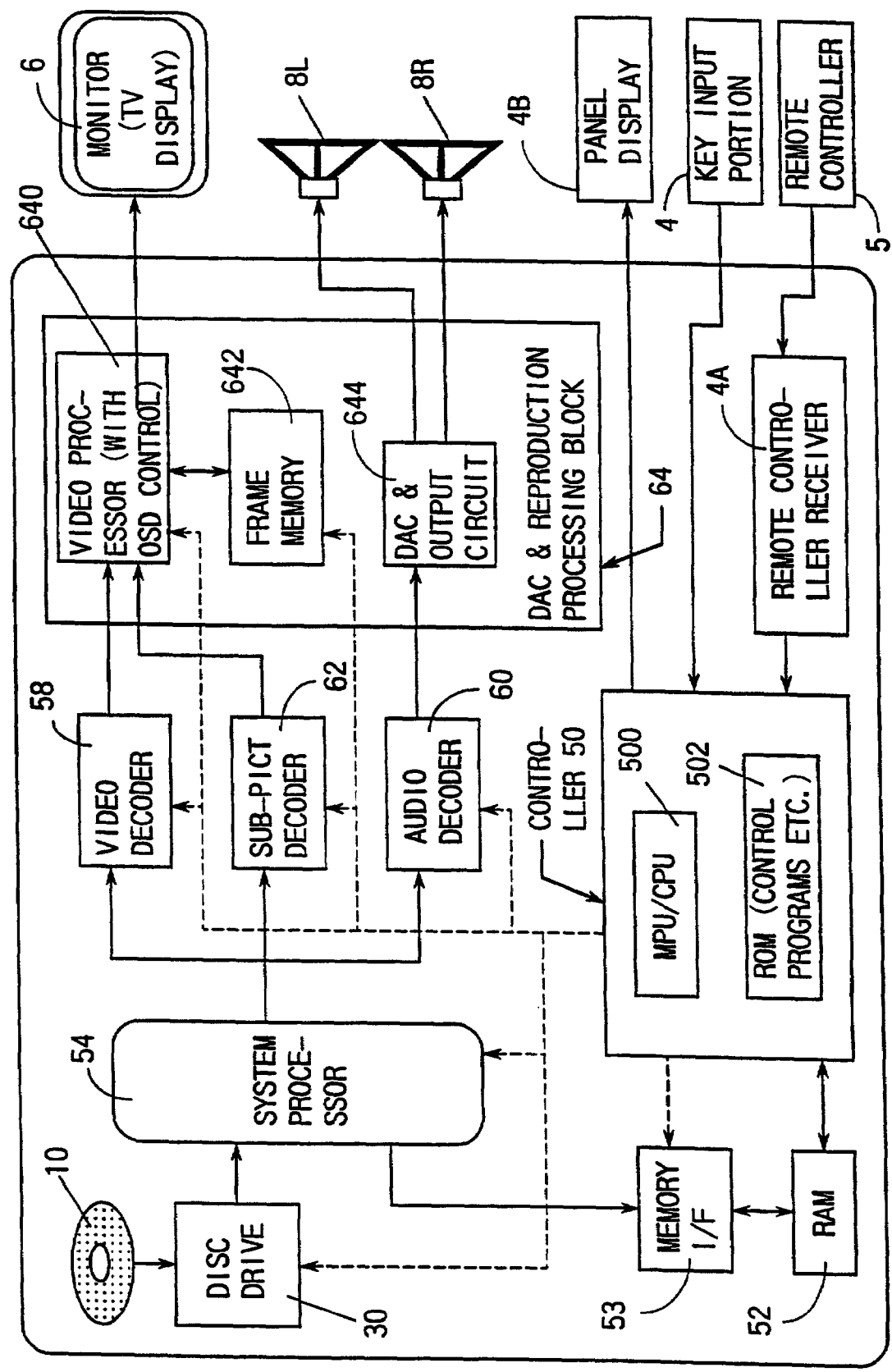
FIG. 29 is a block diagram showing an example of an apparatus for playing back information recorded in the audio zone shown in FIG. 3 or the video zone shown in FIG. 4 from the optical disc shown in FIG. 1.

Volume/file structure area 70 corresponds to a management area defined by the UDF Bridge. Based on the description of this area 70, the contents of audio manager 711 are stored in an internal system memory of the DVD player (FIG. 29; to be described later).

DVD audio zone 71 consists of audio manager (AMG) 711 and one or more audio title sets (ATS#m) 712 (the maximum number m of audio title sets is 99).

AMG 711 is comprised of audio manager information (AMGI) file 7110, video object set (AMGM_VOBS) file 7111 for an audio manager menu, and audio manager information backup (AMGI_BUP) file 7112. Note that AMGM_VOBS 7111 is an optional file, and is not present in some cases.

Each ATS 712 is comprised of audio title set information (ATSI) file 7120, audio object set (AOTT_AOBS) file 7121 for an audio only title, and audio title set information backup (ATSI_BUP) file 7123. Note that AOTT_AOBS 7121 consists of one to nine files, which are optional files and are not present in some cases.

As will be described later with reference to FIG. 6, AOTT_AOBS 7121 defines a set of one or more audio objects AOB. Each AOB defines a set of one or more audio title set cells (ATS_C#). A set of one or more cells make up an audio title set program, and a set of one or more programs make up audio title set program chain PGC.

Considering one PGC as a single opera, a plurality of cells that form this PGC can be explained as music pieces or song parts of various scenes in that opera. The contents of this PGC (or the contents of each cell) are determined by the software provider who produces the contents recorded on disc 10. More specifically, the provider can program to play back cells that form AOTT_AOBS 7121 using cell playback information ATS_C_PBI written in program chain information ATS_PGCI in ATS as he or she intended. (ATS_PGCI and ATS_C_PBI will be explained later with reference to FIGS. 24 to 28.)

Other recording area 73 can record information that can be used in video title sets VTS 72 mentioned above or other kinds of information that do not pertain to video title sets. This area 73 is not mandatory, and may be deleted if it is not used.

Figure 4:
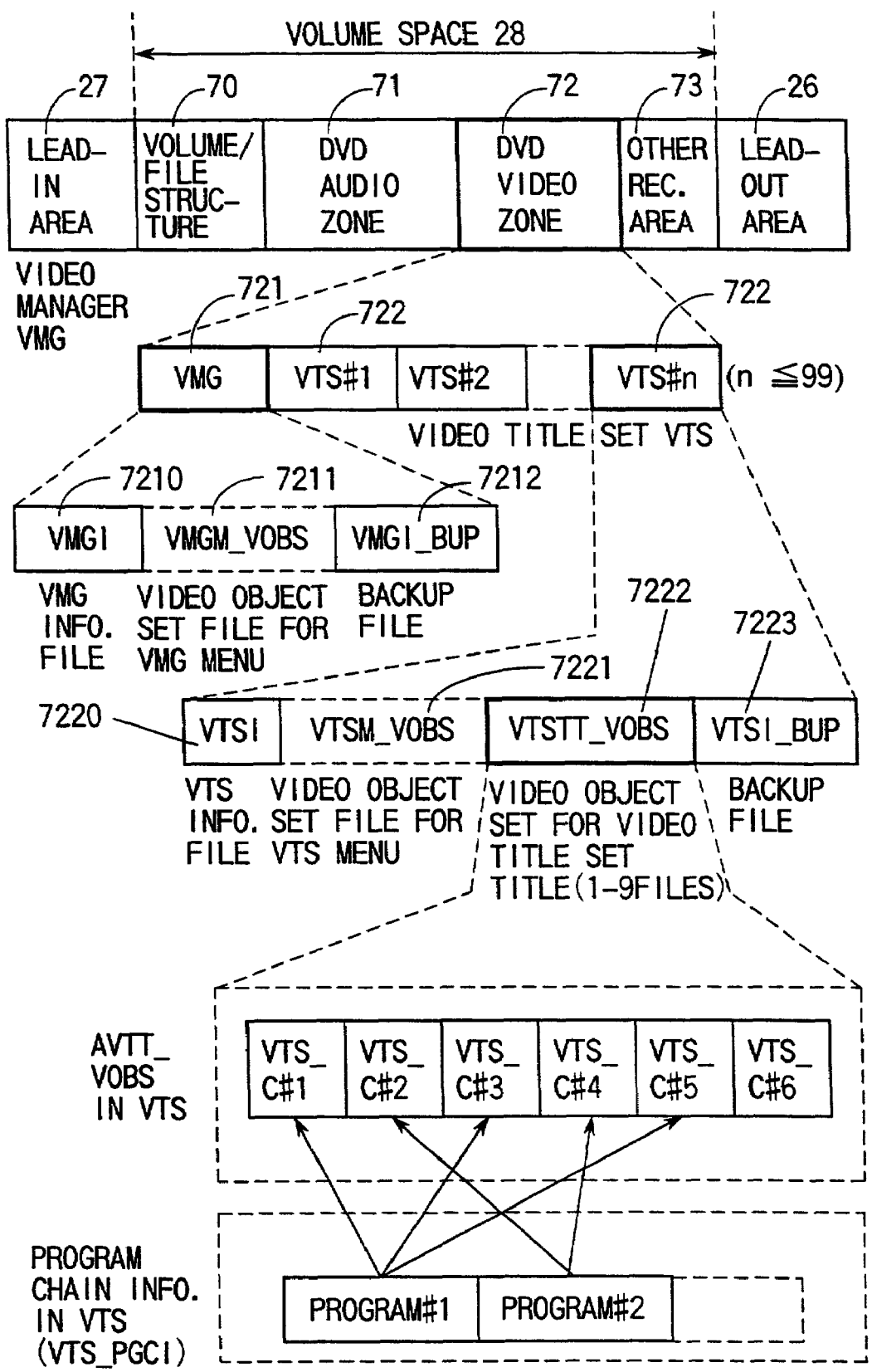
FIG. 4 is a view for explaining the hierarchical structure of information recorded in a DVD video zone of various kinds of information recorded on the optical disc shown in FIG. 2.

FIG. 4 is a view for explaining the hierarchical structure of information recorded in the DVD video zone of various kinds of information recorded on the optical disc shown in FIG. 2. An explanation pertaining to DVD video zone 72 will be given below except for that already described with reference to FIG. 3.

Based on the description of volume/file structure area 70, the contents of video manager 721 are stored in the internal system memory of the DVD player (FIG. 29; to be described later).

DVD video zone 72 is comprised of video manager (VMG) 721 and one or more video title sets (VTS#n) 722 (the maximum number n of video title sets is 99).

VMG 721 consists of video manager information (VMGI) file 7210, video object set (VMGM_VOBS) file 7221 for a video manager menu, and video manager information backup (VMGI_BUP) file 7212. Note that VMGM_VOBS 7211 is an optional file, and is not present in some cases.

Each VTS 722 is comprised of video title set information (VTSI) file 7220, video object set (VTSM_VOBS) file 7221 for a video title set menu, video object set (VTSTT_VOBS) file 7222 for a video title set title, and video title set information backup (VTSI_BUP) file 7223. Note that VTSM_VOBS 7221 is an optional file, and is not present in some cases.

Each video title set VTS 72 stores video data (video pack to be described later) compressed by MPEG, audio data compressed by a predetermined format or uncompressed audio data (audio pack), runlength-compressed sub-picture data (sub-picture pack to be described later; including bitmap data, each pixel of which is defined by a plurality of bits), and also information for playing back these data (navigation pack to be described later; including presentation control information and data search information).

As will be described later with the aid of FIG. 8, VTSTT_VOBS 7222 defines a set of one or more video objects VOB. Each VOB defines a set of one or more video title set cells (VTS_C#). A set of one or more cells make up a video title set program, and a set of one or more programs make up a video title set program chain.

Assuming that one PGC corresponds to one drama, a plurality of cells that make up this PGC can correspond to various scenes in that drama. The contents of the PGC (or those of cells) are determined by, e.g., a software provider who produces the contents recorded on disc 10. More specifically, as in ATS_PGCI described above with reference to FIG. 3, the provider can program to play back cells that form VTSTT_VOBS 7222 using cell playback information (not shown) written in program chain information VTS_PGCI in VTS as he or she intended.

Figure 5:
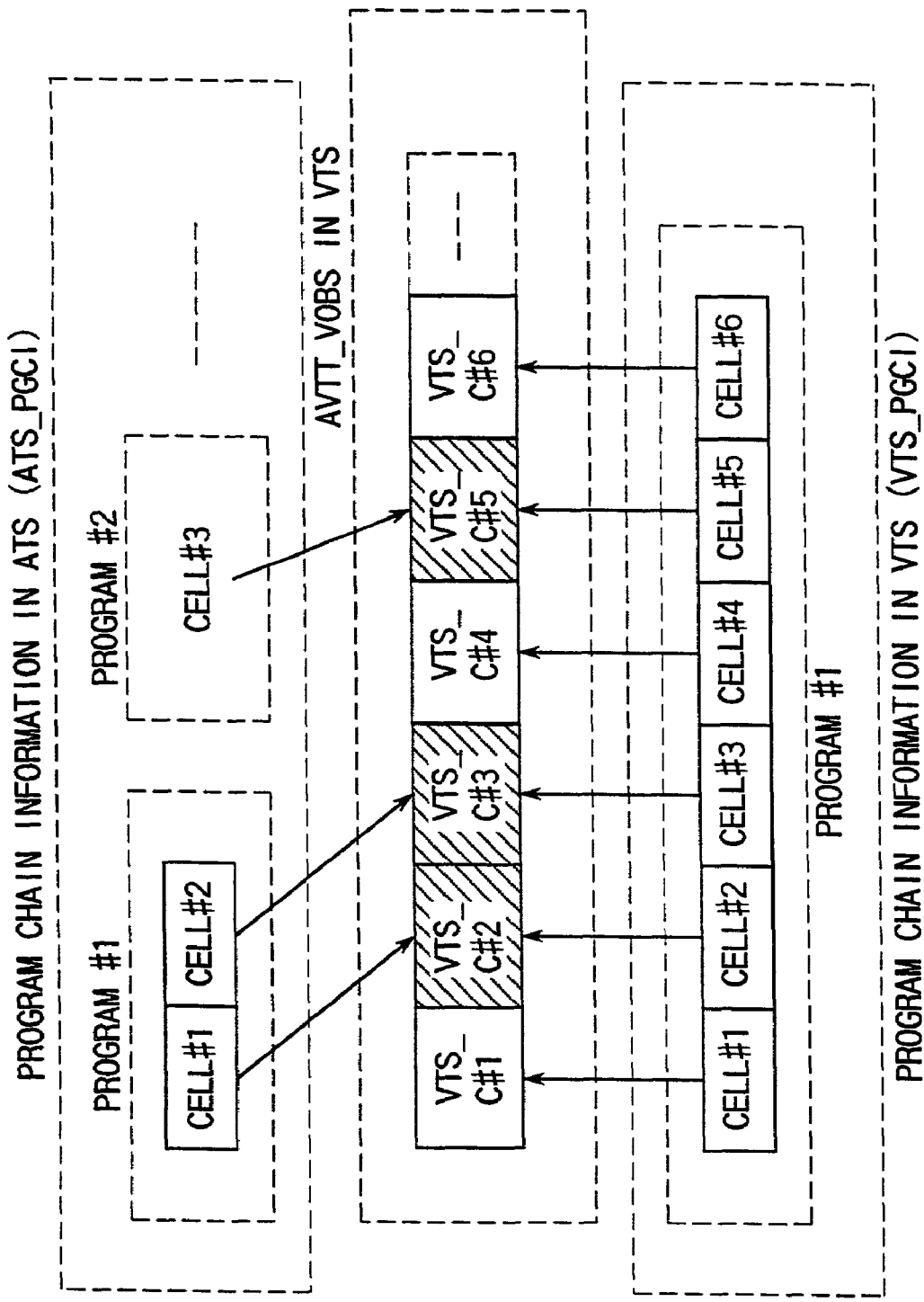
FIG. 5 is a view for explaining an example of video information (VTS_C#2 or the like) which is commonly accessed from both program chain information (ATS_PGCI) in the DVD audio zone in FIG. 3 and program chain information (VTS_PGCI) in the DVD video zone shown in FIG. 4.

FIG. 5 is a view for explaining common accesses to specific video information (VTS_C#2, VTS_C#3, VTS_C#5) from program chain information ATS_PGCI in the DVD audio zone in FIG. 3 and program chain information VTS_PGCI in the DVD video zone in FIG. 4 (but by different methods). In other words, FIG. 5 exemplifies a case wherein single video object VOB is referred to by different methods from playback units on both the audio and video sides.

More specifically, upon video playback from the video title set side, cells VTS_C#1 to VTS_C#6 in VOB are played back in turn in accordance with cell playback information (not shown) in VTS_PGCI.

On the other hand, upon video playback (or still playback) from the audio title set side, cells VTS_C#2, VTS_C#3, and VTS_C#5 in VOB are selectively played back in accordance with cell playback information (FIG. 28) in ATS_PGCI.

In this case, since ATS and VTS need not independently have identical cell data (VTS_C#2, VTS_C#3, and VTS_C#5) in single disc 10, the limited resource of disc 10 can be effectively used.

Figure 6:
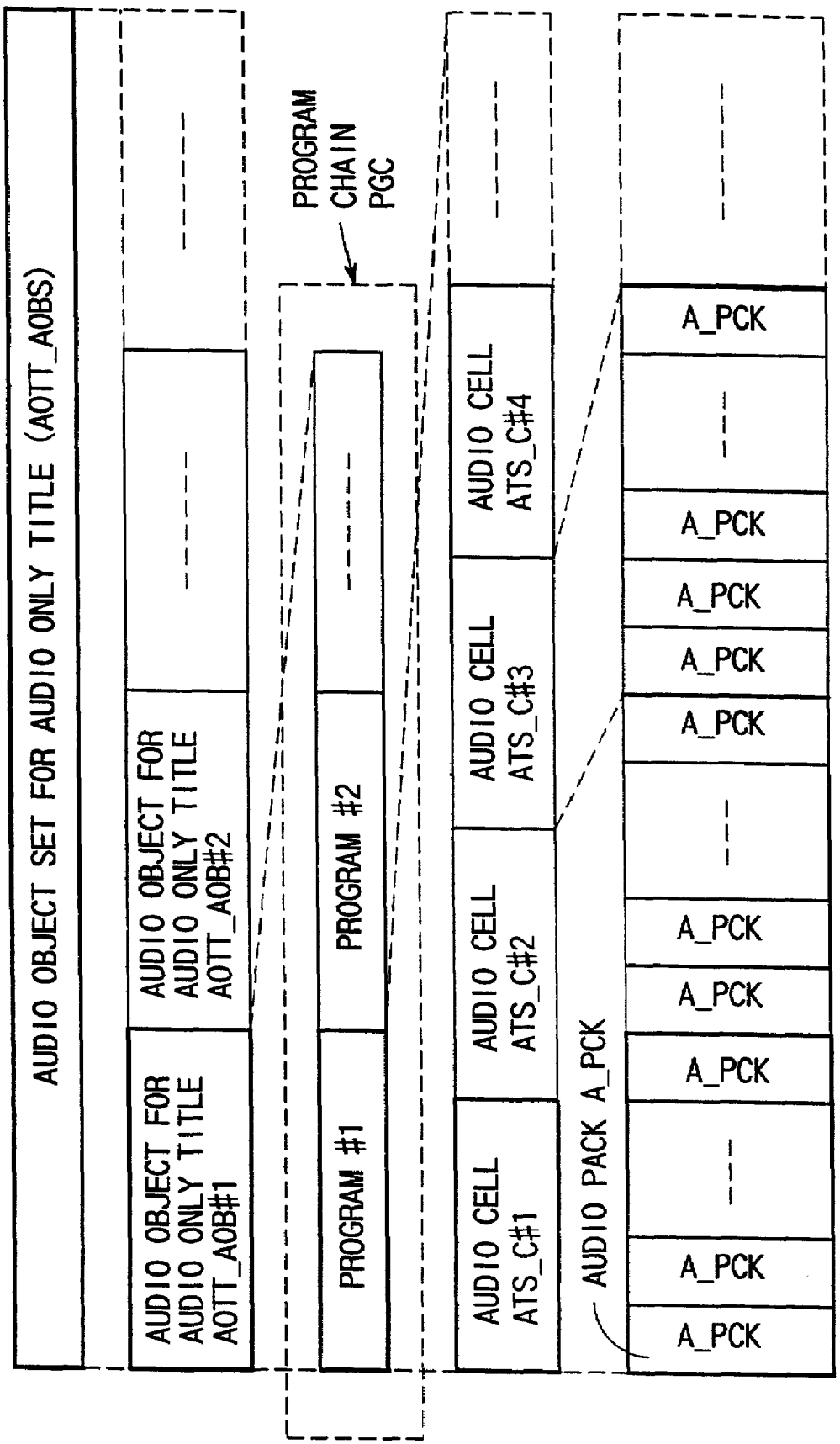
FIG. 6 is a view for explaining an example of the data structure of the recording contents (AOTT_AOBS) in the DVD audio zone shown in FIG. 3.

FIG. 6 shows an example of the data structure of the recording contents (AOTT_AOBS) in the DVD audio zone shown in FIG. 3.

AOTT_AOBS 7121 described above with the aid of FIG. 3 defines a set of one or more audio objects AOTT_AOB#, as shown in FIG. 6. A set of one or more cells ATS_C# form a program, and a set of one or more programs form program chain PGC. This PGC forms a logical unit indicating the entire or partial audio title.

In the example shown in FIG. 6, each audio cell ATS_C# is comprised of a set of audio packs A_PCK each having a 2,048-byte size. These packs serve as minimum units upon data transfer. On the other hand, the minimum unit for logical processing is a cell, and the logical processing is done in units of cells.

Figure 7:
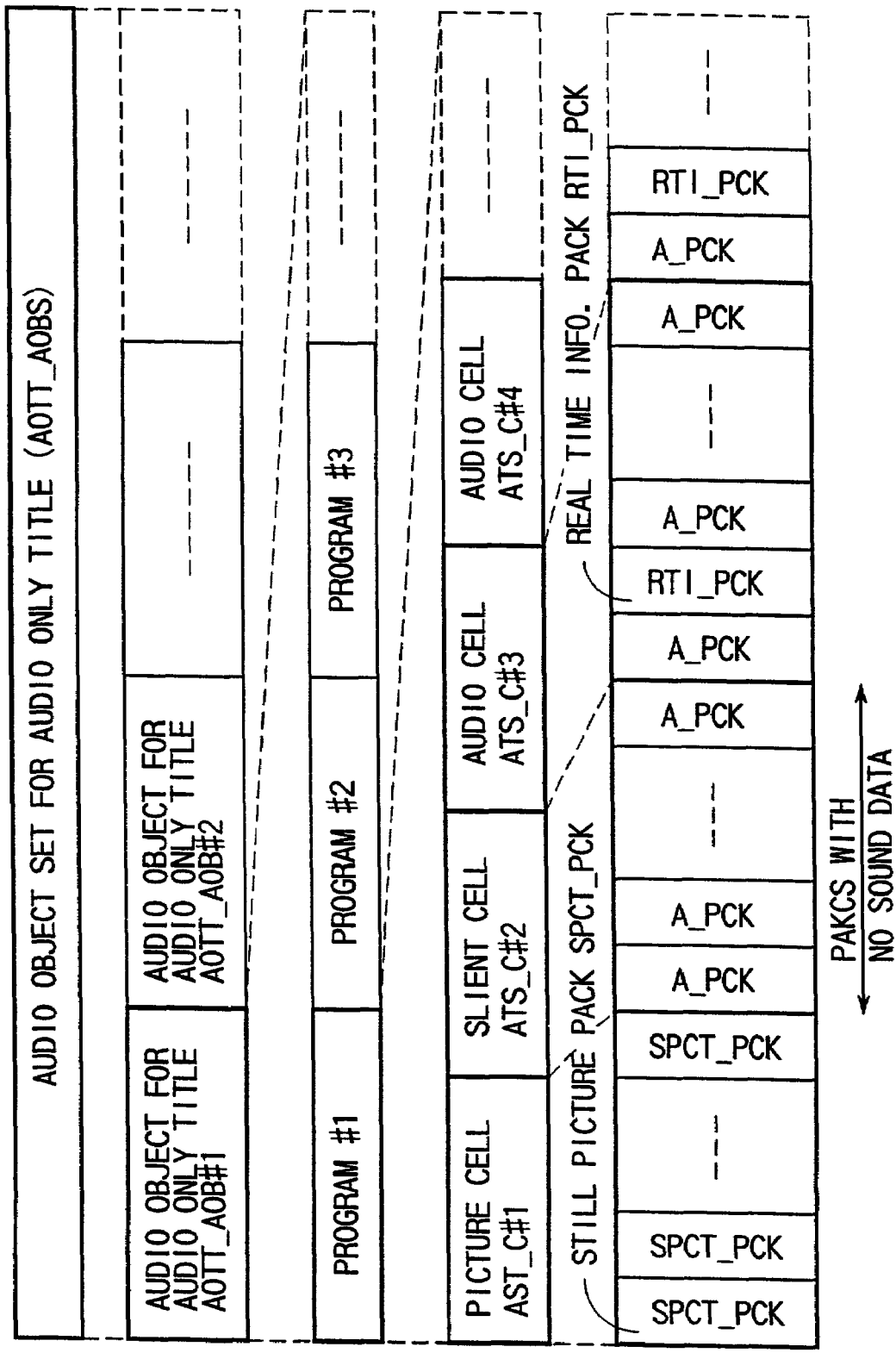
FIG. 7 is a view for explaining another example of the data structure of the recording contents (AOTT_AOBS) in the DVD audio zone shown in FIG. 3.

FIG. 7 shows another example of the data structure of the recording contents (AOTT_AOBS) in the DVD audio zone shown in FIG. 3. In the example shown in FIG. 7, the cell and pack formats are different from those in FIG. 6.

More specifically, audio object AOTT_AOB#1 shown in FIG. 7 contains picture cell ATS_C#1, silent cell ATS_C#2, audio cell ATS_C#3, and the like. The next AOTT_AOB#2 may contain audio cells ATS_C alone, although not shown. The audio object mainly contains audio cells, but a picture cell and/or silent cell are/is appended appropriately.

Picture cell ATS_C#1 may consist of one or more still picture packs SPCT_PCK, and silent cell ATS_C#2 may consist of one or more silent audio packs A_PCK. The playback time of the silent cell is set at about 0.5 sec or more. Audio cell ATS_C#3 consists of audio packs A_PCK and also appropriately contains real time information packs RTI_PCK having real time information.

Upon data transfer of still picture pack SPCT_PCK during playback of a DVD audio player, sound is interrupted for a short period of time (about 0.5 sec to 0.6 sec) during transfer. This sound interruption is called an audio gap. Since it is inconvenient if an audio gap is produced in the middle of music playback, still picture pack SPCT_PCK is normally transferred before the beginning of album playback in FIG. 9, before the beginning of playback of a specific group, or before the beginning of a specific track.

Once still picture pack SPCT_PCK has been transferred inside the DVD audio player, a still picture corresponding to the contents of this SPCT_PCK is held in a picture memory in the player. The still picture in this memory can be continuously played back during playback of the contents (music or the like) of audio packs A_PCK (the still picture can be cleared from the monitor any time the user desires).

Figure 8:
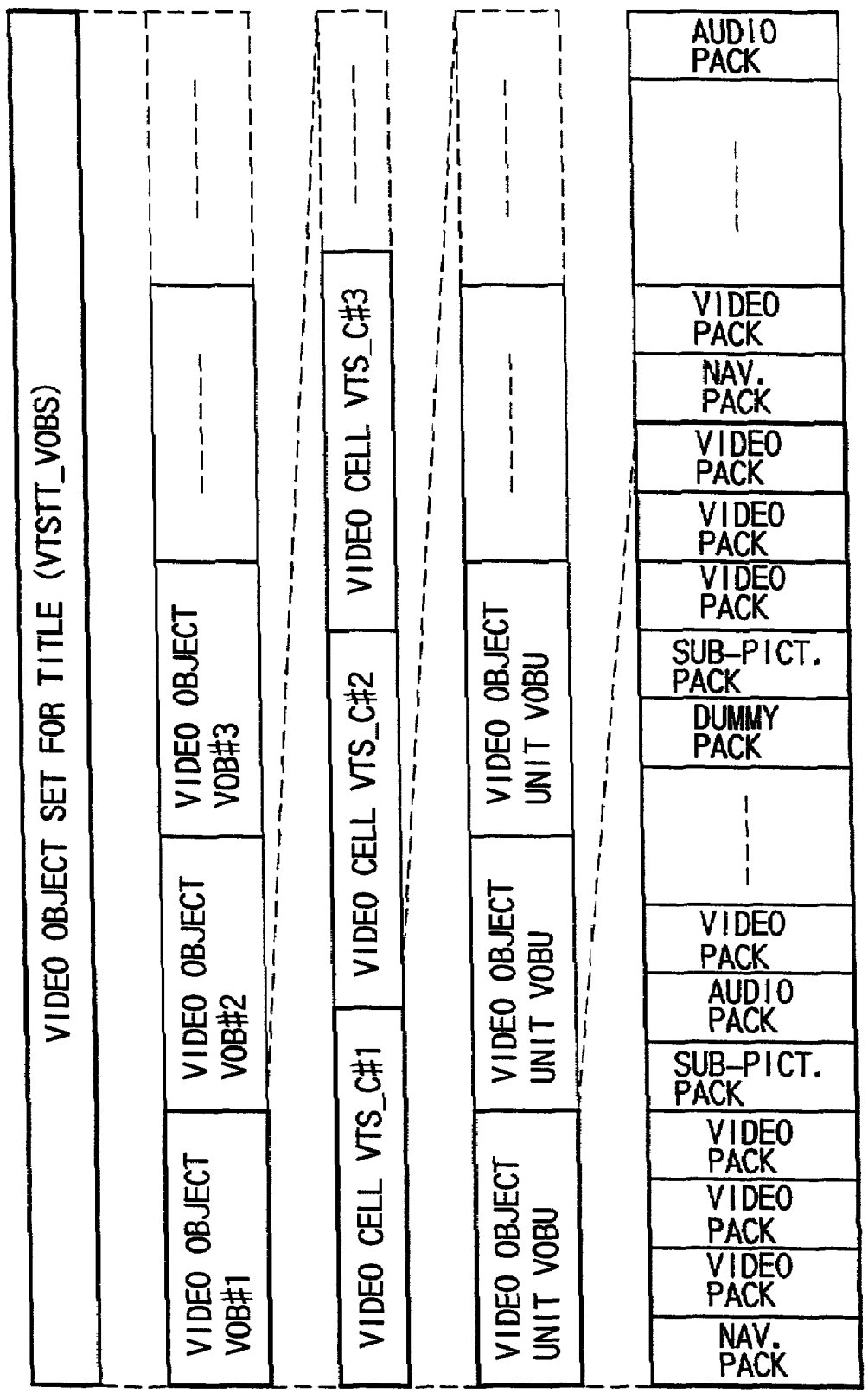
FIG. 8 is a view for explaining an example of the data structure of the recording contents (VTSTT_VOBS) in the DVD video zone shown in FIG. 4.

FIG. 8 shows an example of the data structure of the recording contents (VTSTT_VOBS) in the DVD video zone shown in FIG. 4.

VTSTT_VOBS described above using FIG. 4 defines a set of one or more video objects VOB#, as shown in FIG. 8. Each VOB defines a set of one or more cells VTS_C#. Each VTS_C defines a set of one or more video object units VOBU. A set of one or more cells VTS_C# make up a program, and a set of one or more programs make up program chain PGC. This PGC forms a logical unit indicating the entire or partial audio title.

As shown in FIG. 8, each VOBU is constituted as a set (pack sequence) of video packs (MPEG-compressed moving picture data), sub-picture packs (runlength-compressed bitmap data), and audio packs (non-compressed linear PCM audio data or compressed multichannel audio data) to have a navigation pack at the beginning of the sequence. That is, video object unit VOBU is defined as a set of all packs recorded from a certain navigation pack to a pack immediately before the next navigation pack. This navigation pack is built in each video object unit VOBU to realize angle change (non-seamless angle change playback and seamless angle change playback).

Each of these packs serves as a minimum unit for data transfer as in FIG. 6 or 7. The minimum unit for logical processing is a cell, and logical processing is done is units of cells.

The playback time of VOBU corresponds to that of video data made up of one or more picture groups (groups of pictures; to be abbreviated as GOPs), and is set to fall within the range from 0.4 sec to 1.2 sec. One GOP is screen data which normally has a playback time of about 0.5 sec in the MPEG format, and is compressed to play back approximately 15 pictures during this interval.

When VOBU includes video data, a video datastream is formed by arranging GOPs (complying with MPEG) each consisting of video packs, sub-picture packs, and audio packs. However, independently of the number of GOPs, VOBU is defined with reference to the playback time of GOPs, and a navigation pack is always set at the beginning of VOBU.

Upon playback for DVD video, even playback data consisting of audio data and/or sub-picture data alone is formed using VOBU as one unit. For example, assume that VOBU is formed by audio packs alone to have a navigation pack at its beginning. In this case, the audio packs to be played back in the playback time (0.4 sec to 1.2 sec) of VOBU to which the audio data belong are stored in that VOBU as in VOB of video data.

As shown in FIG. 8, VTSTT_VOBS is defined as a set of one or more VOBs, and VOBs in this VOBS are used for the same purpose.

VOBS for menus normally consists of one VOB, which stores a plurality of menu screen display data. By contrast, VOBS for a title set normally consists of a plurality of VOBs.

Taking a concert video title of a certain rock band as an example, VOBs that form video object set VTSTT_VOBS for a title set correspond to picture data of the performance of that band. In this case, by designating given VOB, for example, the third tune in the concert of the band can be played back.

VOB that forms video object set VTSM_VOBS for menus stores menu data of all the tunes performed in the concert of the band, and a specific tune, e.g., an encore, can be played back according to the menu display.

Note that one VOB can form one VOBS in a normal video program. In this case, a single video stream comes to an end in one VOB.

On the other hand, in case of a collection of animations having a plurality of stories or an omnibus movie, a plurality of video streams (a plurality of video chains PGC) can be set in single VOB in correspondence with the respective stories. In this case, the individual video streams are stored in corresponding VOBs. An audio stream and sub-picture stream pertaining to each video stream end in corresponding VOB.

Video objects VOB are assigned identification numbers (#i; i=0 to i), and that VOB can be specified by the identification number. VOB consists of one or more cells. A normal video stream consists of a plurality of cells, but a video stream for menus often consists of single cell. The cells are assigned identification numbers (#j; j=0 to j) as in VOBs.

FIG. 9 shows the recording contents of user accessible DVD audio zone 71, i.e., an example of the data structure recorded on one side (single- or double-layered) of the optical disc in FIG. 1.

In DVD audio, the hierarchical structure defined by an album, groups, tracks, and indices is prepared as the management structure for the recording contents viewed from the software production side.

The album corresponds to one side of DVD audio disc 10, and for example, "Vol. 1 of works of Beethoven" can be assigned to this album. In such case, this album may be made up of group #1 of Symphony No. 1 to group #9 of Symphony No. 9.

Each group (e.g., group #1) is made up of tracks #1 to #4 corresponding to the first to fourth movements of the corresponding symphony (Symphony No. 1). Furthermore, each track is comprised of indices #1 to #i obtained by dividing the contents of the track into i pieces.

When the user plays back DVD audio disc 10 produced with the hierarchical structure shown in FIG. 9, the user sets that disc 10 on the DVD audio player (FIGS. 29 and 30), and then can select group #1 and track #1 by operating a remote controller (not shown).

After this selection, when the user presses the playback button of the remote controller, the DVD audio player starts playback from the beginning of the first movement of Symphony No. 1 of Beethoven. Furthermore, when the user designates a specific index using the remote controller, the designated index part is reached by search, and playback restarts from that part. (The first index part of the first track of the first group in that album can be played back as a default without any user's designation.)

Note that the user can recognize a title (e.g., a specific movie title or the like) in case of playback of a DVD video disc. However, in case of a DVD audio disc, the user cannot see the "title". The user can only see "album", "group", "track", and "index" shown in FIG. 9.

Figure 10:
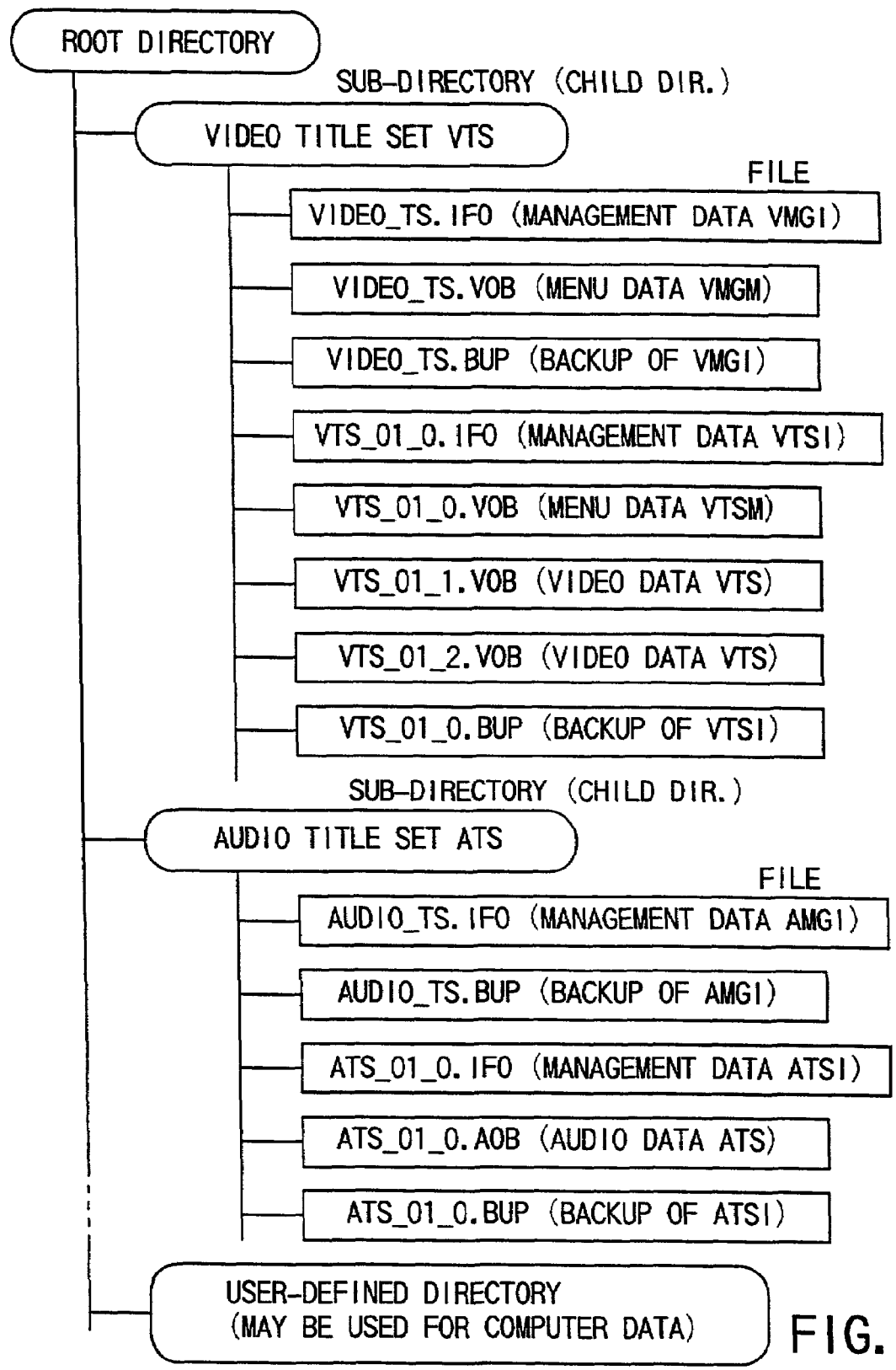
FIG. 10 is a view for explaining an example of the directory structure of information (DVD audio and video data files) recorded on the optical disc shown in FIG. 1.

FIG. 10 shows the directory structure of information (DVD audio and video data files) recorded on the optical disc shown in FIG. 1. FIG. 10 shows an example of the file directory structure defined by the DVD file format.

As in the hierarchical file structure used by a versatile operating system of a computer, the subdirectory of video title set VTS and that of audio title set ATS, the user-defined directory, and the like are located in succession under the root directory.

Various video files (files VMGI, VMGM, VTSI, VTSM, VTS, and the like; see FIG. 4) are located in the subdirectory of video title set VTS to manage the individual files systematically.

Also, various audio files (files AMGI, ATSI, ATS, and the like; see FIG. 3) are located in the subdirectory of audio title set ATS to manage the individual files systematically.

The user can access a specific file (e.g., specific VTS or ATS) by designating the path from the root directory to that file.

Upon playing back a DVD video disc created according to the DVD video format, a DVD video player manufactured according to the DVD video format reads management information (VMG) located in the video title set VTS directory beneath the root directory first, and plays backs video contents in accordance with that information. However, VMG can only play back the video contents (VTS) recorded in the VTS directory.

On the other hand, upon playing back a DVD audio disc created according to the DVD audio format, a DVD audio player (or a DVD-Video/DVD-Audio compatible player) manufactured in accordance with the DVD audio format reads management information (AMG) located in the audio title set ATS directory under the root directory, and plays back audio contents in accordance with that information. In this case, AMG can play back not only the audio contents (ATS) recorded in the ATS directory but also the video contents (VTS) in the VTS directory (this mechanism will be explained later with reference to FIG. 12 and the subsequent figures).

Figure 11:
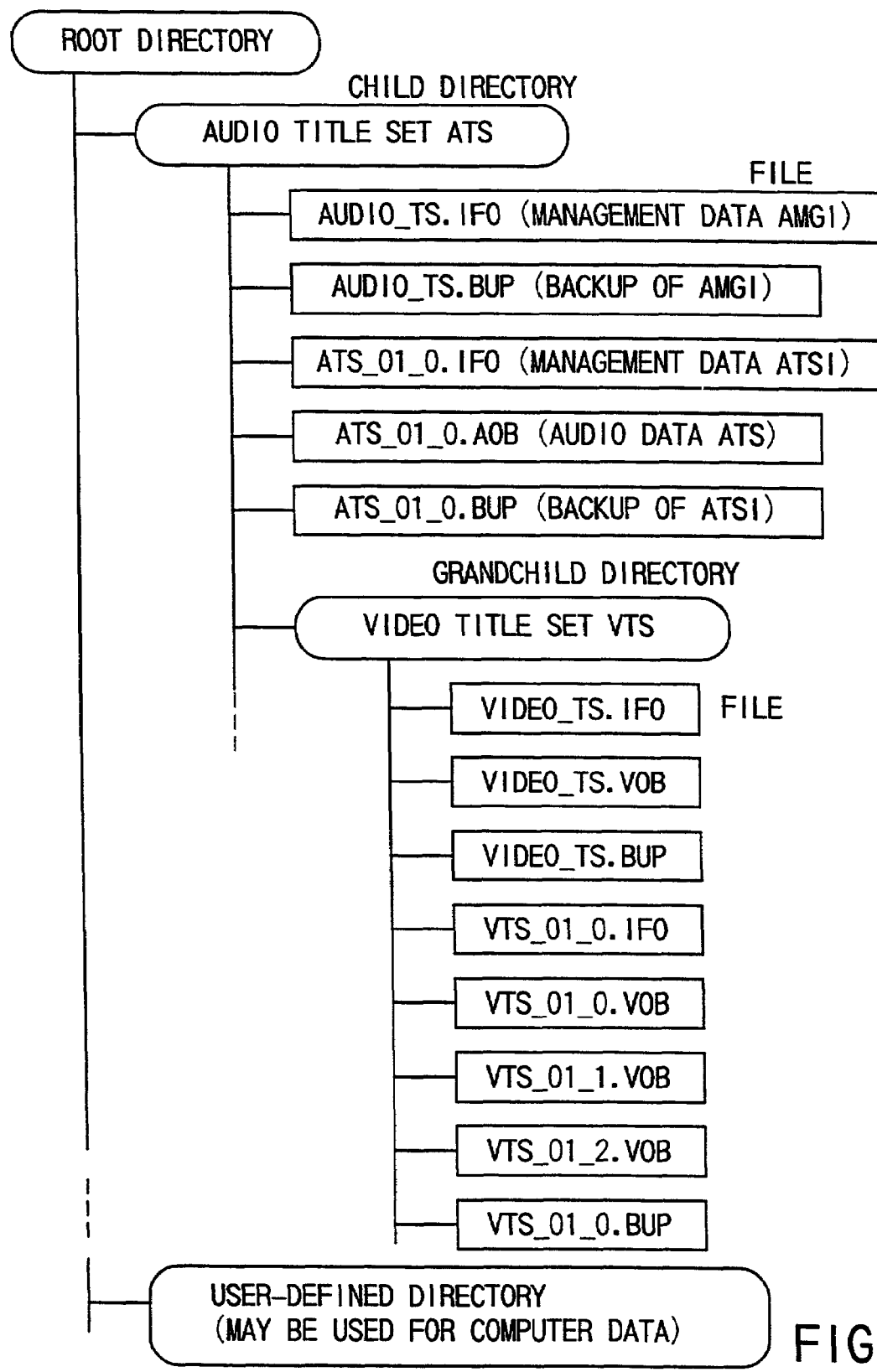
FIG. 11 is a view for explaining another example of the directory structure of information (DVD audio and video data files) recorded on the optical disc shown in FIG. 1.

FIG. 11 shows another example of the directory structure of information (DVD audio and video data files) recorded on the optical disc shown in FIG. 1.

In the example shown in FIG. 10, both the VTS and ATS directories are located on the same layer level under the root directory. On the other hand, in the example shown in FIG. 11, the ATS directory (child directory) is located in a layer under the root directory (parent directory), and the VTS directory (grandchild directory) is located in a layer under the ATS directory.

Figure 12:
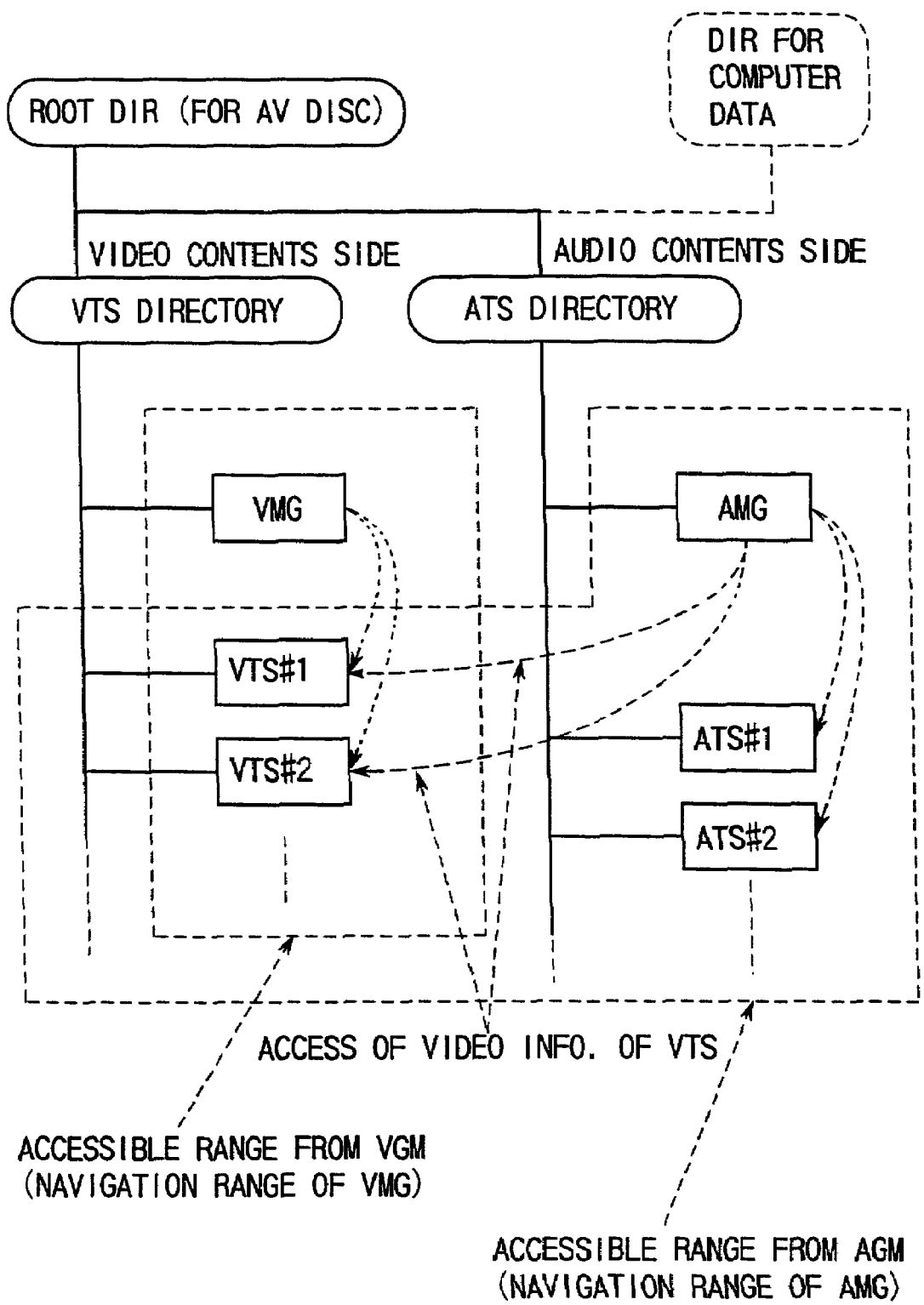
FIG. 12 is a view for explaining an access from a directory on the audio contents side to files in a directory on the video contents side in the directory structure shown in FIG. 10.

FIG. 12 is a view for explaining an access from the directory on the audio contents side to a file in the directory on the video contents side in the directory structure shown in FIG. 10.

More specifically, in the hierarchical management structure for managing data files recorded on AV disc 10, the video title set directory (child directory) and audio title set directory (child directory) are located under the root directory (parent directory).

The video title set (VTS) directory manages files for the video contents recorded on disc 10, and contains a file of video manager VMG and one or more files (logical units of the video contents) of video title sets VTS (see FIG. 4).

The audio title set (ATS) directory manages files for the audio contents recorded on disc 10, and contains a file of audio manager AMG and one or more files (logical units of the audio contents) of audio title sets ATS (see FIG. 3).

VMG in the VTS directory manages VTS alone, and can only access VTS in the VTS directory.

On the other hand, AMG in the ATS directory mainly manages ATS, but can access not only ATS in the ATS directory but also VTS in the VTS directory.

AMG contains audio manager information AMGI (FIG. 17), AMGI contains audio title search pointer table ATT_SRPT (FIG. 17), and ATT_SRPT contains audio only title (AOTT) search pointer ATT_SRP and audio video (AVTT) search pointer ATT_SRP (FIG. 20) (their contents will be explained in detail later with reference to FIGS. 17 to 20).

More specifically, AMG in the ATS directory can access audio title sets ATS#1, ATS#2, . . . in the ATS directory by AOTT search pointer ATT_SRP, and can also access video title sets VTS#1, VTS#2, . . . in the VTS directory by AVTT search pointer ATT_SRP. In this way, a certain object (e.g., VTS#1) can be shared by both the video and audio contents. This is one of important characteristic features of the "object sharing system" of the present invention.

Figure 13:
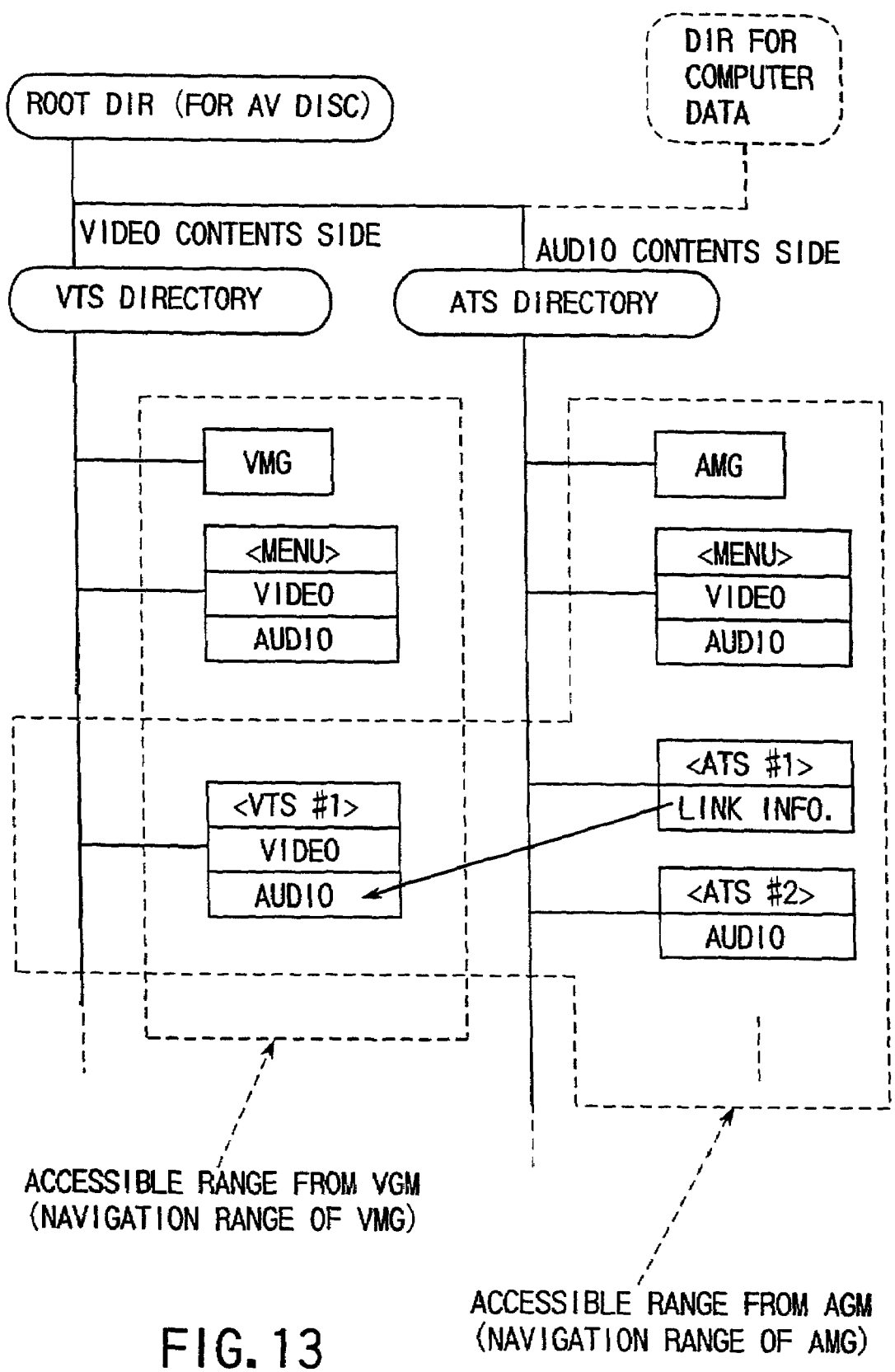
FIG. 13 is a view for explaining a link of a file in a directory on the audio contents side to that in a directory on the video contents side in the directory structure shown in FIG. 10.

FIG. 13 is a view for explaining a link from a file in the directory on the audio contents side to that in the directory on the video contents side in the directory structure shown in FIG. 10. FIG. 13 can be considered as a modification of FIG. 12.

More specifically, in the example shown in FIG. 12, since audio manager AMG is capable of accessing both audio title sets ATS and video title sets VTS, a certain VTS can be shared by the video and audio contents.

On the other hand, in the example shown in FIG. 13, information (e.g., a pointer indicating the address of a predetermined portion of VTS#1) for linking to a certain video title set (VTS#1 in this case) is written in a certain audio set (ATS#1 in this case). With this information, audio data in, e.g., VTS#1 can be shared by the video and audio contents.

Figure 14:
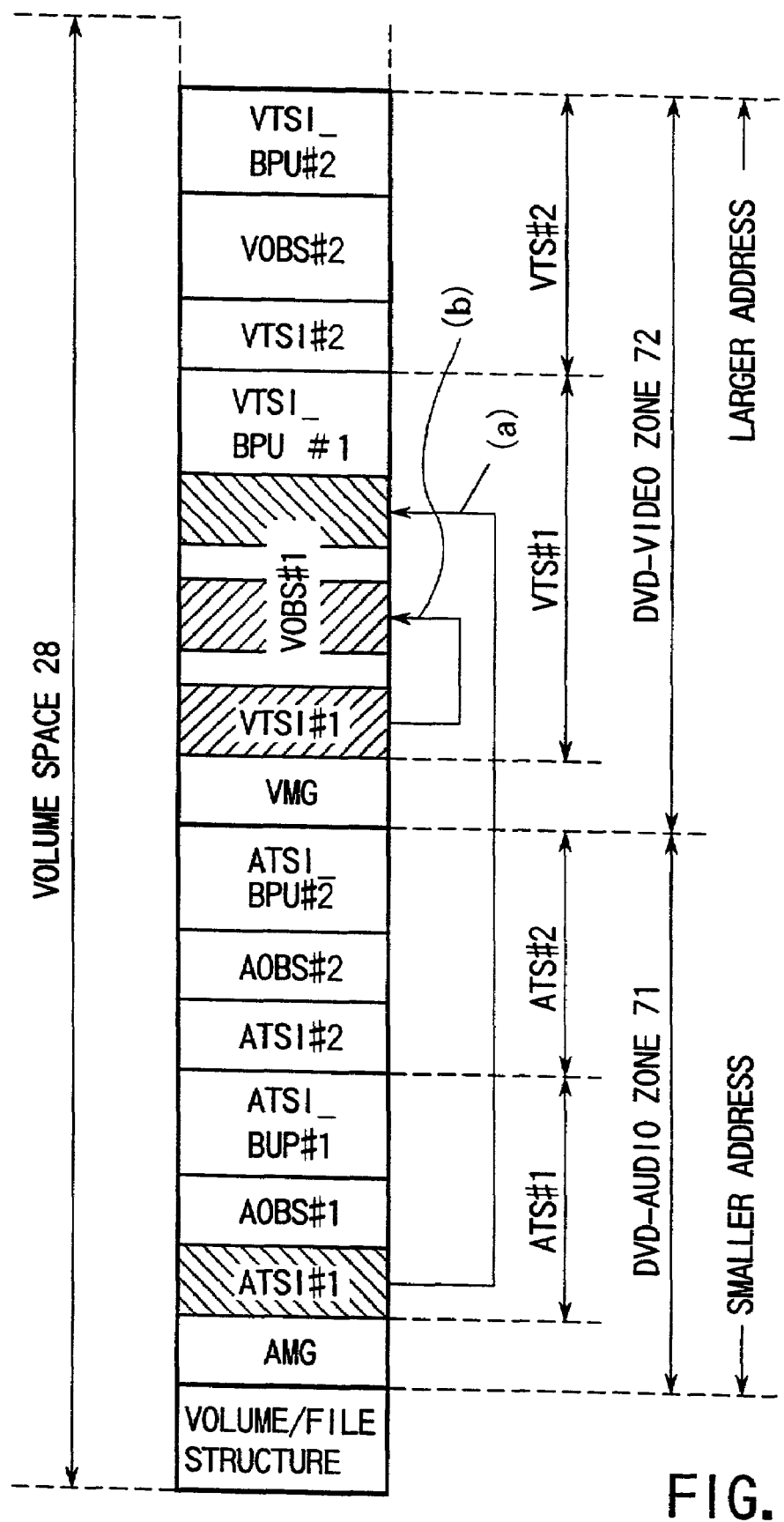
FIG. 14 is a view for explaining an example of the file access process in FIG. 12 in a volume space shown in FIGS. 3 and 4.

FIG. 14 shows the data structure to explain an example of the file access process in FIG. 12 in the volume space shown in FIGS. 3 and 4. The data structure shown in FIG. 14 corresponds to the directory structure shown in FIG. 12.

Referring to FIG. 14, the hatched portions exemplify contents shared by the video contents (or video volume) and audio contents (or audio volume).

The principle of the data structure shown in FIG. 14 is to independently record the recording area (VMG+VTS) for the video contents and the recording area (AMG+ATS) for the audio contents in volume space 28, and to allow AMG to manage the video contents which are used not only for video but also commonly for audio.

For example, in FIG. 14, video title set VTS#1 managed by VMG can access a portion (cell) in video object sets VOBS#1, while audio title set ATS#1 managed by AMG can access another portion (cell) in VOBS#1. In this example, some cells (see FIG. 8) that make up video object set VOBS#1 of VTS#1 are shared by the video and audio contents.

In the data structure shown in FIG. 14, DVD audio zone 71 is located on the side of smaller addresses (closer to lead-in area 27 in FIG. 3), and DVD video zone 72 is located on the side of larger addresses (closer to lead-out area 26 in FIG. 3). In this case, AMG can always use addresses that change in the + direction (see arrows a and b) upon accessing both ATS and VTS, and need not use addresses in the − direction, resulting in easy construction of the playback system.

Figure 15:
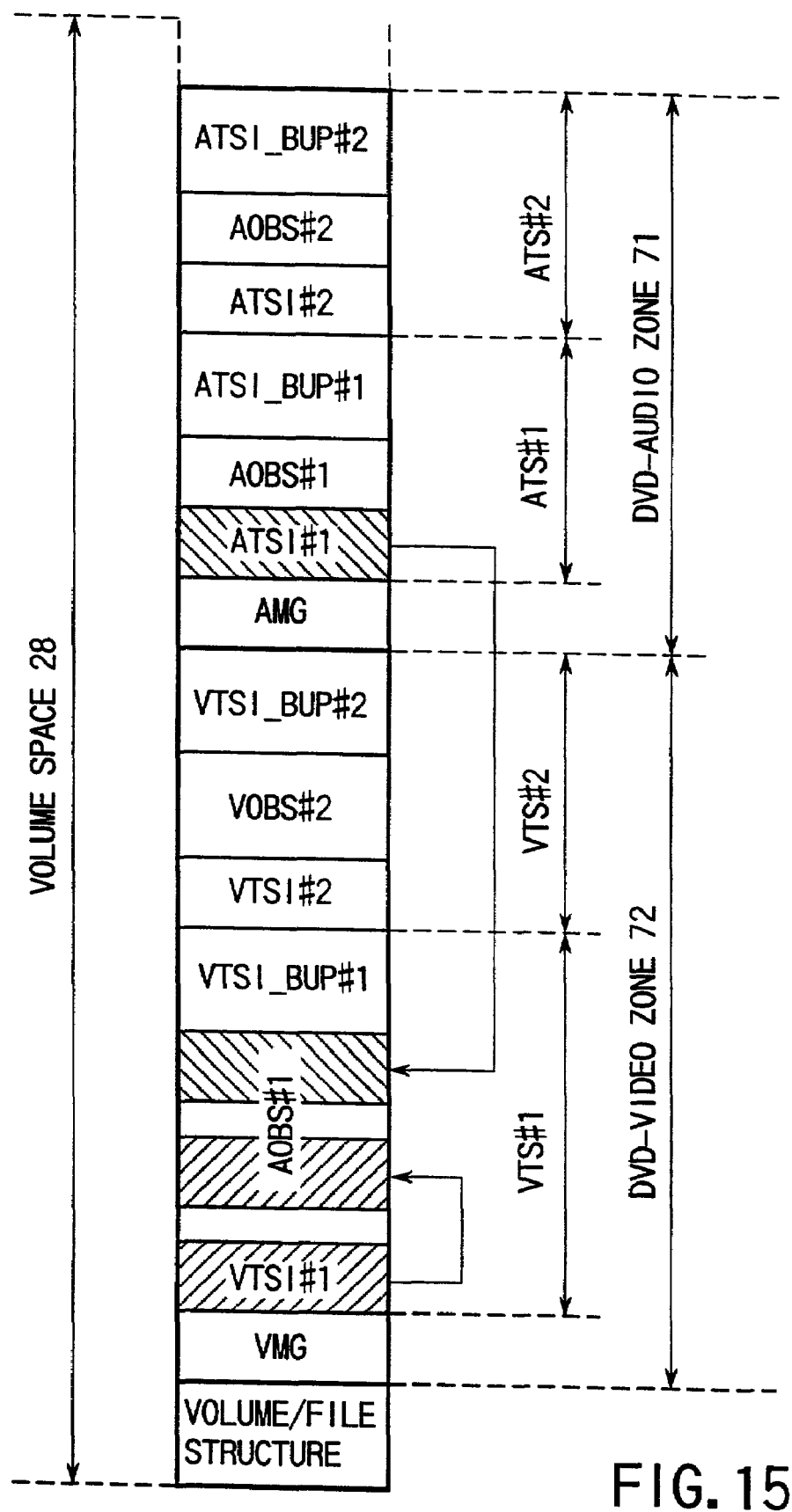
FIG. 15 is a view for explaining another example of the file access process in FIG. 12 in the volume space shown in FIGS. 3 and 4.

FIG. 15 shows the data structure to explain another example of the file access process in FIG. 12 in the volume space shown in FIGS. 3 and 4. FIG. 15 can be considered as a modification of FIG. 14.

In FIG. 14, since the DVD audio zone 71 is located on the side of smaller addresses, and DVD video zone 72 is located on the side of larger addresses, the addresses in the − direction need not be used, as described above.

On the other hand, in FIG. 15, DVD video zone 72 is located on the side of smaller addresses (closer to lead-in area 27 in FIG. 3), and DVD audio zone 71 is located on the side of larger addresses (closer to lead-out area 26 in FIG. 3). In such case, AMG uses the address in the + direction to access ATS, and uses the address in the − direction to access VTS. That is, addressing upon accessing a desired object (cells in ATS or VTS) is cumbersome, and it is inappropriate to use such address allocation in home-use DVD audio players that require low manufacturing cost.

However, when a personal computer having a DVD drive is used as a DVD audio player with the help of software, the cost problem can be avoided even when the data structure shown in FIG. 15 is used. That is, an operating system (or control software) on the personal computer, which has interpreted the data structure shown in FIG. 15, can re-map the addresses onto its own memory and can apparently convert the data structure physically having the address allocation shown in FIG. 15 into that shown in FIG. 14. In this way, an MPU or CPU of that personal computer allows AMG to access both ATS and VTS by designating addresses in the +direction alone as in FIG. 14.

Figure 16:
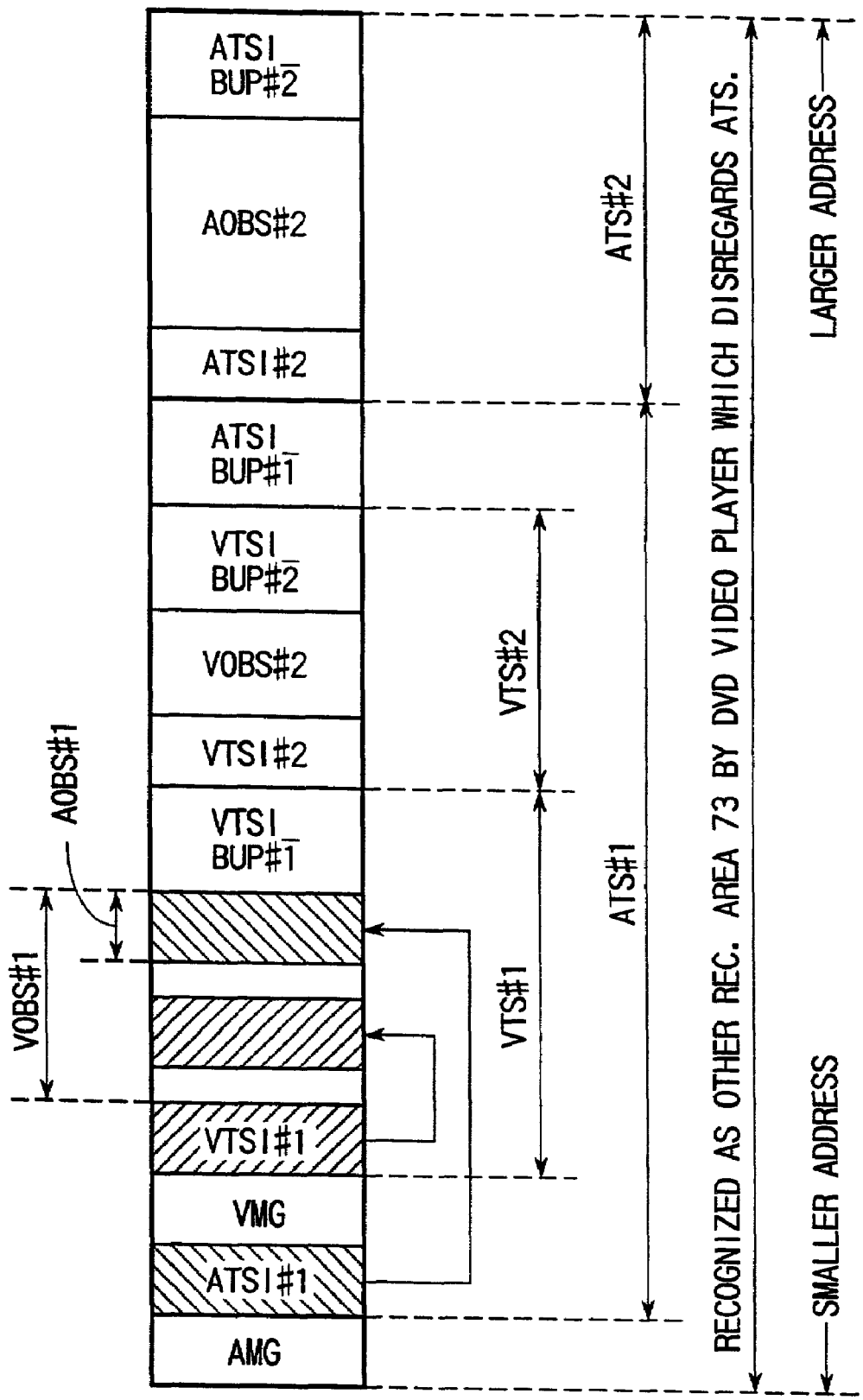
FIG. 16 is a view for explaining still another example of the file access process in FIG. 12 in the volume space shown in FIGS. 3 and 4.

FIG. 16 shows the data structure to explain still another example of the file access process in FIG. 12 in the volume space shown in FIGS. 3 and 4. FIG. 16 can also be considered as a modification of FIG. 14.

In FIG. 14, since the DVD audio zone 71 is located on the side of smaller addresses, and DVD video zone 72 is located on the side of larger addresses, the addresses in the − direction need not be used, as described above.

By contrast, in the data structure shown in FIG. 16, AMG in DVD audio zone 71 is located on the side of smaller addresses (closer to lead-in area 27 in FIG. 3), and VMG in DVD video zone 72 is located on the side of larger addresses (closer to lead-out area 26 in FIG. 3) than AMG. In this case, AMG can always use addresses that change in the + direction to access both ATS and VTS, and need not use addresses in the − direction. For this reason, the playback system can be easily constructed as in FIG. 14.

However, since the data structure shown in FIG. 16 is a "nested" structure, i.e., VTS#1 and the like are located in ATS#1, VMG in FIG. 4 cannot recognize that VTS in ATS is present in DVD video zone 72. In such case, VMG can handle that VTS in ATS as one in other recording area 73.

The data structure shown in FIG. 16 can be used when AMG can access not only ATS but also VTS using other recording area 73.

The three different examples shown in FIGS. 14 to 16 have been described as those for the data structure in which "AMG can access both ATS and VTS". The most preferred data structure is that shown in FIG. 14, since a desired shared object can be accessed by only designating an address in the + direction without re-mapping the addresses.

Figure 17:
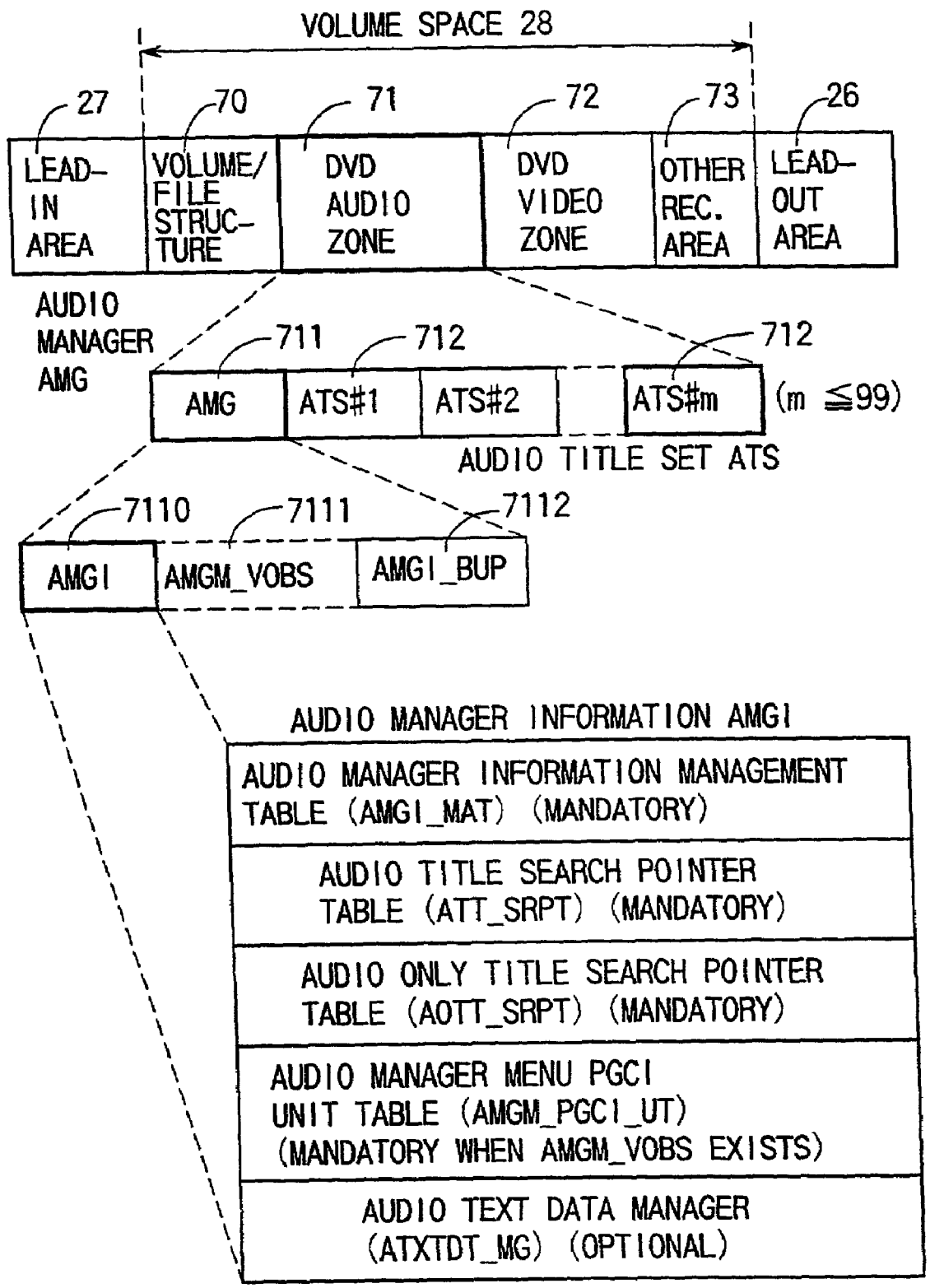
FIG. 17 is a view for explaining the recording contents of audio manager information (AMGI) in the DVD audio zone shown in FIG. 3.

FIG. 17 is a view for explaining the recording contents of audio manager information AMGI in the DVD audio zone shown in FIG. 3.

DVD audio zone 71 can handle two different types of contents, i.e., audio only title AOTT and audio title with video (or audio•video title) AVTT.

AOTT is a title in audio disc (A disc 10), has no video part, and is defined by ATS recorded underneath the audio title set directory. On the other hand, AVTT is a title in audio disc (AV disc) 10, has video part, and is defined by VTS recorded underneath the video title set directory. The general name of AOTT and AVTT is defined as ATT (audio title).

DVD audio zone 71 on which the ATT data are recorded is made up of AMG 711 and one or more (a maximum of 99) audio title sets (ATS#1 to ATS#m) 712.

AMG 711 consists of audio manager information AMGI file 7110, video object set AMGM_VOBS file (optional file) 7111 for audio manager menus, and audio manager information backup AMGI_BUP file 7112.

AMGI file 7110 contains audio manager information management table AMGI_MAT, audio title search pointer table ATT_SRPT, audio only title search pointer table AOTT_SRPT, audio manager menu program chain information unit table AMGM_PGCI_UT, and audio text data manager ATXTDT_MG.

More specifically, AMG has two pieces of search information ATT_SRPT and AOTT_SRPT. ATT_SRPT is a table that describes search information for both AOTT and AVTT, and AOTT_SRPT is a table that describes search information for AOTT alone.

The reason why the search information is prepared not for AVTT and AOTT but for ATT (the general name of AOTT and AVTT) (ATT_SRPT in FIG. 20; to be described later) and AOTT (AOTT_SRPT in FIG. 22; to be described later) is to facilitate the playback methods of various DVD players.

FIG. 18 shows the recording contents of audio manager information management table AMGI_MAT contained in audio manager information AMGI shown in FIG. 17.

More specifically, audio manager information management table AMGI_MAT includes: an audio manager identifier (AMG_ID); the end address (AMG_EA) of the audio manager; the end address (AMGI_EA) of the audio manager information; the version number (VERN) of the format used by optical disc (DVD audio disc) 10 of interest; a volume set identifier (VLMS_ID); auto play information (AP_INF) indicating the playback state after the disc is loaded into the player; the start address (ASVS_SA) of audio still video set ASVS, which address is expressed by the number of relative blocks from the first logical block of AMG; the number (TS_Ns) of title sets; an identifier (PVR_ID) of the provider (i.e., the producer and distributor of software); the end address (AMGI_MAT_EA) of the audio manager information management table; the start address (AMGM_VOBS_SA) of an audio manager menu video object set; the start address (ATT_SRPT_SA) of the audio title search pointer table; the start address (AOTT_SRPT_SA) of the audio only title search pointer table; the start address (AMGM_PGCI_UT_SA) of the audio manager menu program chain information unit table; the start address (ATXTDT_MG_SA) of the audio text data manager; a video attribute (AMGM_V_ATR) for the audio manager menu video object set; the number (AMGM_SPST_Ns) of sub-picture streams for audio manager menus; a sub-picture attribute (AMGM_SPST_ATR) for the audio manager menu video object set; the number (AMGM_AST_Ns) of audio streams of audio manager menus; an audio attribute (AMGM_AST_ATR) for the audio manager menu video object set; and other reserved areas.

In start address AMGM_VOBS_SA of the audio manager menu video object set, the start address of AMGM_VOBS is written as the number of relative blocks from the first logical block of AMG. If AMGM_VOBS does not exist, "00000001h" is written in this AMGM_VOBS_SA.

In start address ATT_SRPT_SA, the start address of ATT_SRPT is written as the number of relative blocks from the first logical block of AMGI.

In start address AOTT_SRPT_SA, the start address of AOTT_SRPT is written as the number of relative blocks from the first logical block of AMGI.

ATT_SRPT_SA or AOTT_SRPT_SA written in AMGI_MAT in FIG. 18 can indicate the recording location of audio title search pointer table ATT_SRPT or audio only title search pointer table AOTT_SRPT in disc 10.

Figure 19:
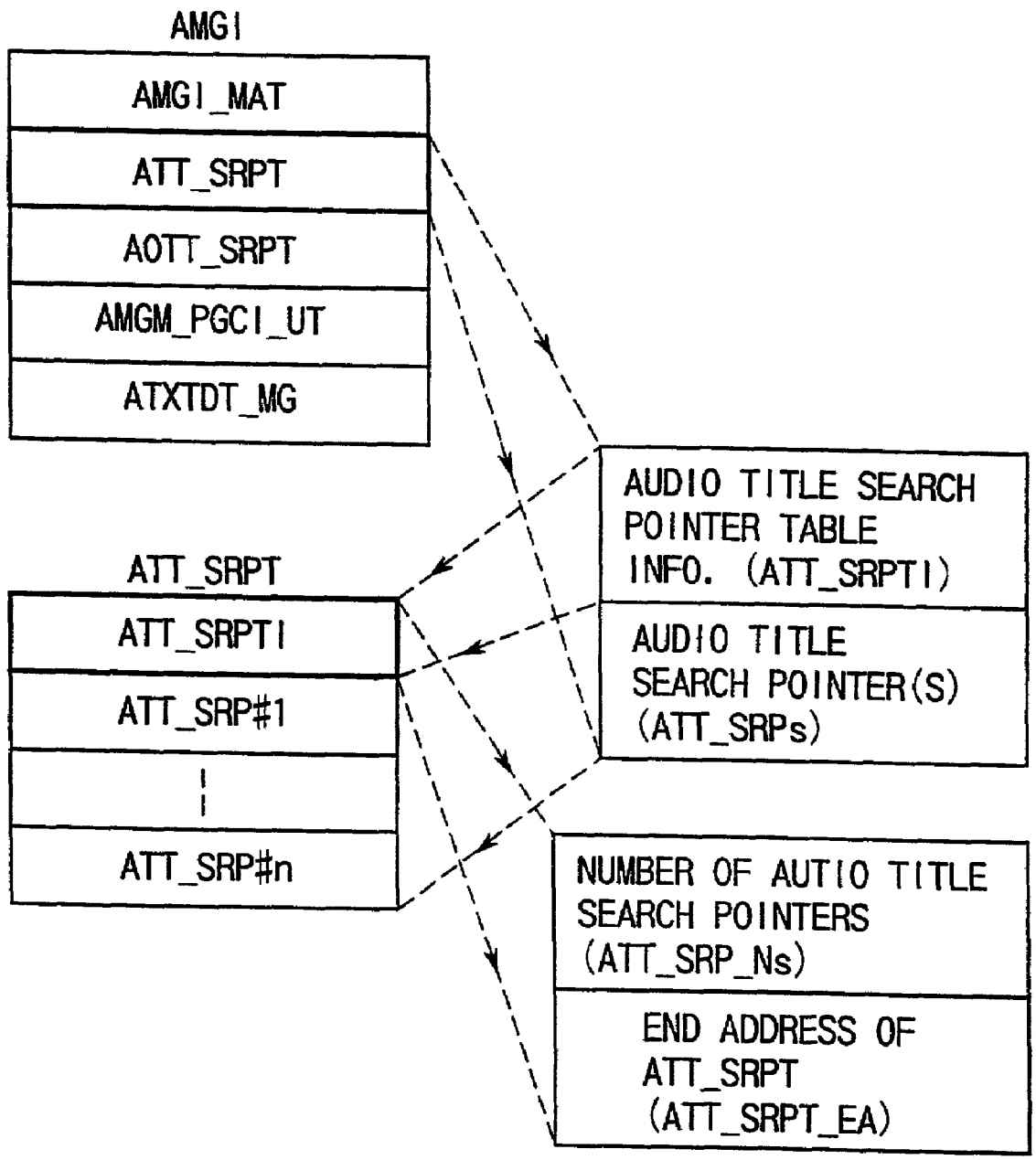
FIG. 19 is a view for explaining the contents of an audio title search pointer table (ATT_SRPT) included in the audio manager information (AMGI) shown in FIG. 17.

FIG. 19 is a view for explaining the contents of audio title search pointer table ATT_SRPT contained in audio manager information AMGI shown in FIG. 17. AMGI has two different search pointer tables ATT_SRPT and AOTT_SRPT, and FIG. 19 shows search pointer ATT_SRP that can access both AOTT and AVTT.

More specifically, ATT_SRPT contained in AMGI includes audio title search pointer table information ATT_SRPTI and one or more audio title search pointers ATT_SRP (ATT_SRP#1 to ATT_SRP#n). ATT_SRPTI contains the number of audio title search pointers, and the end address of ATT_SRPT.

Figure 20:
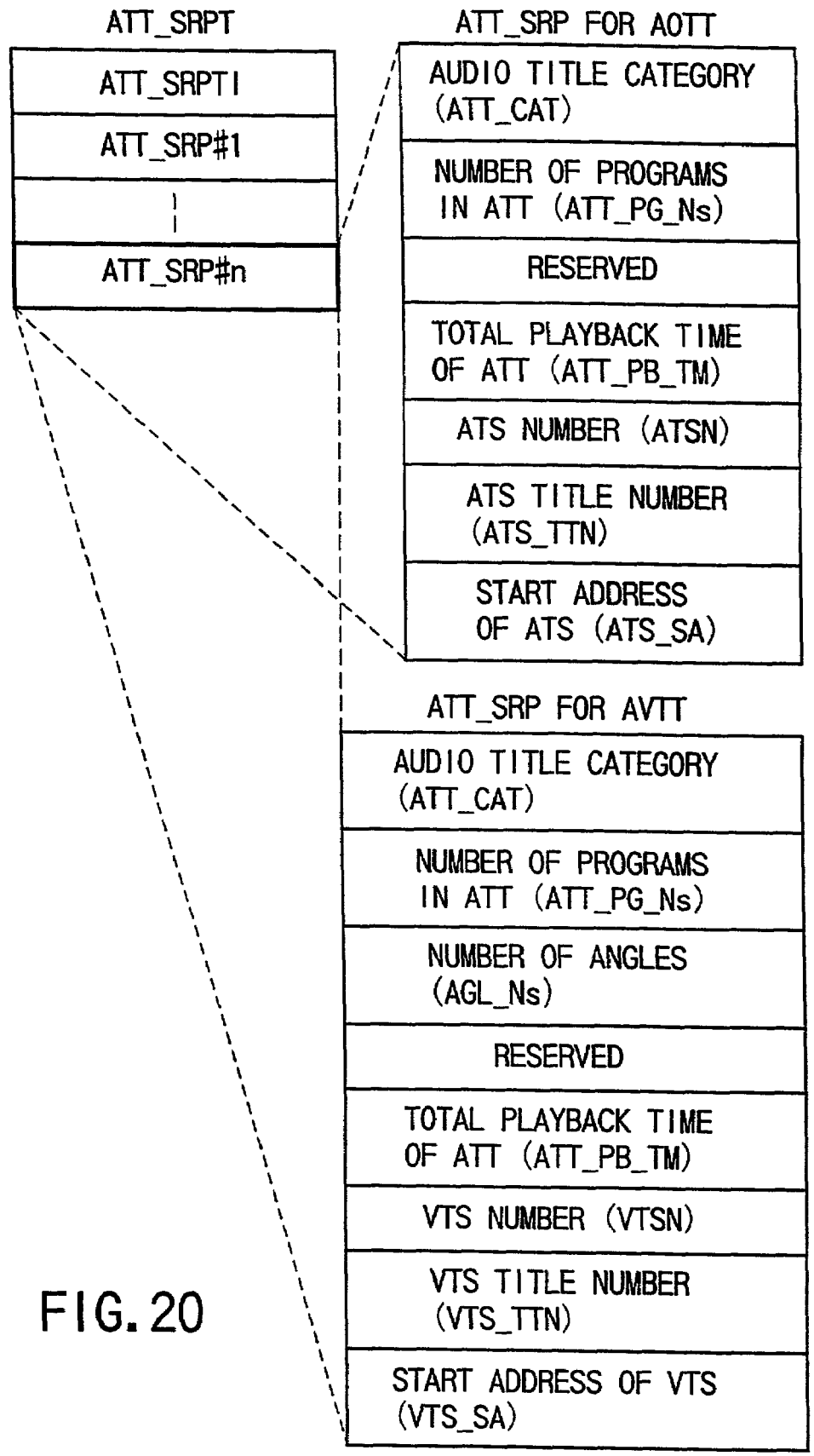
FIG. 20 is a view for explaining the contents of an audio title search pointer (ATT_SRP) included in the audio title search pointer table (ATT_SRPT) shown in FIG. 19.

FIG. 20 is a view for explaining the contents of each audio title search pointer (ATT_SRP#n in this case) included in audio title search pointer table ATT_SRPT shown in FIG. 19.

The DVD audio format handle use not only sound data but also picture data, and AMG has two pieces of search information ATT_SRPT and AOTT_SRPT. ATT_SRPT shown in FIG. 20 is a table that describes search information for both AOTT and AVTT.

Referring to FIG. 20, audio only title search pointer AOTT_SRP includes category ATT_CAT of audio title ATT, number ATT_PG_Ns of programs in one audio title ATT, total playback time ATT_PB_TM of audio title ATT, audio title set ATS number ATSN, audio title set ATS title number ATS_TTN, and start address ATS_SA of audio title set ATS.

Audio video title search pointer AVTT_SRP includes category ATT_CAT of audio title ATT, number ATT_PG_Ns of programs in one ATT, number AGL_Ns of angles included in video, total playback time ATT_PB_TM of audio title ATT, video title set VTS number VTSN, video title set VTS title number VTS_TTN, and start address VTS_SA of video title set VTS.

Figure 21:
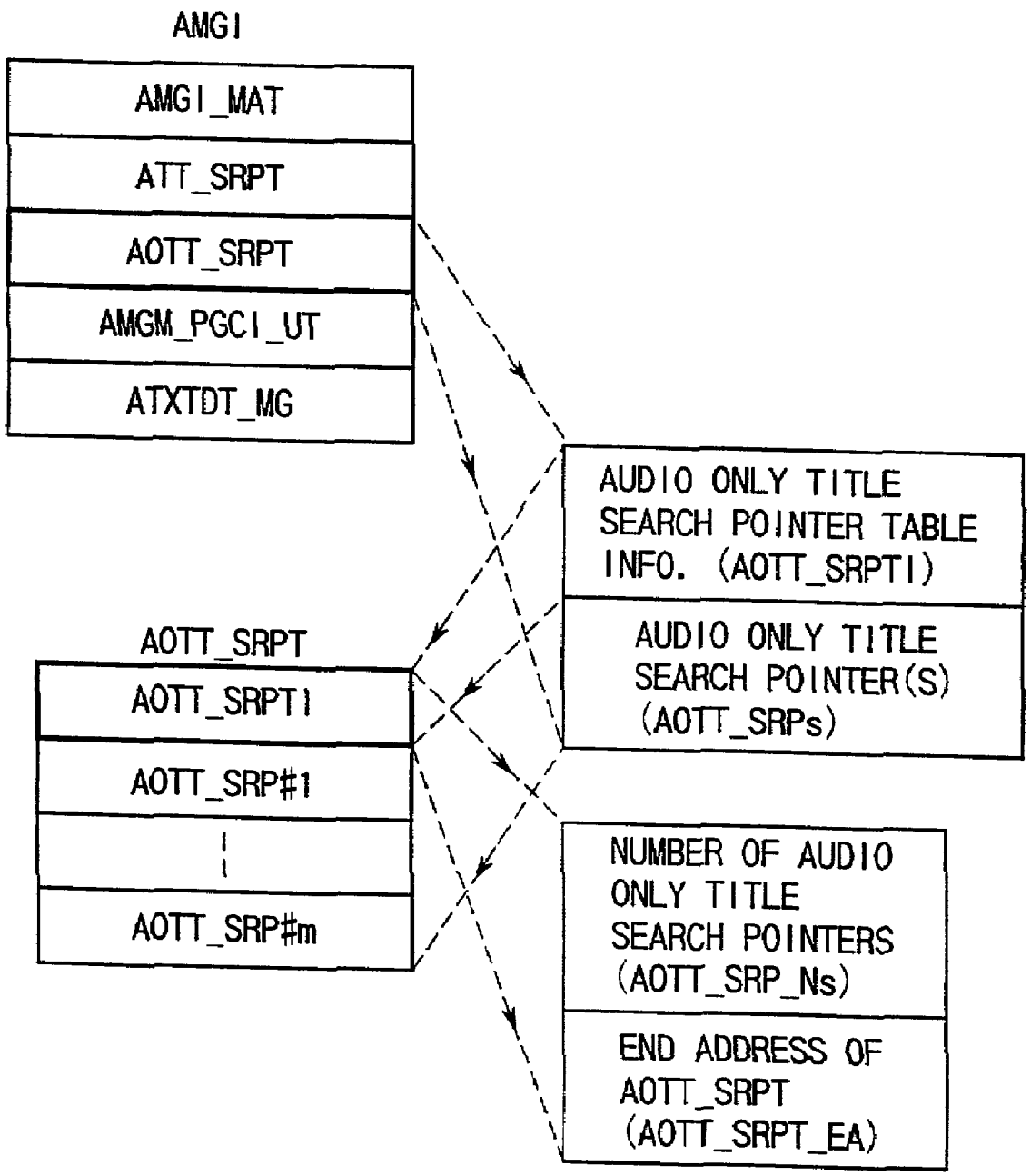
FIG. 21 is a view for explaining the contents of an audio only title search pointer table (AOTT_SRPT) included in the audio manager information (AMGI) shown in FIG. 17.

FIG. 21 is a view for explaining the contents of audio only title search pointer table AOTT_SRPT contained in audio manager information AMGI shown in FIG. 17. AMGI has two different search pointer tables ATT_SRPT and AOTT_SRPT, and FIG. 21 shows search pointer AOTT_SRP that can access only AOTT.

More specifically, AOTT_SRPT contained in AMGI includes audio only title search pointer table information AOTT_SRPTI, and one or more audio only title search pointers AOTT_SRP (AOTT_SRP#1 to AOTT_SRP#m). AOTT_SRPTI includes number AOTT_SRP_Ns of audio only search pointers, and end address AOTT_SRPT_EA of AOTT_SRPT.

Figure 22:
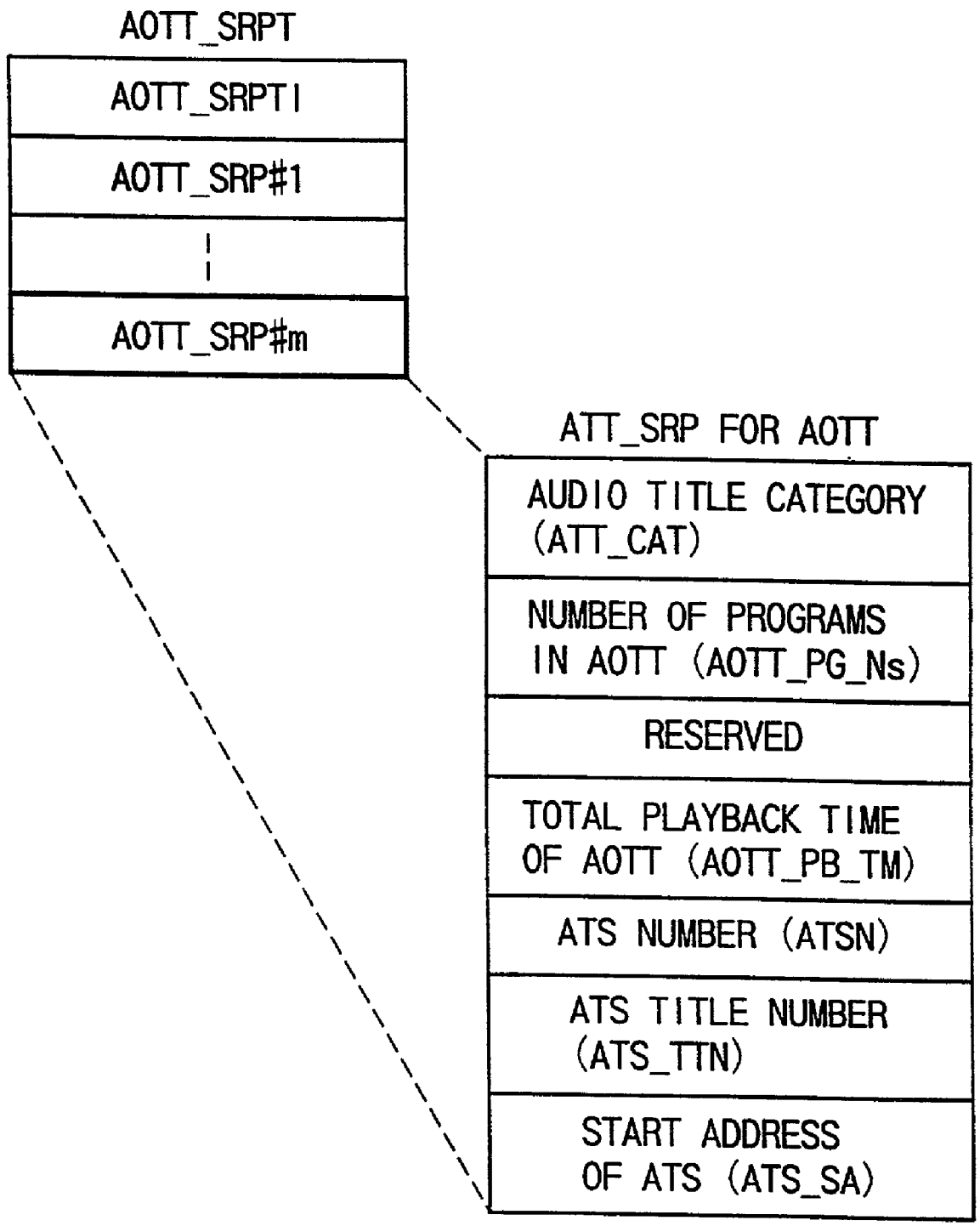
FIG. 22 is a view for explaining the contents of an audio only title search pointer (AOTT_SRP) included in the audio only title search pointer table (AOTT_SRPT) shown in FIG. 21.

FIG. 22 is a view for explaining the contents of one audio only search pointer (AOTT_SRP#m in this case) included in audio only title search pointer table AOTT_SRPT shown in FIG. 21.

The DVD audio format handle use not only sound data but also picture data, and AMG has two pieces of search information ATT_SRPT and AOTT_SRPT. AOTT_SRPT shown in FIG. 22 is a table that describes search information for only AOTT.

More specifically, in FIG. 22, audio only title search pointer AOTT_SRP includes category ATT_CAT of audio title ATT, number AOTT_PG_Ns of programs in one audio only title AOTT, total playback time AOTT_PB_TM of audio only title AOTT, audio title set ATS number ATSN, audio title set ATS title number ATS_TTN, and start address ATS_SA of audio title set ATS.

In control information of a playback title defined in audio manager AMG, title group TT_GR can be designated.

Title group TT_GR is a set of one or more audio titles ATT, and is defined as a unit for guaranteeing continuous playback of an ATT group. On the user side, each audio title ATT corresponds to a "tune", and title group TT_GR corresponds to an "album" as a set of tunes (see FIG. 9). On a record or CD, when playback starts from the first or middle tune of the album, that album can be continuously played back to its end. Likewise, when playback starts from the first or middle ATT in TT_GR, playback continues to the end of this TT_GR.

As title group TT_GR, the following two groups can be defined.

<A1> Audio title group (ATT_GR); this ATT_GR is title group TT_GR consisting of audio titles ATT defined in audio title search pointer table ATT_SRPT.

<A2> Audio only title group (AOTT_GR); this AOTT_GR is title group TT_GR consisting of audio only titles AOTT defined in audio only search pointer table AOTT_SRPT.

Audio title group ATT_GR is used for a player which can play back picture and audio data complying with the audio format (i.e., a player which can play back both AOTT and AVTT), and audio only title group AOTT_GR is used for a player which can play back only audio data complying with the audio format (i.e., a player which can play back only AOTT).

Audio title ATT has the following three variations.
<B1> ATT has only AOTT.
<B2> ATT has only AVTT.
<B3> ATT has both AOTT and AVTT (in this case, ATT has AVTT and AOTT corresponding to different versions (with and without a picture) of an identical tune).

In case of <B1>, search information for AOTT is described in both ATT_SRPT and AOTT_SRPT (see FIGS. 20 and 22).

In case of <B2>, search information for AVTT is described in only ATT_SRPT (see FIG. 20).

In case of <B3>, search information for AOTT is described in only AOTT_SRPT, and that for AVTT is described in only ATT_SRPT (see FIG. 20).

FIG. 23 exemplifies the relationship among <B1> to <B3> above. That is, FIG. 23 exemplifies the relationship between audio only title group AOTT_GR accessed by audio only title search pointer AOTT_SRP in audio manager information AMGI shown in FIG. 17, and audio title group ATT_GR accessed by audio title search pointer ATT_SRP in that audio manager information AMGI. In other words, FIG. 23 shows an example of the relationship between ATT_SRPT and AOTT_SRPT.

Referring to FIG. 23, audio titles ATT#1 and ATT#9 are made up of only audio video titles AVTT, ATT#2 and ATT#3 of audio video titles AVTT and audio only titles AOTT, and ATT#4, ATT#5, ATT#7, and ATT#8 of only audio only titles AOTT.

In the example shown in FIG. 23, nine audio titles ATT are used, are classified into four groups (GR#1 to GR#4) to form audio title groups ATT_GR, and are classified into two groups (GR#1 and GR#2) to form audio only title groups AOTT_GR.

In this example, audio titles ATT#1 and ATT#9 consist of AVTT alone, and do not include any AOTT. Hence, ATT#1 and ATT#9 do not exist as audio only title group AOTT_GR.

For this reason, the number (four in this example) of audio title groups ATT_GR does not generally match that (two in this example) of audio only title groups AOTT_GR.

It is necessary to maintain consistency of title group TT_GR upon playing back an ATT group between a player which can play back picture and audio data complying with the audio format (i.e., a player which can play back both AOTT and AVTT), and a player which can play back only audio data complying with the audio format (i.e., a player which can play back only AOTT).

More specifically, even though corresponding ATT_GR and AOTT_GR have different GR numbers, they should include identical ATTs and have the same order of ATTs in TT_GR. Otherwise, the user is confused. Of course, in this case, ATTs (ATT#1 and ATT#9) which consist of AVTT alone but include no AOTT are excluded.

To meet this "demand", "ATT not defined as AOTT" and "ATT defined as AOTT" are prevented from being present in single ATT_GR. In this way, the consistency in TT_GR can be maintained for ATTs included in both ATT_GR and AOTT_GR.

In the example shown in FIG. 23, ATT_GR#2 and AOTT_GR#1, and ATT_GR#3 and AOTT_GR#2 are respectively made up of identical ATTs, and have the same orders of ATT in TT_GR.

Figure 24:
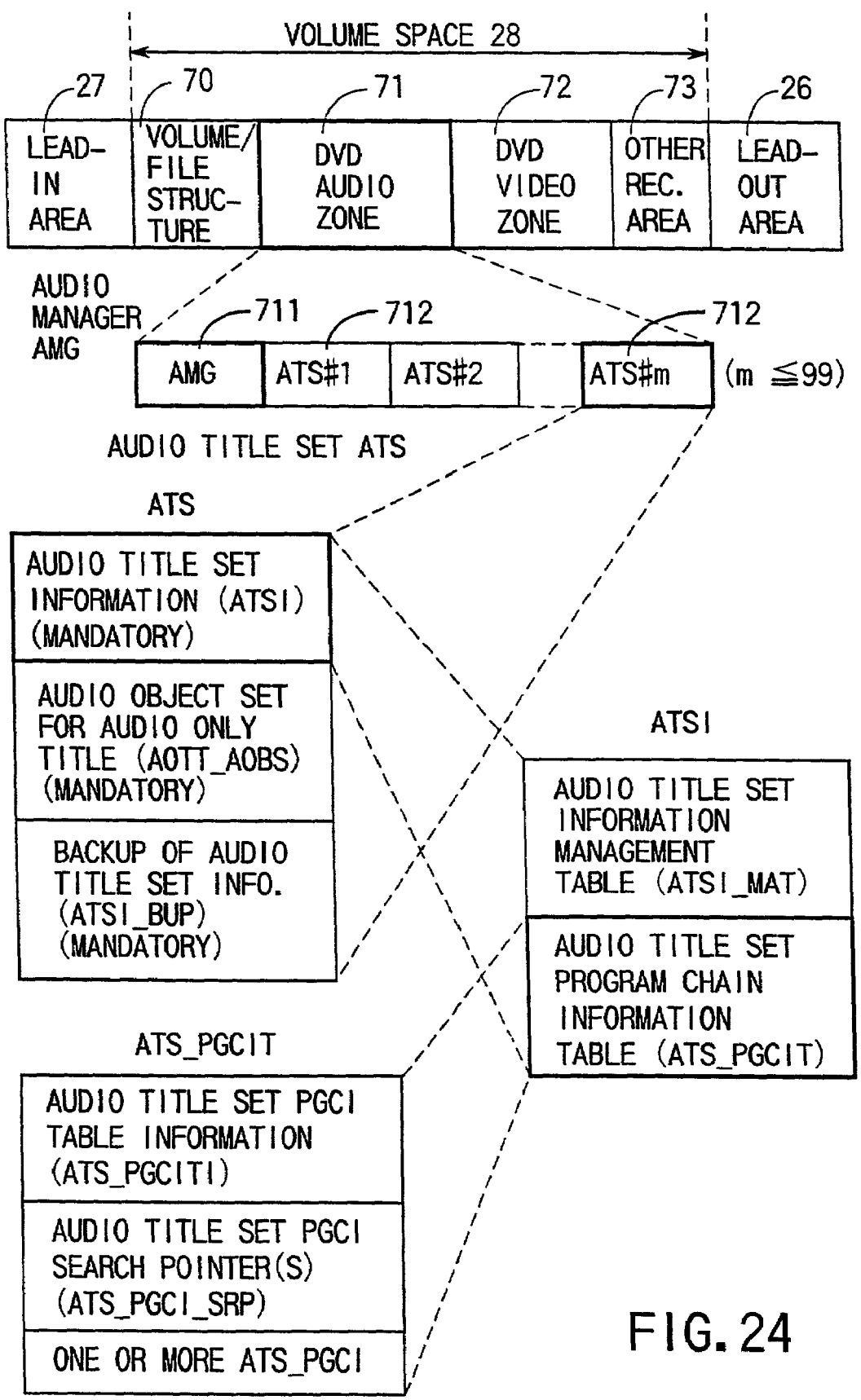
FIG. 24 is a view for explaining the recording contents of an audio title set (ATS) in the DVD audio zone shown in FIG. 3.

FIG. 24 is a view for explaining the recording contents of an audio title set (ATS) in the DVD audio zone shown in FIG. 3.

Audio title set ATS is made up of audio title set information ATSI, audio only title set audio object set AOTT_AOBS, and audio title set information backup ATSI_BUP.

Audio title set information ATSI includes audio title set management table ATSI_MAT, and audio title set program chain information table ATS_PGCIT.

Audio title set program chain information table ATS_PGCIT includes audio title set program chain information table information ATS_PGCITI, audio title set program chain information search pointer ATS_PGCI_SRP, and one or more pieces of audio title set program chain information ATS_PGCI.

FIG. 25 shows the recording contents of audio title set information management table ATSI_MAT shown in FIG. 24.

More specifically, this audio title set information management table ATSI_MAT includes: an audio title set identifier (ATSI_ID); the end address (ATS_EA) of an audio title set; the end address (ATSI_EA) of audio title set information; the version number (VERN) of the audio format used; the end address (ATSI_MAT_EA) of the audio title set information management table; the start address (VTS_SA) of audio only title AOTT video title set VTS; the start address (AOTT_AOBS_SA) of an audio only title audio object set or the start address (AOTT_VOBS_SA) of an audio only title video object set; the start address (ATS_PGCIT_SA) of the audio title set program chain information table; attributes (AOTT_AOB_ATR) #0 to #7 of an audio only title audio object set or attributes (AOTT_VOB_ATR) #0 to #7 of an audio only title video object set; coefficients (ATS_DM_COEFT) #0 to #15 to mix down audio data; and other reserved areas.

In start address VTS_SA of VTS for AOTT, the start address of VTS including VTSTT_VOBS (FIG. 8) used for AOTT is written when ATS has no AOTT_AOBS. On the other hand, when ATS has AOTT_AOBS, "00000000h" is written in VTS_SA.

In AOTT_AOBS_SA, the start address of AOTT_AOBS is written as the number of relative logical blocks from the first logical block of ATS when ATS has AOTT_AOBS. On the other hand, when ATS has no AOTT_AOBS, the start address of VTSTT_VOBS is written as the number of relative logical blocks from the first logical block of VTS that includes VTSTT_VOBS used for ATS.

In ATS_PGCIT_SA, the start address of ATS_PGCIT is written as the number of relative logical blocks from the first logical block of ATSI.

Eight attributes #0 to #7 are prepared for AOTT_AOB_ATR or AOTT_VOB_ATR. When ATS has AOTT_AOBS, the attribute of AOTT_AOB written in ATS is written in AOTT_AOBS_ATR. On the other hand, when ATS has no AOTT_AOBS, the attribute of an audio stream in VOB used for AOTT_VOB in ATS is written in AOTT_VOB_ATR. In AOTT_AOB_ATR or AOTT_VOB_ATR, the sampling frequency (44 to 192 kHz) used and the number of quantization bits (16 to 24 bits) are written.

ATS_DM_COEFT indicates a coefficient upon mixing down audio data having multichannel outputs (5.1-channel outputs) like in AC-3, DTS, or the like to 2-channel outputs, and is used in only one or more AOTT_AOBs recorded in ATS. When ATS has no AOTT_AOBS, "0h" is written in all the bits of 16 coefficients ATS_DM_COEFT (#0 to #15). Areas for these 16 coefficients ATS_DM_COEFT (#0 to #15) are steadily assured.

Each ATS_SPCT_ATR has a 16-bit configuration: 2 bits (bits b15 and b14) on the MSB side represent a video compression mode (MPEG2 or the like); the next 2 bits (bits b13 and b12) a TV system (NTSC, PAL, SECAM, or the like); the next 2 bits (bits b11 and b10) the aspect ratio (4:3, 16:9, or the like) of a picture; and the next 2 bits (bits b9 and b8) a display mode (4:3 display, 16:9 display, letter box display, or the like on a TV monitor having a 4:3 size). The next 2 bits (bits b7 and b6) are reserved bits for the future. The next 3 bits (bits b5 to b3) represent the resolution (720 lines in the horizontal direction×480 lines in the vertical direction in the NTSC system), 720 lines in the horizontal direction×576 lines in the vertical direction in the PAL system, or the like) of a still picture. The last 3 bits (bits b2 to b0) on the LSB side are reserved bits for the future.

Figure 26:
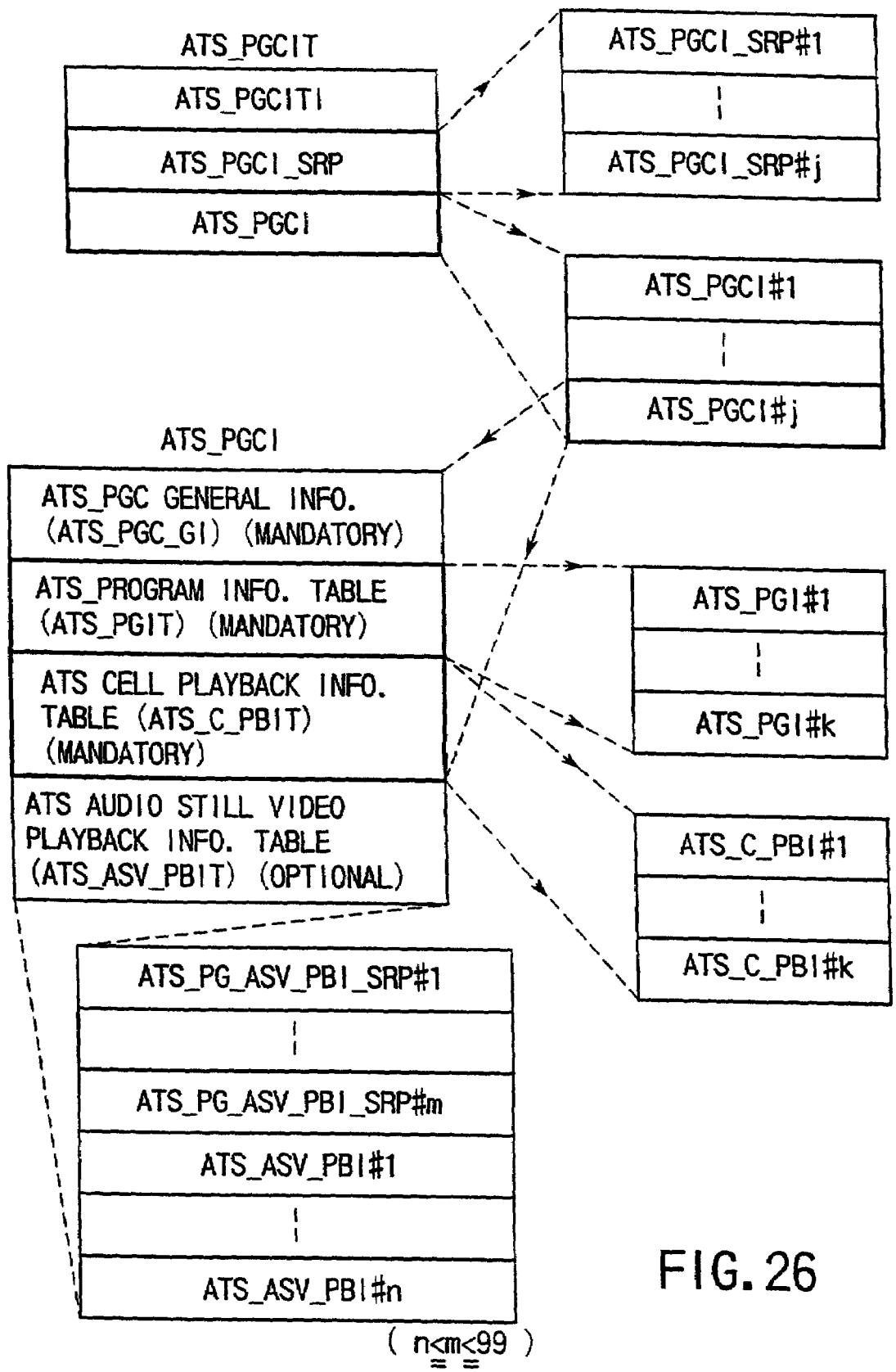
FIG. 26 is a view for explaining the contents of an audio title set program chain information table (ATS_PGCIT) included in the audio title set information (ATSI) shown in FIG. 24.

FIG. 26 is a view for explaining the contents of audio title set program chain information table ATS_PGCIT included in audio title set information ATSI shown in FIG. 24 (the recording location of this ATS_PGCIT is written in ATS_PGCIT_SA in ATSI_MAT shown in FIG. 25).

This ATS_PGCIT contains audio title set program chain information table information ATS_PGCITI, audio title set program chain information search pointer ATS_PGCI_SRP, and audio title set program chain information ATS_PGCI, as described above.

ATS_PGCI_SRP includes one or more audio title set program chain information search pointers (ATS_PGCI_SRP#1 to ATS_PGCI_SRP#j), and ATS_PGCI includes the same number of pieces of audio title set program chain information (ATS_PGCI#1 to ATS_PGCI#j) as that of pointers ATS_PGCI_SRP.

Each ATS_PGCI serves as navigation data for controlling playback of audio title set program chain ATS_PGC.

Note that ATS_PGC is a unit for defining audio only title AOTT, and is made up of ATS_PGCI and one or more cells (those in AOTT_AOBS or those in AOTT_VOBS used as an object for AOTT).

Each ATS_PGCI contains audio title set program chain general information (ATS_PGC_GI), an audio title set program information table (ATS_PGCIT), an audio title set cell playback information table (ATS_C_PBIT), and an audio title set audio still video playback information table (ATS_ASV_PBIT).

ATS_PGCIT includes one or more pieces of audio title set program information (ATS_PGI#1 to ATS_PGI#k), and ATS_C_PBIT includes the same number of pieces of audio title set cell playback information (ATS_C_PBI#1 to ATS_C_PBI#k) as the number of pieces of information ATS_PGI.

On the other hand, ATS_ASV_PBIT includes ATS program audio still video playback information search pointers (ATS_PG_ASV_PBI_SRP#1 to ATS_PG_ASV_PBI_SRP#m), and ATS audio still video playback information (ATS_ASV_PBI#1 to ATS_ASV_PBI#n; n≦m≦99).

FIG. 27 shows the contents of audio title set program information ATS_PGI shown in FIG. 26.

This ATS_PGI includes the contents (ATS_PG_CNT) of an audio title set program, an ATS_PG entry cell number (ATS_PG_EN_CN), the start presentation time (FAC_ST_PTM) of the first audio cell in ATS_PG, the playback time (ATS_PG_PB_TM) of ATS_PG, and the pause time (ATS_PG_PA_TM) of ATS_PG.

ATS_PG_CNT includes: an entry representing the relationship between the previous and current programs; an entry representing the relationship between the playback time stamps of the previous and current programs; an entry (ATRN) representing the attribute of AOB or that of an audio stream in VOB; and an entry (DM_COEFTN) indicating a coefficient table number to mix down AOB in ATS_PG (AOB_PG) having the number of AOTT_AOB_ATR or AOTT_VOB_ATR defined in ATSI_MAT using the number of ATS_DM_COEFT defined in ATSI_MAT.

ATS_PG_EN_CN includes an entry of the number (1 to 255) of the first ATS cell that forms ATS_PG.

FAC_ST_PTM includes an entry of lower 32 bits of the playback time stamp (or presentation time stamp PTS) described in the first audio packet in the first audio cell in ATS_PG.

ATS_PG_PB_TM describes the total playback time of cells in ATS_PG. The total playback time (seconds) assumes a value obtained by dividing ATS_PG_PB_TM (32-bit data) by 90,000.

ATS_PG_PA_TM describes the pause time that can be defined at the beginning of ATS_PG. This pause time (seconds) assumes a value obtained by dividing ATS_PG_PA_TM (32-bit data) by 90,000.

FIG. 28 shows the contents of audio title set cell playback information ATS_C_PBI shown in FIG. 26.

This ATS_C_PBI includes an index number (ATS_C_IXN) of a cell (ATS_C) in an audio title set, the type (ATS_C_TY) of ATS_C, the start address (ATS_C_SA) of ATS_C, and the end address (ATS_C_EA) of ATS_C.

In ATS_C_IXN, "01h" is written when ATT has no AOBS.

When ATT has AOBS, the contents of ATS_C_IXN change as follows in accordance with the contents of ATS_C.

*When ATS_C is the silent cell or picture cell described above, "00h" is written in ATS_C_IXN as the index number of this ATS_C; and

*when ATS_C is the above-mentioned audio cell, one of "1" to "99" is written in ATS_C_IXN as the index number of this ATS_C.

The index number of the first audio cell (having ATS_C with the smallest number except for picture and silent cells) in ATS_PG is set at "1". Similar index numbers may be appropriately assigned to one or more cells ATS_C in ATS_PG.

In all bits of ATS_C_TY, "0" is written when ATT has no AOBS.

On the other hand, when ATT has AOBS, the composition (ATS_C_COMP) of ATS_C and its usage (ATS_C_Usage) are written in ATS_C_TY.

More specifically, when the cell of interest is an audio cell consisting of only audio data, "00b" is written in ATS_C_COMP (2 bits);

when the cell of interest is an audio cell consisting of audio data and real time information, "01b" is written in ATS_C_COMP (2 bits);

when the cell of interest is a silent cell consisting of only audio data, "10b" is written in ATS_C_COMP (2 bits); and when the cell of interest is a picture cell consisting of only still picture data, "11b" is written in ATS_C_COMP (2 bits).

On the other hand, ATS_C_Usage is written with data (0001b) indicating the usage as a "spotlight part" for highlighting (spotlighting) the currently displayed specific part of audio manager menu AMGM.

When ATS has AOTT_AOBS, ATS_C_SA describes the start address of ATS_C expressed by the relative logical block number from the first logical blocks of AOTT_AOBS which records that ATS_C.

On the other hand, when ATS has no AOTT_AOBS, ATS_C_SA describes the start address of ATS_C expressed by the relative logical block number from the first logical block in AOTT_VOBS which records that ATS_C.

When ATS has AOTT_AOBS, ATS_C_EA describes the end address of ATS_C expressed by the relative logical block number from the first logical blocks of AOTT_AOBS which records that ATS_C.

On the other hand, when ATS has no AOTT_AOBS, ATS_C_EA describes the end address of ATS_C expressed by the relative logical block number from the first logical block in AOTT_VOBS which records that ATS_C.

FIG. 29 is a block diagram showing an example of an apparatus for playing back information recorded on the audio zone shown in FIG. 3 or the video zone shown in FIG. 4 from the optical disc (DVD audio disc) shown in FIG. 1. This playback apparatus has an arrangement of a DVD video DVD audio compatible player that can play back not only audio data but also video data. (Although the detailed description of the arrangement will be omitted, this player may be compatible with existing CDs.)

The optical disc playback apparatus shown in FIG. 29 comprises remote controller 5 for accepting user's operations, remote controller receiver 4A for receiving the operation state of remote controller 5, key input portion 4 for accepting user's operations on the playback apparatus main body side, and panel display 4B which informs the user of his or her operation result, the playback process of DVD audio disc 10, and the like, and is arranged on the playback apparatus main body (and/or remote controller). As external devices in addition to these devices, monitor 6, and loudspeakers 8L and 8R are prepared. (The illustrated loudspeakers are used for a 2-channel stereophonic system. However, upon multichannel playback, a required number of loudspeaker systems and their drive amplifiers are prepared separately.)

Key input portion 4, panel display 4B, remote controller 5, and monitor 6 make up a visual user interface. Monitor 6 is used not only as a playback video monitor of a DVD audio disc with a still picture, but also as a display means for, e.g., on-screen display OSD or the like. Monitor 6 is not limited to a direct-view type CRT display, liquid crystal display, plasma display, or the like, but may comprise a video projector for projecting various video data (menu window, still picture obtained by taking the recording site, and the like) including OSD information onto a large screen, in addition to the direct-view type display.

User operation information input at remote controller 5 is supplied to microcomputer (MPU or CPU) 500 of system controller 50, which controls the operation of the overall playback apparatus, via remote controller receiver 4A. Controller 50 also includes ROM 502 which stores a control program and the like executed by MPU 500.

User operation information input at key input portion 4 is directly supplied to MPU 500. MPU 500 appropriately displays the operation conditions (various setup states and playback information of a DVD disc) of the playback apparatus corresponding to the user operation information on panel display 4B.

MPU 500 is connected to RAM 52 and memory interface (memory I/F) 53. The I/O control of RAM 52 is made via memory I/F 53. MPU 500 uses RAM 52 as a work area, and controls the operations of disc drive 30, system processor 54, video decoder 58, audio decoder 60, sub-picture decoder 62, and DAC & reproduction processing block 64 on the basis of various processing programs stored in ROM 502.

Disc drive 30 rotates disc 10 set on a tray (inside DISC•TRAY•INLET in FIG. 30) of the playback apparatus main body, and reads out from disc 10 recorded data (in addition to audio data including voice/music information, main picture data/video data containing moving picture information/still picture information, sub-picture data containing superimposed dialog information/menu information, and the like if they are recorded on disc 10). Readout data are subjected to signal processing such as signal demodulation, error correction, and the like, and are converted into a data sequence in the pack format (see FIGS. 6 to 8). Then, the data sequence is sent to system processor 54.

System processor 54 has a packet transfer processor (not shown) which determines the types of various packets contained in data played back from disc 10, and distributes data in these packets to the corresponding decoders (58 to 62).

The packet transfer processor segments the data sequence in the pack format from the disc drive 30 in units of types of packs (navigation pack, video pack, sub-picture pack, audio pack, real time information pack, and still picture pack). Each segmented pack records transfer time data and ID data indicating the type of data.

System processor 54 transfers the video pack, sub-picture pack, and audio pack respectively to video decoder 58, sub-picture decoder 62, and audio decoder 60 with reference to the transfer time data and ID data of these packs. Note that the still picture pack is transferred to video decoder 58. The audio pack corresponding to silent cells or real time information pack is transferred to audio decoder 60.

Also, system processor 54 transfers control data in the navigation pack to RAM 52 via memory I/F 53. MPU 500 controls playback operations of the individual units of the playback apparatus main body with reference to the transferred control data in the RAM.

Video decoder 58 generates video data before compression by decoding MPEG-encoded video data in the video pack transferred from system processor 54.

Sub-picture decoder 62 generates bitmap sub-picture data before compression by decoding runlength-compressed sub-picture data in the sub-picture pack transferred from system processor 54.

This sub-picture decoder 62 has a highlight processor (not shown) for highlighting (in case of DVD video) or spotlighting (in case of DVD audio) decoded sub-picture data in addition to a sub-picture decoder for decoding sub-picture data from system processor 54.

The sub-picture decoder obtains an original bitmap picture by expanding pixel data (including emphasized pixels, pattern pixels, background pixels, and the like) in units of a predetermined number of bits (2 bits), which have been runlength-compressed according to a predetermined rule.

The highlight processor (not shown) executes corresponding highlight processing (spotlight processing) in accordance with highlight information or spotlight information (e.g., the X- and Y-coordinate values which define a rectangular region where a menu selection item is displayed, color code, and highlight color (spotlight color)/contrast value) supplied from MPU 500.

The highlight processing can be used as a means for helping the user easily recognize a specific displayed item (a button for selecting a specific item such as the type of playback spoken language, the type of language used for the playback superimposed dialog, and the like; or a button for selecting a specific item such as the sampling frequency, the number of quantization bits, the number of playback channels, and the like of playback sound) on the visual user interface on monitor 6.

Incidentally, one spotlight part is defined as a cell. The spotlight is used to specify specially selected part by the content provider. A DVD audio player may selectively present the spotlight parts as an optional function.

When the color and contrast of the decoded sub-picture data in units of pixels have been changed in correspondence with the highlight information (spotlight information), the changed sub-picture data is supplied to a picture synthesizer (not shown) in video processor 640. The picture synthesizer synthesizes the decoded picture data and the sub-picture data after the highlight processing (spotlight processing), and the synthesized picture is displayed on monitor 6.

RAM 52 mentioned above includes a menu table for storing the start addresses of a sub-picture menu, audio menu, angle menu, chapter (program) menu, and the like. To emphasize a specific portion of these menus, the highlight processing (spotlight processing) may be used.

Audio decoder 60 generates monaural, 2-channel stereophonic, or multichannel stereophonic audio data by decoding audio data in the audio pack transferred from system processor 54. When audio data in the audio pack is compression-encoded data (MPEG, AC-3, or the like), that data is decoded inside audio decoder 60.

Video data (normally, moving picture signal) decoded by video decoder 58, and sub-picture data (normally, superimposed dialog or menu bitmap data) decoded by sub-picture decoder 62 are transferred to video processor 640. In this video processor 640, the video data and sub-picture data are mixed at a predetermined ratio to obtain a final analog video signal (composite video signal, separate S signal, or component signals Y/Cr/Cb). Then, the analog video signal is output to monitor 6.

When the video data decoded by video decoder 58 corresponds to main part of a movie on DVD video disc 10, the sub-picture data normally corresponds to a superimposed dialog in the language selected by the user. Hence, the movie with the superimposed dialog is played back on monitor 6.

When the video data decoded by video decoder 58 corresponds to menu part of the movie, the sub-picture data normally corresponds to characters that make up the menu and user selection buttons (appropriately highlighted). In such case, a menu background (still picture or moving picture) is displayed on monitor 6 on the basis of the video data, and buttons, the display states of which change in correspondence with user's selection operations, are superimposed on the background picture on the basis of the sub-picture data.

On the other hand, when the video data decoded by video decoder 58 corresponds to a still picture of DVD audio disc 10, the sub-picture data corresponds to, e.g., comment text in the language selected by the user. In such case, a still picture with text is displayed on monitor 6.

Note that video processor 640 includes an OSD unit for generating on-screen display (OSD) data. User's operation at, e.g., remote controller 5 is processed by MPU 500, and the processing result is sent from MPU 500 to the OSD unit of video processor 640. The OSD unit generates picture data corresponding to the processing result from MPU 500, and outputs it in the analog video signal format to monitor 6.

In other words, video processor 640 converts and multiplexes digital signals output from video decoder 58 and sub-picture decoder 62 into an analog signal.

Frame memory 642 is connected to video processor 640. Frame memory 642 is used for multiplexing pictures of the video and sub-picture data, and is also used for n-split (e.g., 4-split) multiscreen display.

Frame memory 642 can be used when video data from video decoder 58 is frozen as a still picture in case of, e.g., a chapter search, and the still picture is sent to monitor 6 before the target chapter begins to be played back.

Furthermore, frame memory 642 can also be used when an OSD display corresponding to the user's operation result is multiplexed on video data.

Audio data decoded by audio decoder 60 is transferred to DAC & output circuit 644. DAC & output circuit 644 converts the audio data (digital) from audio decoder 60 into an analog audio signal, appropriately amplifies the signal, and then sends that signal to loudspeakers BL and 8R.

When multichannel audio data are mixed down to 2-channel audio data on the basis of the entry of ATS_DM_COEFT in audio title set information management table ATSI_MAT (cf. explanation of FIG. 25), the mix-down coefficient (parameter) is sent from MPU 500 to DAC & output circuit 644. Then, DAC & output circuit 644 mixes down multichannel audio data decoded by audio decoder 60 to 2-channel data on the basis of the received coefficient, and outputs 2-channel analog audio signals.

Video processor 640, frame memory 642, and DAC & output circuit 644 make up the DAC & reproduction processing block.

Note that system processor 54, video decoder 58, audio decoder 60, and sub-picture decoder 62 respectively include system time clock (STC) for operation timings and a register for temporarily storing commands, information, and the like sent from system MPU 500.

Figure 30:
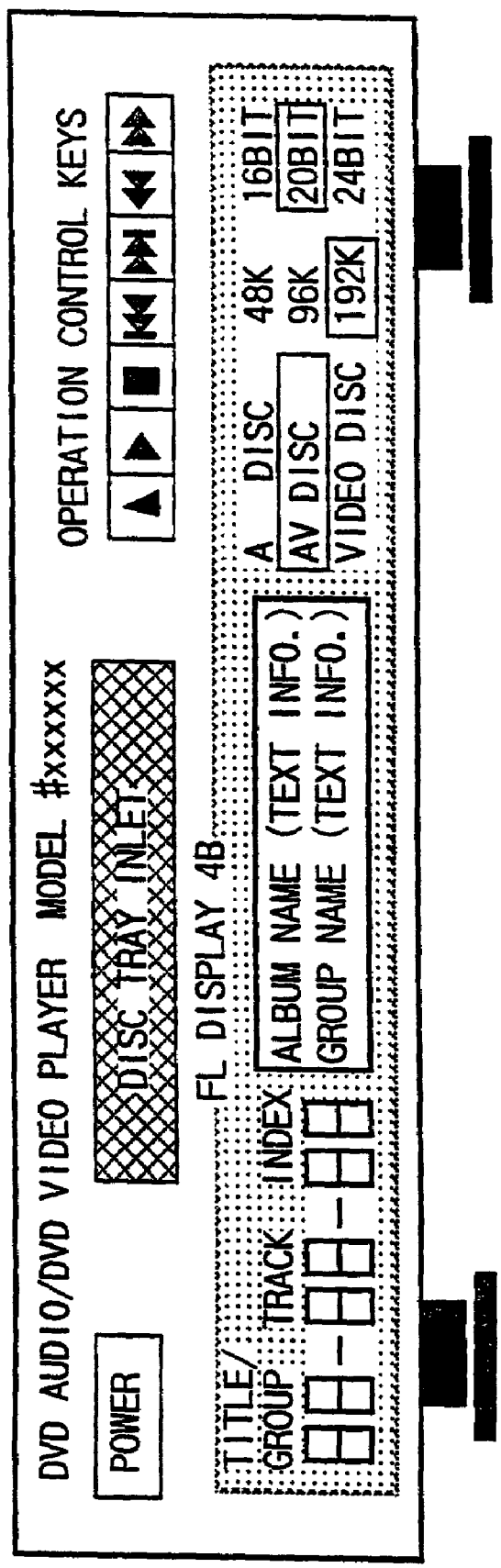
FIG. 30 is a view showing an example of a front panel of the playback apparatus shown in FIG. 29.

FIG. 30 shows an example of the front panel of the playback apparatus shown in FIG. 29. This front panel has fluorescent display (FL display) 4B corresponding to panel display 4B shown in FIG. 29.

FL display 4B shown in FIG. 30 displays an album name and/or group name as characters in accordance with audio text data manager ATXTDT_MG in AMGI. In the example shown in FIG. 9, "Vol. 1 of works of Beethoven" is displayed as the album name, and "Symphony No. 1" is displayed as the group name.

Also, a numeric indicator on the left side of FL display 4B displays a title number (in case of DVD video) or group number (in case of DVD audio), track number, and index number.

When optical disc 10 set on the disc tray shown in FIG. 30 is an AV disc (a disc having ATT_SRP shown in FIG. 20), a character indicator on the right side near the center of FL display 4B highlights "AV disc", as shown in FIG. 30. When the set disc is an A disc (a disc having AOTT_SRP shown in FIG. 22), "A disc" is highlighted on the character indicator on the right side of FL display 4B. When the set disc is a video disc which has no ATS but consists of only VTS (a disc having no ATS directory shown in FIG. 12), "video disc" is highlighted on the character indicator on the right side of FL display 4B.

Furthermore, a numeric indicator on the right side of FL display 4B indicates the sampling frequency and the number of quantization bits of the audio contents to be played back. These indications can be automatically made on the basis of the contents of AOTT_AOB_ATR or AOTT_VOB_ATR in audio title set information management table ATSI_MAT.

A DVD audio player that plays back DVD audio disc (A disc or AV disc) 10 may include the following two types of players:

<C1> a player that can play back both picture and audio data complying with the audio format, i.e., a player that processes both AOTT and AVTT; and <C2> a player that can play back only audio data complying with the audio format, i.e., a player that processes only AOTT.

The player of type <C1> suffices to load only search information (FIG. 20) described in ATT_SRPT to playback contents.

On the other hand, the player of type <C2> suffices to load only search information (FIG. 22) described in AOTT_SRPT to playback contents.

In this manner, the playback methods of the respective types of players can be facilitated. Of course, the player of type <C2> cannot play. back ATT#1 and ATT#9 in FIG. 23 since they do not include any AOTT.

The above-mentioned DVD audio player shown in FIG. 29 corresponds to that of type <C1>. The operation of this player will be explained below taking playback of disc 10 with the data structure shown in FIG. 14 as an example.

When disc 10 with the data structure shown in FIG. 14 is to be played back by a normal DVD video player, this video player loads VMG in the VTS directory under the root directory shown in FIG. 12, and determines a title to be played back on the basis of the loaded information. The player plays back all or some objects in object set VOBS#1 or VOBS#2 in FIG. 14 in accordance with an instruction of a playback unit defined in VTS corresponding to the determined title.

In the data structure shown in FIG. 14, the video player recognizes areas other than VMG, VTS#1, and VTS#2 as other recording area 73 (FIGS. 3 and 4). For this reason, the video player can normally play back VOBS#1 and VOBS#2 independently of data recorded in the areas recognized as other recording area 73. In this case, objects present in other recording area 73 cannot be played back by the video player.

On the other hand, disc 10 with the data structure shown in FIG. 14 is to be played back by the DVD audio player shown in FIG. 29, this audio player loads AMG in the ATS directory under the root directory shown in FIG. 12, and plays back contents on the basis of the loaded information. Upon title designation by AMG, a playback unit defined in VTS recorded in DVD video zone 72 (FIG. 4) can be designated as well as a playback unit defined in ATS recorded in DVD audio zone 71 (FIG. 3).

The playback unit defined in ATS designates not only the playback route of objects (AOBS#1 or AOBS#2) recorded in DVD audio zone 71 but also designates that of audio data recorded in objects (e.g., VOBS#1) in DVD video zone 72.

VOBS#1 indicated by hatching in FIG. 14 exemplifies DVD video part shared from the DVD audio side. Note that arrow (a) indicates a case wherein the playback unit in video zone 72 is referred to, and arrow (b) indicates a case wherein audio part of objects (VOBS#1) in video zone 72 is referred to by the playback unit in audio zone 71.

When audio part of objects (VOBS#1) in video zone 72 is referred to by the playback unit in audio zone 71, the shared reference part (shared by DVD audio and DVD video) can have a definition different from that of individual units (cell, program, program chain) defined by definition information (VTSI) of the playback unit in video zone 72. That is, the video player and audio player may have different playback methods for even an identical object (see FIG. 5).

Note that the shared part is used in units of video object units VOBU. This is because audio data streams and other (video and sub-picture) data streams are packed and time-division multiplexed in units of VOBUs.

As shown in FIG. 14, since audio zone 71 is physically located in front of video zone 72, the addresses of playback units designated from their management information can be limited to those in the positive direction. In this way, design and development of an audio player can be simplified.

Note that the operation of the video player using the data structure shown in FIG. 16 is the same as that in FIG. 14 mentioned above.

The operation of the audio player using the data structure shown in FIG. 16 is nearly the same as that in FIG. 14. The audio player jumps to the beginning of AMG to load management information, and plays back object sets AOBS#1 and AOBS#2. Although AOBS#1 is an object in the DVD video zone, ATSI#1 re-defines cells, programs, and a program chain of AOBS#1. Note that AOBS#1 is also used in units of VOBUs.

The embodiment described above has exemplified a case wherein DVD audio data and/or DVD video data contained in volume space 28 are recorded on optical disc 10. However, the data structure (FIGS. 3 to 28) of the present invention is not limited to data recorded on optical disc 10. For example, bit streams containing data with the structure shown in FIGS. 3 and 12 may be received via digital broadcast or digitally communication. (In such case, a radio wave or communication line serves as a medium. Also, a DVD broadcast receiver or a communication terminal such as a personal computer serves as a DVD audio player.)

Figure 31:
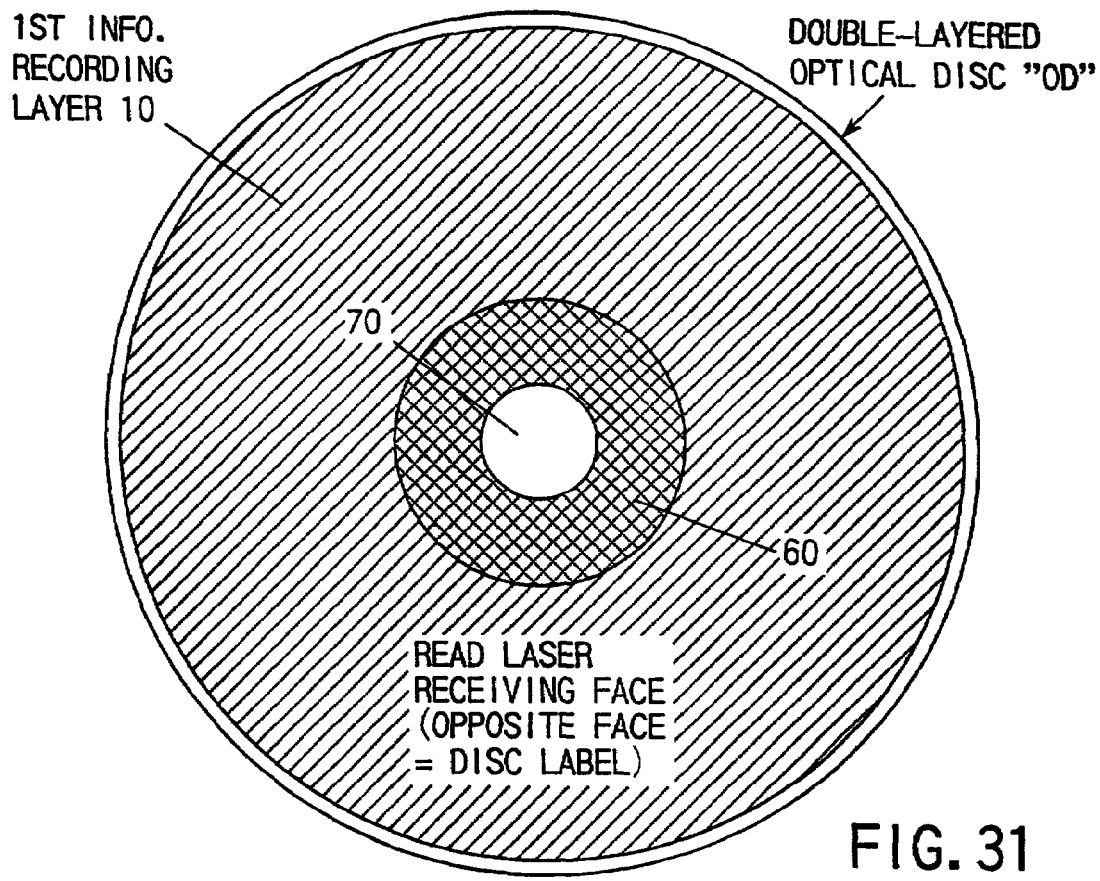
FIG. 31 is a plan view of a double-layered optical disc according to an embodiment of the present invention when viewed from the read laser receiving face side.

FIG. 31 is a plan view of double-layered optical disc OD used as another example of a two-substrate-joined information recording medium of the present invention, when viewed from the read laser receiving face side. This optical disc OD has an outer diameter of 120 mm, center hole 70 defining its inner diameter of 15 mm, and a thickness of 1.2 mm, and is prepared by joining two 0.6-mm thick polycarbonate substrates. Each of the joined substrates is formed with a doughnut-like information recording layer (FIG. 31 illustrates only layer 10 of one substrate). The inner diameter of this doughnut-like information recording layer is approximately 45 mm, and its outer diameter is around 117 mm in maximum. Polymer film spacer 60 (an inner diameter of 15 to 16 mm, an outer diameter of 20 to 21 mm, and a thickness around 40 μm to 70 μm (e.g., 50 μm)) is placed coaxial with center hole 70 of optical disc OD with the aforementioned structure, while being sandwiched between the two substrates.

As a polymer film used for spacer 60, a polycarbonate film, polyethylene terephthalate film, polyimide film, and the like can be used unless otherwise specified. When label information is printed there, a polycarbonate film is suitable. In this case, upon printing a label, the practical thickness after printing is controlled to a desired thickness (e.g., 50 μm)

Note that spacer 60 may be omitted as long as the spacing between joined substrates 30 and 40 can be managed to fall within the range between 40 μm to 70 μm.

Figure 32:
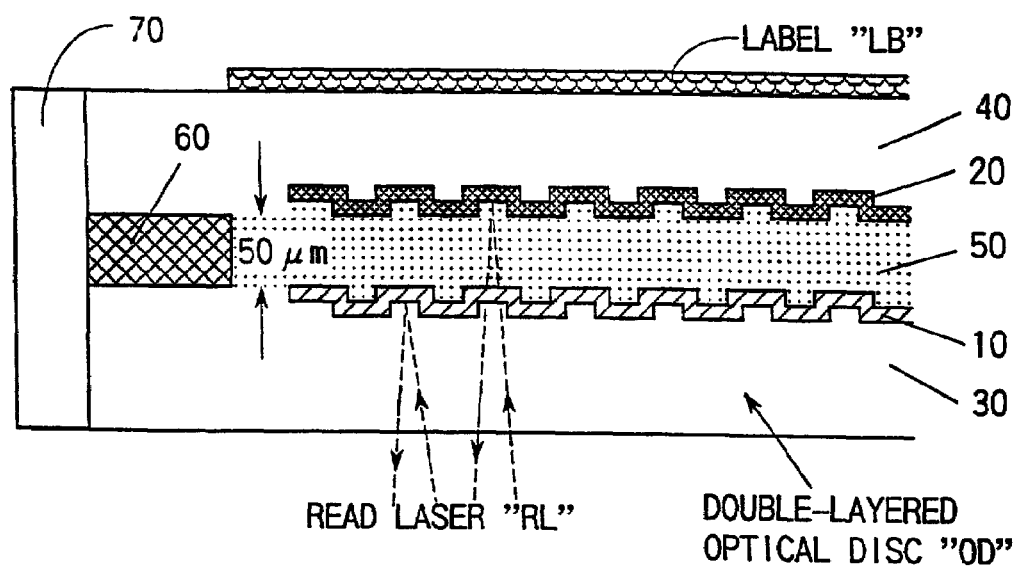
FIG. 32 is a partial schematic sectional view of the double-layered optical disc shown in FIG. 31.

FIG. 32 is a partially enlarged schematic sectional view of double-layered optical disc OD shown in FIG. 31. As shown in FIG. 32, this disc OD is comprised of polycarbonate substrate 30 for holding a first information recording layer, gold thin film (first recording layer; a thickness of 11 to 14 nm, e.g., around 13 nm) 10 on which first information is recorded, adhesive layer 50 which is transparent with respect to laser beam RL, aluminum-molybdenum alloy thin film (second information recording layer; a thickness of 40 nm or more, e.g., around 100 nm) 20, and polycarbonate substrate 40 for holding the second information recording layer, when viewed from the receiving face of read laser beam RL. On the surface of substrate 40 opposite to the read laser RL receiving face of substrate 30, label LB that prints information (visual pattern information such as characters, graphics, patterns, and the like) pertaining to recorded information (the first information and second information) is adhered, as needed.

Film spacer 60 coaxially sandwiched between substrates 30 and 40 at the position of center hole 70 has a thickness of 50 μm, and adhesive layer 50 sandwiched between substrates 30 and 40 at the same level as spacer 60 has a constant thickness (around 55±15 μm) nearly the same as the film thickness (50 μm) of spacer 60. If the thickness of adhesive layer 50 need be increased, the film thickness of spacer 60 can be increased accordingly.

By selecting the film thickness of gold thin film 10 that forms the first information recording layer to fall within the range from 11 nm to 14 nm (preferably, around 13 nm), read laser reflected light beams having nearly the same intensities can be obtained from both first and second information recording layers 10 and 20.

Note that first information recording layer 10 may be formed of another material (gold alloy, copper, silver, brass, copper-zinc alloy, copper-aluminum alloy, or the like) that exhibits a laser reflectance and laser transmittance equivalent to those of the gold thin film with respect to read laser beam having a wavelength of 650 nm (or 635 nm).

By selecting the film thickness of the aluminum-molybdenum alloy thin film 20 that forms the second information recording layer to be 40 nm or more, the laser reflectance of film 20 can be set at a practically sufficient value (reflectance of 80% or more). In this embodiment, the film thickness setup value of second information recording layer 20 is selected to be around 100 nm.

Second information recording layer 20 can be formed of aluminum alone. However, using an alloy of aluminum and a high-melting point metal such as molybdenum, tantalum, cobalt, chromium, titanium, platinum, or the like, aging (environmental reliability) of the reflectance of thin film 20 for the second information recording layer can be greatly reduced.

Molybdenum has a function of improving the oxidation resistance of second information recording layer 20, but its mixing ratio has a proper range, i.e., falls within the range from 1 to 20 at % in practice. The ratio of molybdenum in aluminum-molybdenum alloy thin film 20 preferably falls within the range from 1 to 20 at %. In this embodiment, the ratio of molybdenum is set at 20 at %. If this ratio is higher than 20 at %, the laser reflectance of second information recording layer 20 lowers even when thin film 20 has a film thickness of 40 nm or more.

The wavelength of read laser beam RL may be 635 nm in addition to 650 nm mentioned above, or may be shorter. However, if a different wavelength is used, the optimal film thickness of spacer 60 may change (the optimal film thickness may also change depending of the physical properties of adhesive layer 50). It is practical to experimentally determine the optimal film thickness using a plurality of samples after the laser wavelength, the material of adhesive layer 50, the materials of substrates 30 and 40 used in practice are determined. This determination is made so that the C/N (carrier to noise ratio) of the read signal from each of recording layers 10 and 20 has a desired value or more, and a sufficiently high joint strength of substrates 30 and 40 is assured.

The following physical parameters of joined optical disc OD shown in FIGS. 31 and 32 may be used.

---

[Outer Diameter]

12-cm disc > 120.00 ± 0.30 mm
 8-cm disc > 80.00 ± 0.30 mm
[Center Hole 70]

12-cm/8-cm (common) > 15.00 + 0.15 mm, −0.00 mm
[Joined Thickness]

12-cm/8-cm (common) > 1.20 + 0.30 mm, −0.06 mm
[Inner Diameter of Disc Clamp Area]

12-cm/8-cm (common) > 22.0 mm (maximum)
[Outer Diameter of Disc Clamp Area]

12-cm/8-cm (common) > 33.0 mm (minimum)
[Thickness of Disc Clamp Area]

12-cm/8-cm (common) > 1.20 + 0.20 mm, −0.10 mm
[Joined Disc Weight]

12-cm disc > 13 g to 20 g
 8-cm disc > 6 g to 9 g
[Moment of Inertia of Joined Disc]

12-cm disc > 0.040 g · m$^2$ (maximum)
 8-cm disc > 0.010 g · m$^2$ (maximum)
[Dynamic Balance of Joined Disc]

12-cm disc > 0.010 g · m (maximum)
 8-cm disc > 0.0045 g · m (maximum)

---

Figure 33:
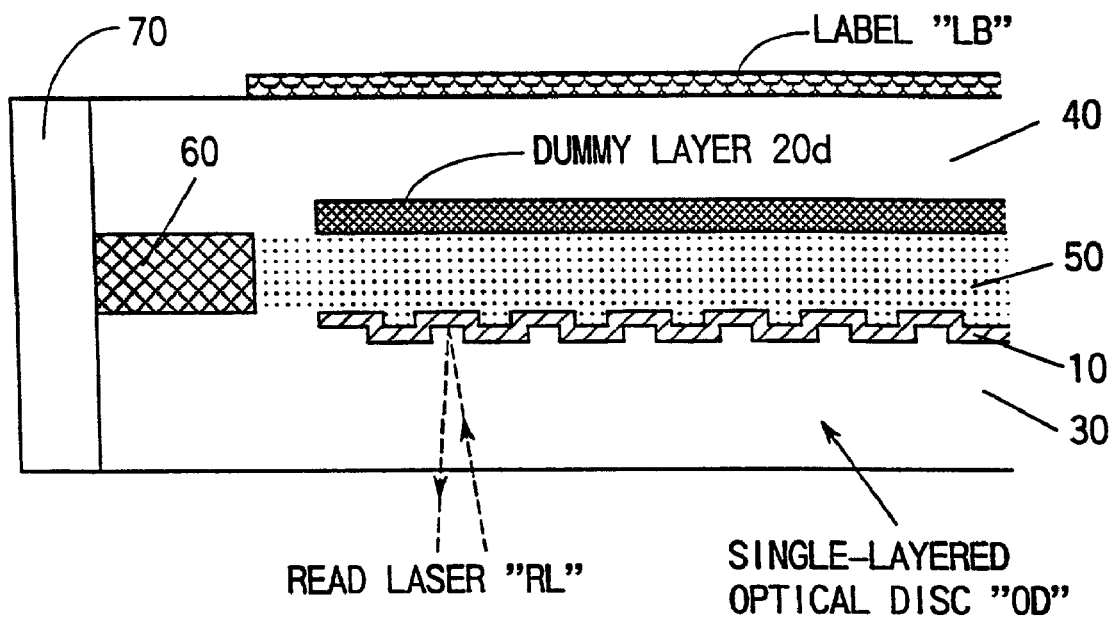
FIG. 33 is a partial schematic sectional view showing a modification of FIG. 32, in which two-substrate-joined optical disc OD has a single information recording layer.

FIG. 33 schematically shows a partial section of a modification of the one-side read type two-substrate-joined double-layered disc shown in FIG. 32, i.e., joined optical disc OD having a single information recording layer.

In the modification shown in FIG. 33, information recording layer 20 shown in FIG. 32 is replaced by dummy layer 20*d* on which no information is recorded. When information recording layer 10 can store the total volume of data to be stored in disc OD, the modification shown in FIG. 33 can be used. Dummy layer 20*d* can be formed of an aluminum-based metal thin film painted with a given information pattern having no practical contents. (Note that "painted with a given information pattern having no practical contents" includes not only a case wherein nothing is really recorded, but also a case wherein simple data such as "0"s or "1"s are fully recorded on the entire recording face.)

Figure 34:
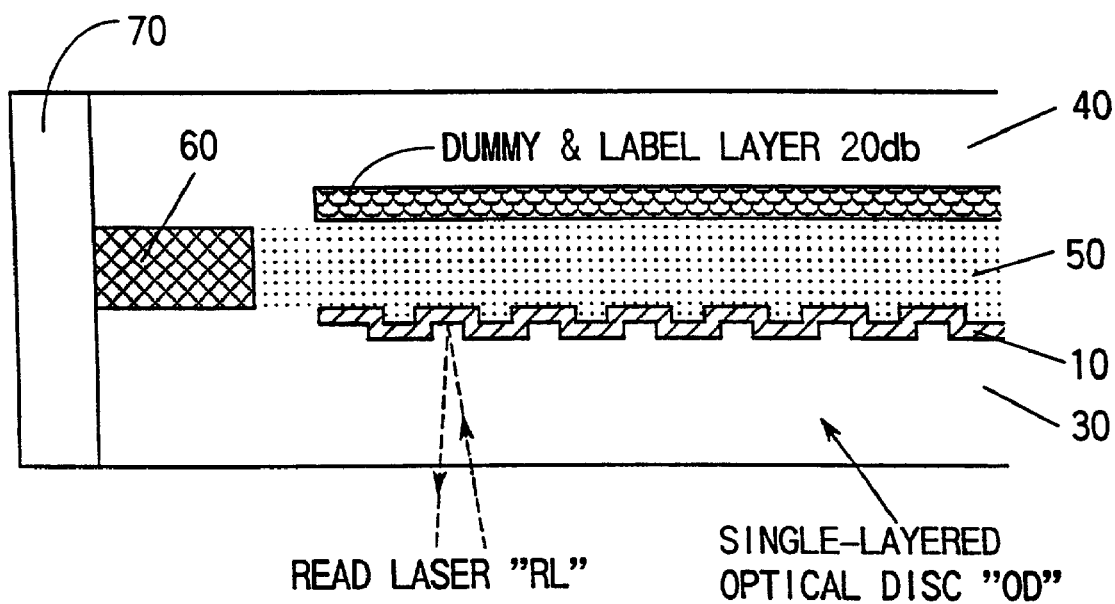
FIG. 34 is a partial schematic sectional view showing another modification of FIG. 32, in which two-substrate-joined optical disc OD has a single information recording layer.

FIG. 34 shows a modification of the structure shown in FIG. 33, and schematically illustrates a partial section of two-substrate-joined optical disc OD having a single information recording layer.

In the modification shown in FIG. 34, information recording layer 20 shown in FIG. 32 is replaced by dummy & label layer 20*db* having a label pattern. If this optical disc OD is found to be a joined single-layered disc by initially reading some information on information recording layer 10, the playback apparatus of this disc OD can be initialized not to access information on dummy & label layer 20*db*. In such case, since dummy & label layer 20*db* need not reflect read laser beam RL, the material of dummy & label layer 20*db* can be selected from various materials. For example, a polycarbonate film printed with a label pattern may be used as dummy & label layer 20*db*.

In the modifications shown in FIGS. 33 and 34, the thickness of dummy layer 20*d* or 20*db* need not be especially controlled. However, the thickness of substrate 40 including that of dummy layer 20*d* or 20*db* is controlled to a predetermined value (0.6 mm).

Using transparency of polycarbonate substrates 30 and 40, characters, patterns, and the like associated with information recorded on the disc may be printed on spacer 60 sandwiched between substrates 30 and 40. In this way, the spacer 60 portion at the center of the disc can be used as a disc label although its visual information entry amount is small.

In the aforementioned embodiment, an aluminum-molybdenum alloy thin film is used as second information recording layer 20. However, the present invention is not limited to such specific film. Depending on the embodiment or modification of the present invention, a pure aluminum layer, gold layer, an alloy layer of aluminum and a high-melting point metal (tungsten, tantalum, nickel, cobalt, platinum, chromium, titanium, or the like) other than molybdenum, which has a high melting point, high strength, and high oxidation resistance, and the like may be used in practice. However, the material of first information recording layer 10 is limited to that (gold alloy, copper, silver, brass, copper-zinc alloy, copper-aluminum alloy, or the like) that exhibits a laser reflectance and laser transmittance equivalent to those of gold with respect to a laser beam with a specific wavelength used, when the selected material forms a thin film.

In the above description, ultraviolet setting resin layer (adhesive layer) 50 has a thickness of 50 μm. However, when joined disc OD shown in FIG. 31 is a read-only DVD audio disc (DVD-ROM), this thickness is preferably selected from the range from 40 μm to 70 μm. When joined disc OD shown in FIG. 31 is a read/write DVD audio disc (DVD-RAM or DVD-RW), the thickness of adhesive layer 50 is often preferably smaller than that of a read-only disc. In such case, the thickness of adhesive layer 50 can be selected from the range from 20 μm to 40 μm.

As an outer size of optical disc OD, 5" type (diameter of 120 mm) and 3.5" type (diameter of 80 mm) have been exemplified. The present invention can also be applied to joined optical discs having other sizes such as 2.5" type (diameter of 63 min) and the like. In this case, the optimal adhesive layer thickness (or the thickness of spacer 60) can be determined in correspondence with the disc size, disc material, disc purpose (ROM or RAM), the type of adhesive, and other conditions.

In the above description, a film ring similar to a disc has been exemplified as spacer 60. However, the shape of spacer 60 is not limited to the ring shape. The inner hole of spacer 60 may have an arbitrary polygonal shape. Similarly, the outer shape of spacer 60 may have an arbitrary polygonal shape as long as the diameter of its circumscribed circle does not enter the region of the information recording layer shown in FIG. 31. For example, a polygonal film (e.g., a thickness of 50 μm) which has a hexagonal outer shape that is circumscribed by a circle having a diameter of 33 mm, and an octagonal inner shape that inscribes a circle having a diameter of 15 mm may be used as spacer 60. When disc recorded information (characters, symbols, or graphics) is printed on spacer 60, spacer 60 is preferably not limited to a circular ring to improve its value (mainly in terms of its design).

Figure 35:
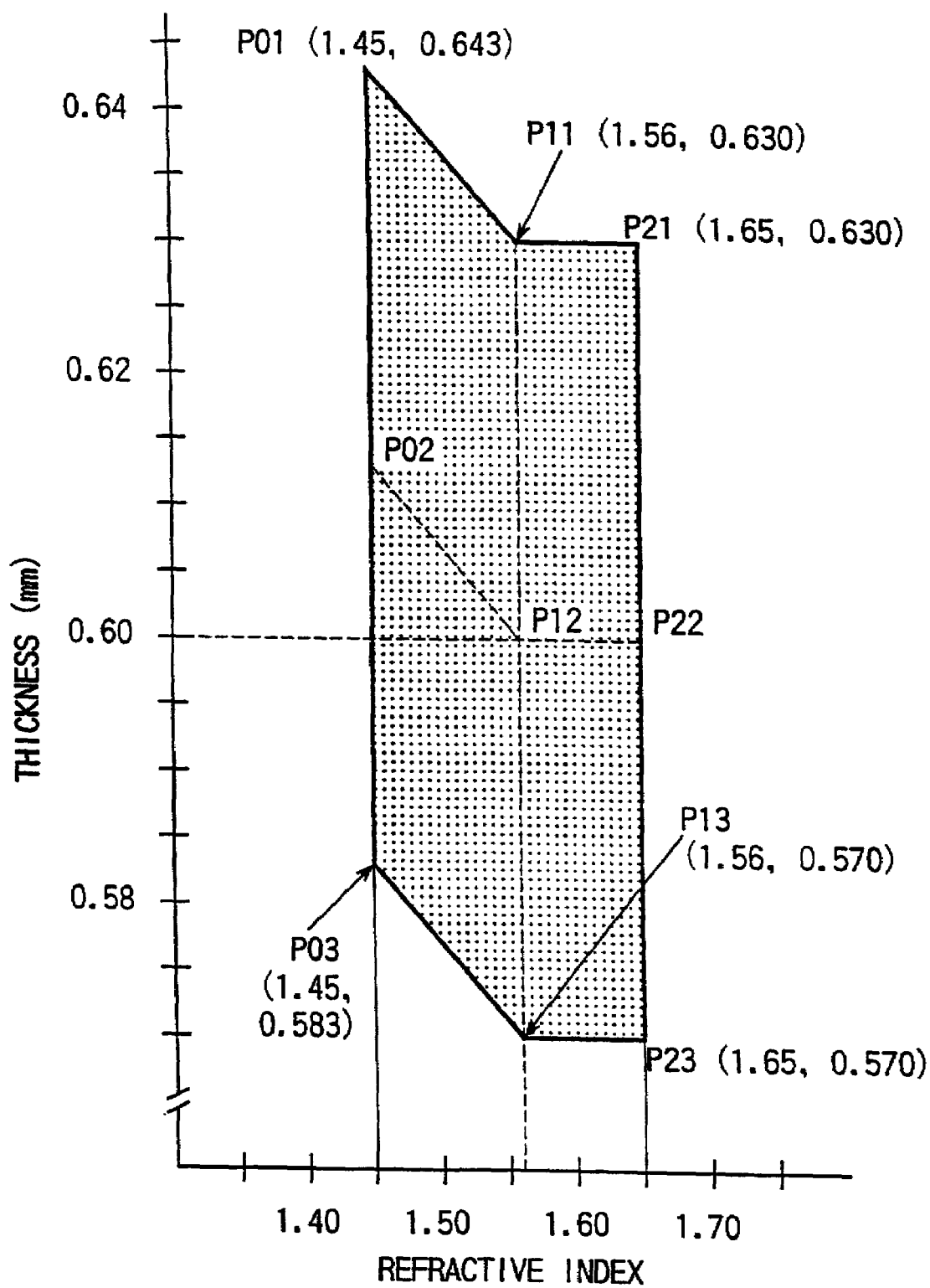
FIG. 35 is a graph showing changes in allowable range of the thickness (ordinate) of a substrate to be joined as a function of the refractive index (abscissa) of a substrate material, when coherent light having a wavelength of 650 nm is used and a pair of substrates each having a single substrate/single recording layer structure are used.

FIG. 35 is a graph showing changes in allowable range of the thickness (ordinate) of a substrate (30 or 40) to be joined as a function of the refractive index (abscissa) of the substrate material when coherent light having a wavelength of 650 nm is used and a pair of substrates (30, 40) each having a single substrate/single recording layer structure shown in FIG. 32 is used.

In this graph, if the refractive index of the substrate is 1.45, the substrate thickness is controlled to fall within the range from the upper limit of 0.643 (point P01) to the lower limit of 0.583 (point P03) (the central value is 0.615 mm at point P02). For example, if the refractive index of a polycarbonate substrate is 1.56, the substrate thickness is controlled to fall within the range from the upper limit of 0.630 (point P11) to the lower limit of 0.570 (point P13) (the central value is 0.600 mm at point P12). If the refractive index of the substrate is 1.65, the substrate thickness is controlled to fall within the range from the upper limit of 0.630 (point P21) to the lower limit of 0.570 (point P23) (the central value is 0.600 mm at point P22).

In the embodiment of the present invention, a transparent substrate (30, 40) made of polycarbonate or the like, the thickness of which falls within the range bounded by points P01 to P23 in this graph is used.

Figure 36:
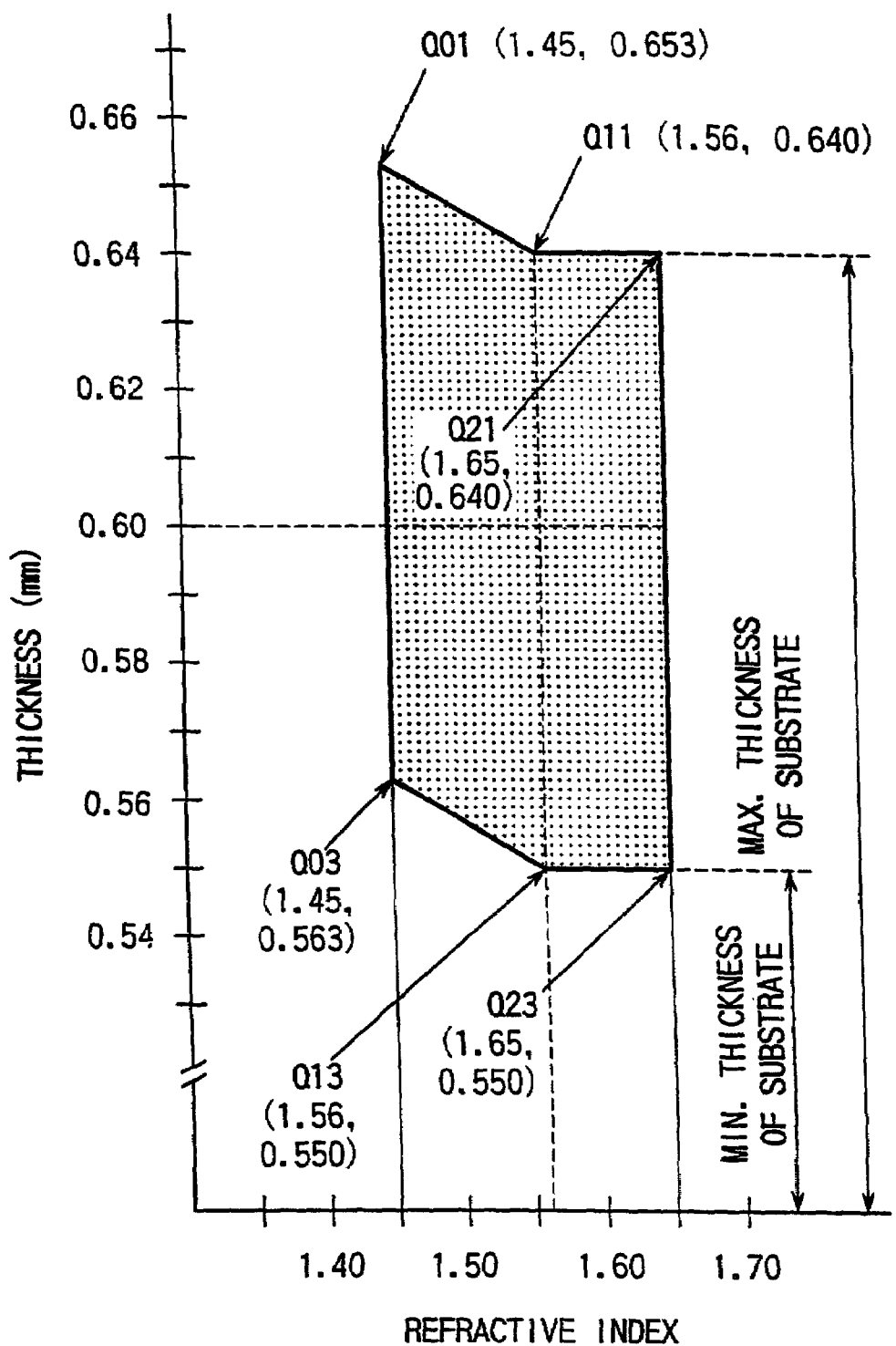
FIG. 36 is a graph showing changes in allowable range of the thickness (ordinate) of a substrate to be joined as a function of the refractive index (abscissa) of a substrate material, when coherent light having a wavelength of 650 nm is used and a pair of substrates each having a single substrate/dual recording layer structure are used.

FIG. 36 is a graph showing changes in allowable range of the thickness (ordinate) of a substrate to be joined as a function of the refractive index (abscissa) of the substrate material when coherent light having a wavelength of 650 nm is used and a pair of substrates each having a single substrate/dual recording layer structure shown in FIG. 32 are used.

In this graph, if the refractive index of the substrate is 1.45, the substrate thickness is controlled to fall within the range from the upper limit of 0.653 (point Q01) to the lower limit of 0.563 (point Q03). If the refractive index of the substrate is 1.56, the substrate thickness is controlled to fall within the range from the upper limit of 0.640 (point Q11) to the lower limit of 0.550 (point Q13) (the central value is approximately 0.595 mm). If the refractive index of the substrate is 1.65, the substrate thickness is controlled to fall within the range from the upper limit of 0.640 (point Q21) to the lower limit of 0.550 (point Q23).

In the embodiment of the present invention, a transparent substrate (30, 40) made of polycarbonate or the like, the thickness of which falls within the range bounded by points Q01 to Q23 in this graph is used.

Incidentally, the term "video" used in this specification refers to a "movie" picture. No video ("movie" picture) can be added to an audio only title AOTT, while a "still" picture can be added to the AOTT. Thus, an audio title set directory AUDIO_TS may contain still picture data but may not contain video data.

According to the present invention, the data structure of the DVD audio format can be realized in a form similar to that of the video format without modifying the DVD video format that has already been put into applications. In this case, an audio volume can exist in a single volume space to share objects of a video volume. A DVD disc (A disc or AV disc) formed with this data structure can play back appropriate objects in both the video player and audio player.

Since the data structure of the present invention is characterized by sharing some objects of DVD video without conflicting existing DVD video, DVD video and DVD audio can expand the infrastructure in cooperation with each other. This also brings about secondary merits, i.e., a reduction of the manufacturing cost of playback apparatuses, media, and other associated products.

The invention claimed is:

1. A digital information recording medium embodied as an optical disc for use with an optical disc drive, wherein said optical disc has an outline of two-adhesive substrates, and includes a center hole, a clamp area around the center hole, and a read-out face around the clamp area, said read-out face is located at one of the two-adhesive substrates, the optical disc includes a spiral track on which sectors are placed, and data can be reproduced from the sectors using a laser, said data including audio contents and audio management information, the digital information recording medium comprising:

an audio data area storing the audio contents;
   an audio management block storing the audio management information; and
   wherein said audio contents includes audio data and audio title set information including audio title set information management information,
   wherein said audio title set information management information includes one or more pieces of coefficient information describing one or more coefficients to mix down the audio data having multi-channel outputs to 2-channel outputs,
   said audio title set information contains
      at least one program information including information which describes a coefficient table number of the at least one piece of the coefficient information, and
      cell playback information including index information which describes an index number of a cell of the audio contents, and
   wherein said index number describes 01 h of hexadecimal notation when the audio content has no audio objects,
   said index number describes 00 h when the cell is a silent cell, and
   said index number describes a number from 1 to 99 when the cell is an audio cell.

2. A medium according to claim 1, wherein said audio management information includes a search pointer table, and
   wherein said search pointer table includes
   a first search pointer including address information of the audio contents, and
   a second search pointer including address information of the video contents.

3. A medium according to claim 1, wherein said audio management block storing said audio management information has physically or logically smaller addresses than addresses of said video management block.

4. A medium according to claim 1,
wherein said audio contents includes audio title set information,
wherein said audio title set information includes audio title set program chain information for controlling the audio contents,
wherein said audio title set program chain information includes an audio still video playback information table, and
wherein said audio still video playback information table includes audio still video playback search pointers and audio still video playback information.

5. A medium according to claim 1, wherein contents of said audio data area are recorded in
audio packs configured to store data of the audio contents, and
still picture packs configured to store data of a still picture to be played back during playback of the contents of said audio packs.

6. A medium according to claim 1,
wherein said audio title set information management information includes attribute information indicating a predetermined sampling frequency and a predetermined number of quantization bits used in the audio data.

7. An apparatus for playing back the audio or video contents from the medium as defined in claim 1, said apparatus comprising:
a drive unit configured to read information of the audio management block and to playback contents of the audio data area.

8. The medium of claim 1, wherein a refractive index of said one of the two-adhesive substrates is selected from a range from 1.45 to 1.65, and a thickness of said one of the two-adhesive substrates is selected from a range from 0.550 mm to 0.653 mm.

9. A method of reproducing data from an optical disc using an optical disc drive, said data including audio contents and audio management information, wherein said disc includes,
an audio data area storing the audio contents;
an audio management block storing the audio management information; and
wherein said audio contents includes audio data and audio title set information including audio title set information management information,
wherein said audio title set information management information includes one or more pieces of coefficient information describing one or more coefficients to mix down the audio data having multi-channel outputs to 2-channel outputs,
said audio title set information contains
at least one program information including information which describes a coefficient table number of the at least one piece of the coefficient information, and
cell playback information including index information which describes an index number of a cell of the audio contents, and
wherein said index number describes 01 h of hexadecimal notation when the audio content has no audio objects,
said index number describes 00 h when the cell is a silent cell, and
said index number describes a number from 1 to 99 when the cell is an audio cell,
the reproducing method comprising:
rotating the optical disc with the optical disc drive; and
reading the recorded data.

* * * * *